Aug. 15, 1939.  L. M. KEEFE  2,169,583
RECORD CONTROLLED MACHINE
Filed March 31, 1934  21 Sheets-Sheet 1

INVENTOR
LINCOLN M. KEEFE
BY
Van Deventer + Griet.
ATTORNEYS

Aug. 15, 1939   L. M. KEEFE   2,169,583
RECORD CONTROLLED MACHINE
Filed March 31, 1934   21 Sheets-Sheet 2

INVENTOR
LINCOLN M. KEEFE
BY Van Deventer + Grier
ATTORNEYS

Aug. 15, 1939.  L. M. KEEFE  2,169,583
RECORD CONTROLLED MACHINE
Filed March 31, 1934   21 Sheets-Sheet 3

INVENTOR
LINCOLN M. KEEFE
BY Van Deventer + Grier
ATTORNEYS

Aug. 15, 1939  L. M. KEEFE  2,169,583
RECORD CONTROLLED MACHINE
Filed March 31, 1934  21 Sheets-Sheet 4

INVENTOR
LINCOLN M. KEEFE
BY Van Deventer + Grier
ATTORNEYS

Aug. 15, 1939.  L. M. KEEFE  2,169,583
RECORD CONTROLLED MACHINE
Filed March 31, 1934   21 Sheets-Sheet 5

INVENTOR
LINCOLN M. KEEFE
BY
Van Deventer & Grier
ATTORNEYS

Aug. 15, 1939  L. M. KEEFE  2,169,583
RECORD CONTROLLED MACHINE
Filed March 31, 1934    21 Sheets-Sheet 8

INVENTOR
LINCOLN M. KEEFE
BY
ATTORNEYS

Aug. 15, 1939.　　　L. M. KEEFE　　　2,169,583
RECORD CONTROLLED MACHINE
Filed March 31, 1934　　　21 Sheets-Sheet 10

INVENTOR
*LINCOLN M. KEEFE*
BY *Van Deventer + Grier*
ATTORNEYS

Aug. 15, 1939.   L. M. KEEFE   2,169,583
RECORD CONTROLLED MACHINE
Filed March 31, 1934   21 Sheets-Sheet 11

INVENTOR
LINCOLN M. KEEFE
BY Van Deventer + Grier
ATTORNEYS

Aug. 15, 1939.  L. M. KEEFE  2,169,583
RECORD CONTROLLED MACHINE
Filed March 31, 1934  21 Sheets-Sheet 12

INVENTOR
LINCOLN M. KEEFE.
BY Van Deventer + Grier
ATTORNEYS

Aug. 15, 1939.    L. M. KEEFE    2,169,583
RECORD CONTROLLED MACHINE
Filed March 31, 1934    21 Sheets-Sheet 13

INVENTOR
LINCOLN M. KEEFE
BY Van Deventer & Griet
ATTORNEYS

Aug. 15, 1939    L. M. KEEFE    2,169,583
RECORD CONTROLLED MACHINE
Filed March 31, 1934    21 Sheets-Sheet 14

INVENTOR
LINCOLN M. KEEFE
BY Van Deventer + Grier
ATTORNEYS

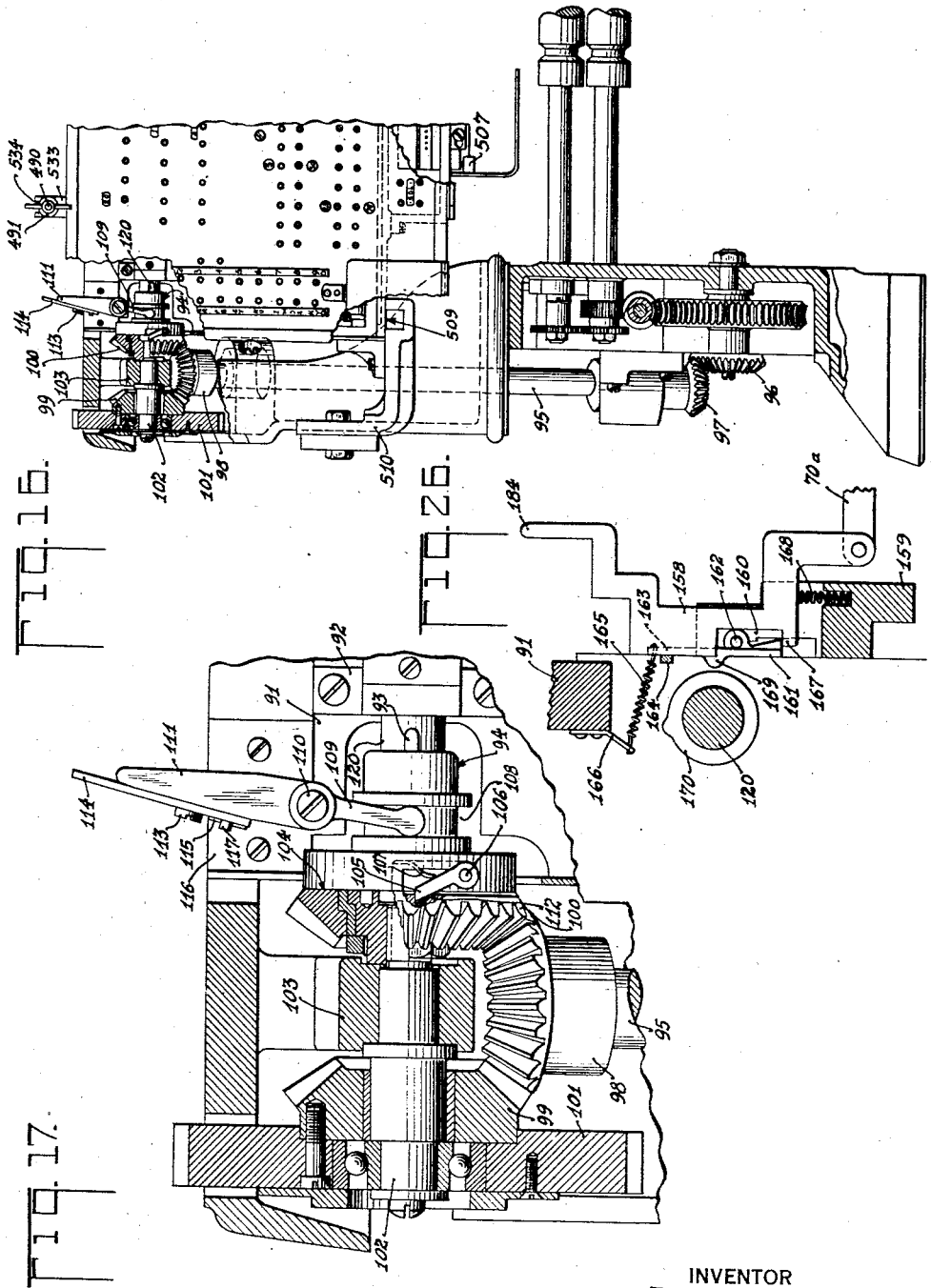

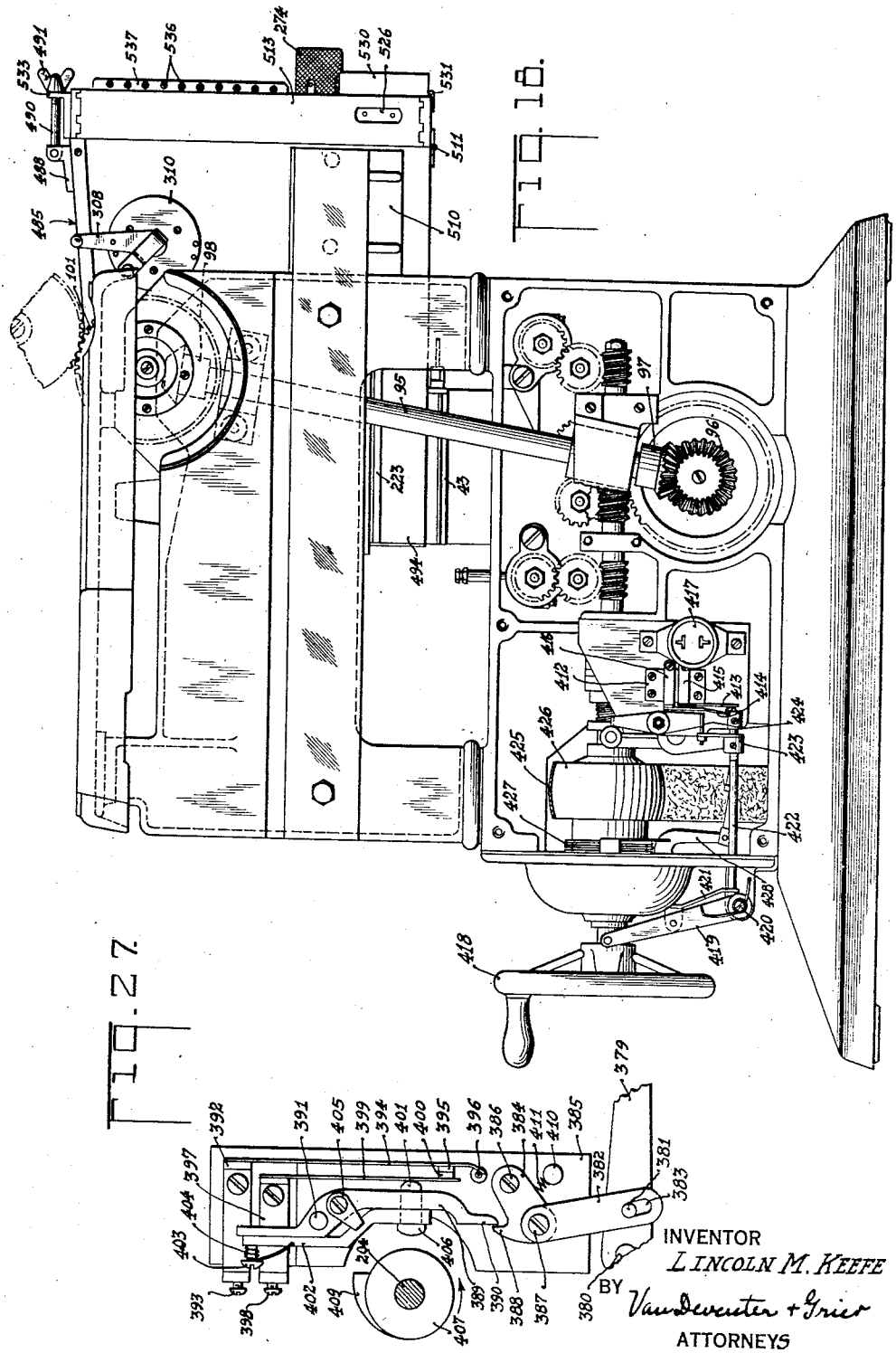

Aug. 15, 1939  L. M. KEEFE  2,169,583
RECORD CONTROLLED MACHINE
Filed March 31, 1934  21 Sheets-Sheet 17
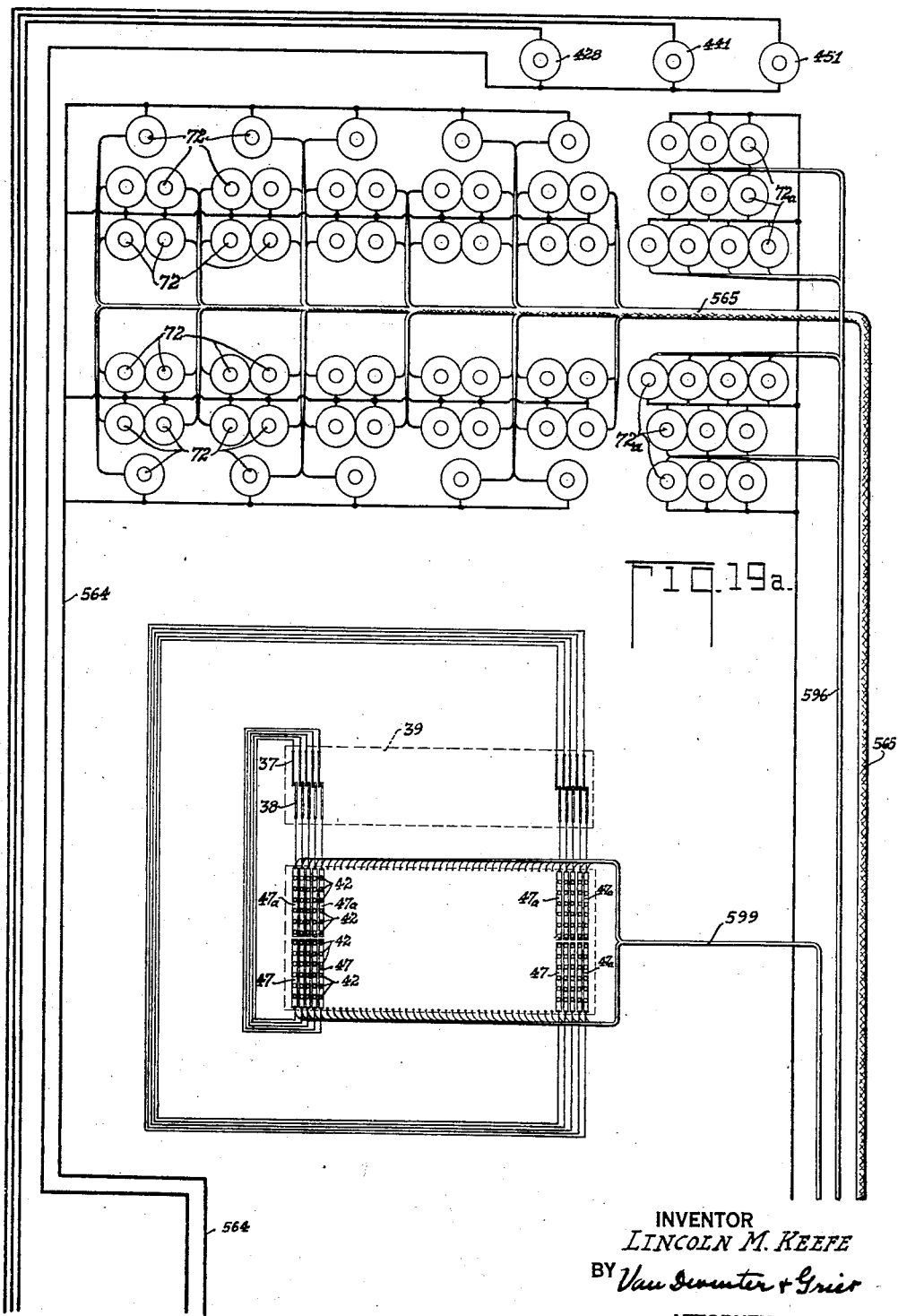
INVENTOR
LINCOLN M. KEEFE
BY
ATTORNEYS Aug. 15, 1939.  L. M. KEEFE  2,169,583
RECORD CONTROLLED MACHINE
Filed March 31, 1934  21 Sheets-Sheet 18

INVENTOR
LINCOLN M. KEEFE
BY
Van Deventer + Griet
ATTORNEYS

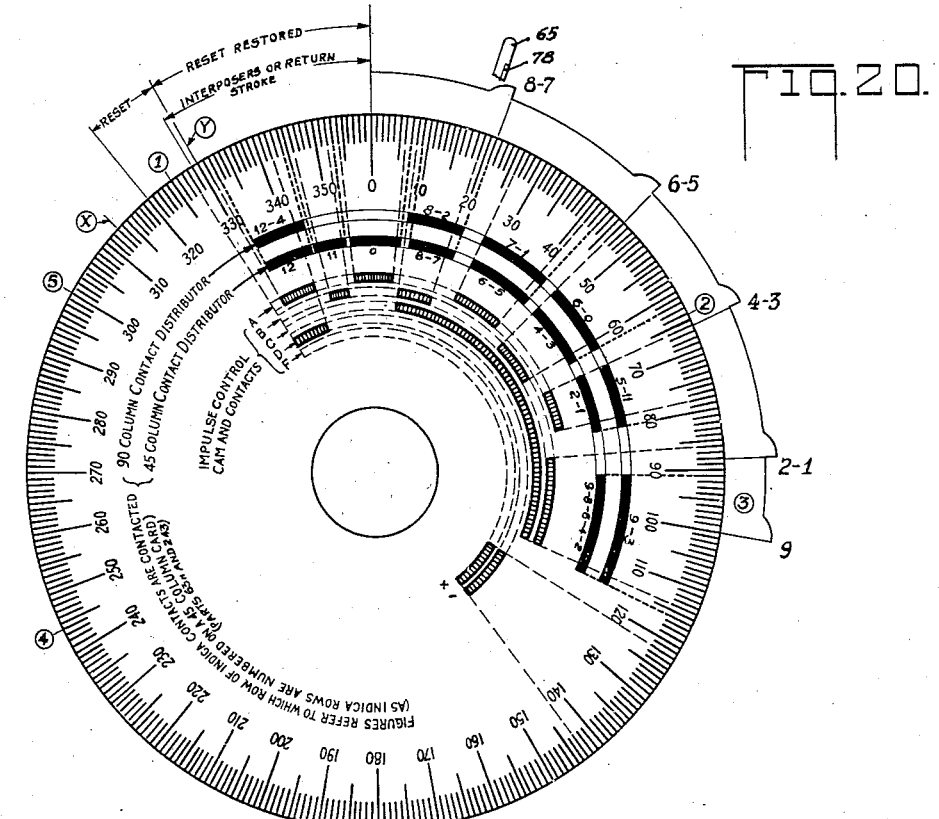
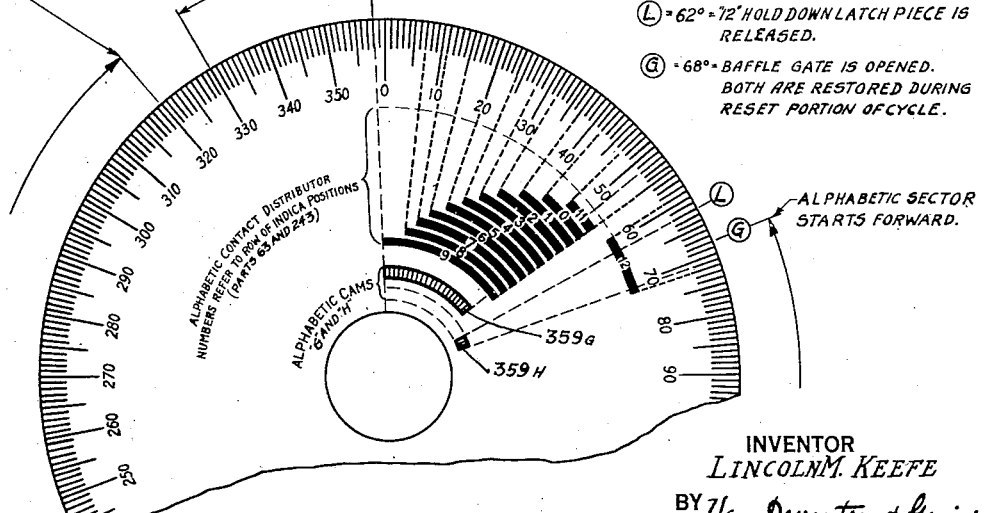

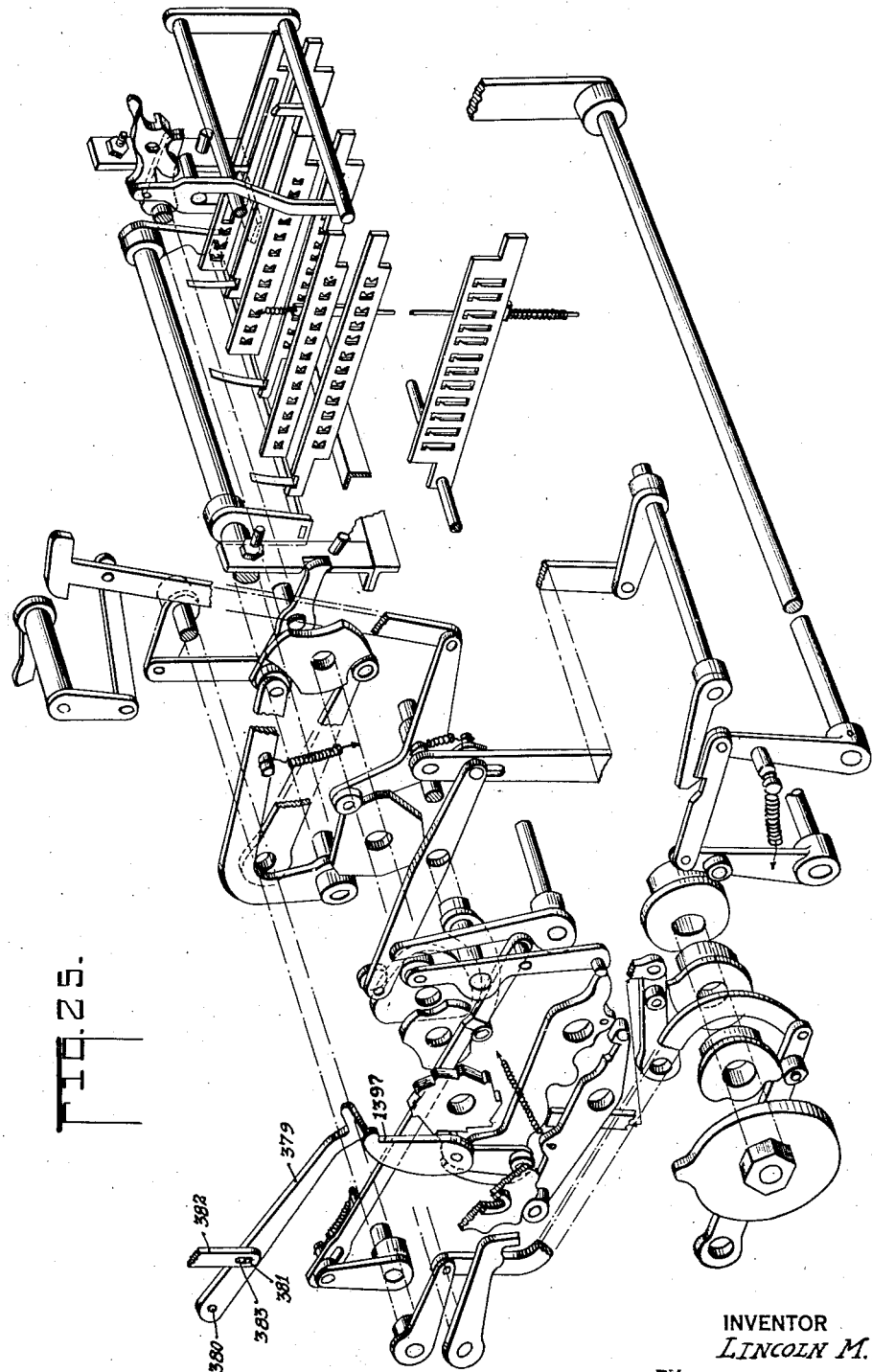

Aug. 15, 1939.  L. M. KEEFE  2,169,583
RECORD CONTROLLED MACHINE
Filed March 31, 1934  21 Sheets-Sheet 21
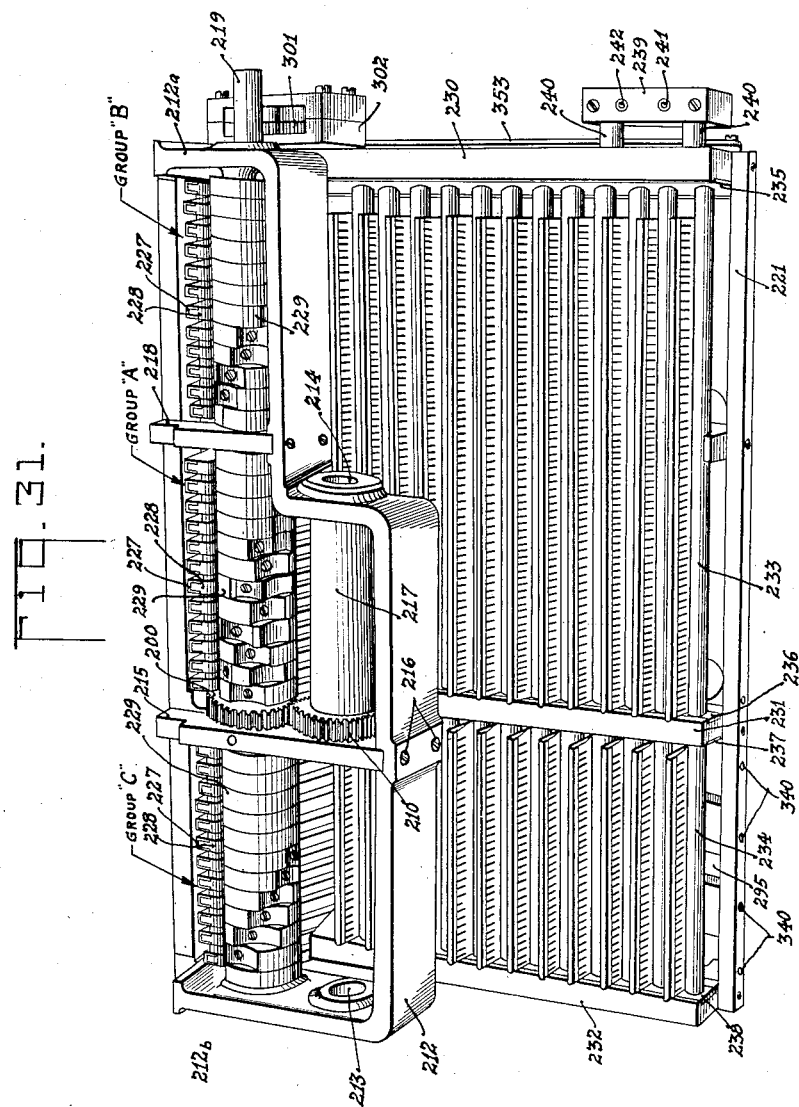
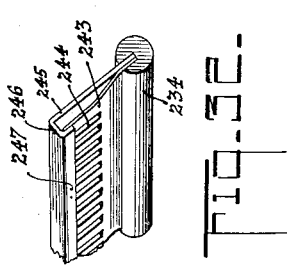
INVENTOR
LINCOLN M. KEEFE
BY Van Deventer & Grier
ATTORNEYS Patented Aug. 15, 1939

2,169,583

UNITED STATES PATENT OFFICE 2,169,583

RECORD CONTROLLED MACHINE

Lincoln M. Keefe, Springfield, Mass., assignor to Remington Rand Inc., Buffalo, N. Y., a corporation of Delaware Application March 31, 1934, Serial No. 718,421

33 Claims. (Cl. 235—61.9)

This invention relates to improvements in record controlled machines of the pin sensing type and is directed more particularly to a self-contained universal translator by means of which electrical paths or circuits are completed by the mechanical operation of sensing pins in the machine and in which electrical impulses via these paths or circuits release moving interposers which cooperate with differential stops in the tabulating machine. Differential stops are used in connection with combinational hole records. An example of the use of such stops is with the Powers ninety-column type of record.

A typical example of a differential stop basket for use with numeral type bars or segments, which consists of an assemblage of differential stops, is shown and described, together with a combinational hole record, in Patent #1,780,621, issued Nov. 4, 1930, to W. W. Lasker. The combinational record is shown in Figure 6 of the patent, and Figures 2, 3, 4 and 5 illustrate the arrangement and operation of the differential stops.

Another object of the invention is the provision in a record controlled machine of the pin sensing type of a translator employing electrically controlled mechanical means for actuating stops governing the setting up of alphabetical type bars or segments whereby a name, code letters, etc., may be printed on a collective sheet after being set up by the record.

The operation of the type segments and the stops for controlling or limiting the movement of the segments in setting up to print alphabetical characters is shown and described in Patent #1,274,528, issued August 6, 1918, to Charles Foster. The record in this case is also combinational and Foster shows in Figure 6 of his patent a punched index point representing the letter "B". This punching is in the horizontal "2" row of the record, and in Figure 7 of his patent, punched index points representing the letter "N", which in this case is a combination of a hole in the "12" row and a hole in the "2" row, are shown. The stop pins control the movement of the type bars in accordance with the combination punched in the record card.

A further object of the invention is the provision in a tabulating machine adapted to print numeral or alphabetical characters, of instrumentalities electrically controlled, between the sensing means and the type carrying members for causing all of the columns of the record to print alphabetical characters, all of the columns to print numeral characters, or for causing some of the columns to print alphabetical characters and some of the columns to print numeral characters, the controls for causing the printing of alphabetical characters being conveniently arranged so that the operator may select from five to twenty columns, in five-column groups.

Another object of the invention is the provision in a record controlled device in which the records are stationary while being sensed by analyzing pins of the sensing means, of a mechanical-electrical translator including a plurality of oscillating interposers moving in timed relation to a definite portion of the operating cycle of the device, an equal number of reciprocable interposers, a plurality of electrical releases, each having a single latch engaging both a member associated with one of the oscillating interposers, and a member associated with one of the reciprocable interposers, and circuits and mechanism so arranged that, during an operating cycle of the device in which the indicia in the record are given time, sequence, and position values, the first impulse of a two-impulse combination (due to a two-hole combination in the record) energizes the electrical release causing it to attract the latch, releasing the oscillating interposer and allowing it to engage one of the differential stops. While this happens, the reciprocable interposer is restrained or prevented from moving; when the first impulse ends the latch of the electrical release reengages the member associated with the reciprocable interposer and the restraint is removed therefrom. The electrical release is again energized and the latch is again attracted and the reciprocable interposer is released whereupon it engages the end differential stop, allowing the first stop which was set to shift its position and thereby change the value position which the type segment will assume when the latter is released.

Still another object of the invention is the provision in a record controlled machine, normally controlled by combinational hole records, of a mechanical-electrical translator positioned between sensing pins and differential type segment stops in said machine, and having instrumentalities and circuits so arranged that by throwing the lever in one position the machine may be controlled by combinational hole records, and by throwing the lever into a second position the machine may be controlled by records of a different character than those by which it is normally controlled.

A further object of the invention is the provision in a record controlled machine in which the analyzer is comprised of sensing pins, of a mechanical-electrical translator having a contactor assembly in which a pair of contacts is positioned adjacent to each sensing pin and adapted to be closed thereby.

Another object of the invention is the provision of a translator including a contactor device comprising a plurality of stationary contact members and a plurality of movable contact members, one of the latter for each sensing pin in a mechanical tabulator, said movable contact members being common in groups corresponding to the lower half of each vertical column in the records, and a second set of movable contact members being common in groups corresponding to the upper half of each vertical column in the records, a multi-point switch having one group of contact arms connected to said first movable contact members, and a second cooperating group of contact arms connected to the second set of contact members in such manner that when the contacts of said switch are closed the movable members connected in common thereby each correspond to an entire vertical column in the record and adapt the machine to be controlled by standard records. When the multi-switch has its contact arms disconnected, the machine may be controlled by double capacity or ninety-column records.

A further object of the invention is the provision in a mechanical tabulator of a mechanical-electrical translator between the sensing pins and stops controlling type bars in the tabulator, the translator including a switch between the electrical instrumentalities in the translator and a source of current, and an arm cooperating with total-taking mechanism in the tabulator for actuating said switch and cutting off all current from the translator, and rotary means operating in timed relation with the tabulator to close said switch a number of cycles later, during which total-taking is accomplished.

Another object of the invention is the provision in a tabulating machine of a mechanical-electrical translator between the sensing pins and differential stops in said machine for controlling type bars in the machine, said translator including a plurality of plunger-like contactors, one for each of the sensing pins, a plurality of stationary contactors adapted to be contacted by the plunger-like contactors when the latter are actuated by the sensing pins, a plurality of fixed contact members arranged in groups and rows and electrically connected to said stationary contactors (in the embodiment shown there are five hundred and forty of each), and a plurality of rocking shafts each carrying flexible members adapted to make contact with fixed contact members. The latter are arranged in twelve rows, forty-five in each row, corresponding to the horizontal rows in the forty-five column records, or the two groups of six rows in the combinational or ninety column record. Some of these fixed contact members may correspond to an alphabetic portion of the record and they are arranged so that groups of five, ten, fifteen, or twenty columns may be made alphabetical. One group of twelve rocking shafts is for controlling alphabetical printing and another group of twelve oscillating shafts is for controlling numeral accumulating and printing. These shafts are arranged so that their flexible members successively contact the fixed contact members, the alphabetical group in accordance with the alphabetical timing (spacing of the alphabetical stops) and the numeral group in accordance with numeral timing. The rocking shafts are all carried by a common support which may be shifted laterally relative to the fixed contact members so that as less of said members are engaged by rocking shafts of alphabetical timing, more of the members are engaged by arms of numeral timing and vice versa.

Still another object of the invention is the provision in a translator of a plurality of oscillatable interposers and a plurality of reciprocable interposers each associated with one of the oscillatable interposers and jointly controlled by an electromagnetically controlled latch, restraining means engaging the reciprocable interposers while the oscillating ones are operating, after which the restraining means is disengaged and any of the reciprocable interposers may operate, where the combinational holes in the record determine that they shall operate, means for preventing said interposers from engaging stops in a record controlled alphabetical printing device, and means for releasing all actuated interposers simultaneously and allowing them to engage said stops.

A further object of the invention is the provision in a mechanical-electrical translator for mechanical tabulators of sequentially-actuated breakers in electrical circuits in said translator for preventing "flow-back" in the various circuits.

Another object is the provision, in a mechanical tabulating machine, of a removable translator having a rotating shaft therein rotating at the same speed as that of the main drive shaft of said machine, the shaft in the translator carrying a lever-controlled clutch adapted to engage means on a shaft in said machine so arranged that the shafts in the translator and in the machine are not only engaged in driving relation but also together in proper index relation.

A further object of the invention is the provision in a translator such as described herein of plunger contact members cooperating with mechanical sensing pins, said members arranged in forty-five columns, corresponding to a forty-five column card, and each column comprised of two groups of six contact members, a multi-contact switch adapted to connect each of the two groups in the columns together for forty-five column records, and adapted to automatically disconnect portions of the multi-contact switch in groups of five, ten, fifteen, or twenty, in accordance with the alphabetic columns selected for use in the machine.

Other objects and advantages will be apparent to those skilled in the art.

A device of the character herein described may be used in a tabulating machine having denominational types of alphabetical or numeral stops without any change in the machine in any way, and the machine may be controlled by forty-five column records, either all numeral or part numeral, and four choices of alphabetic; or the machine may be controlled by combinational or ninety column records, either all numeral or part numeral and from five to twenty columns alphabetic.

Referring to the drawings:

Figure 16 is an elevation of a portion of the tabulating machine drive showing the manner in which the translator drive is interconnected therewith;

Figure 17 is a fragmentary view partly in section showing the method of clutching the drive shaft of the translator to a driven portion of the tabulating machine;

Figure 18 is a side view of a portion of the tabulating machine showing the translator in position therein, and showing a switch adapted to supply current to the translator regardless of whether its drive shaft is rotated by hand or by means of the motor drive;

Figure 13:
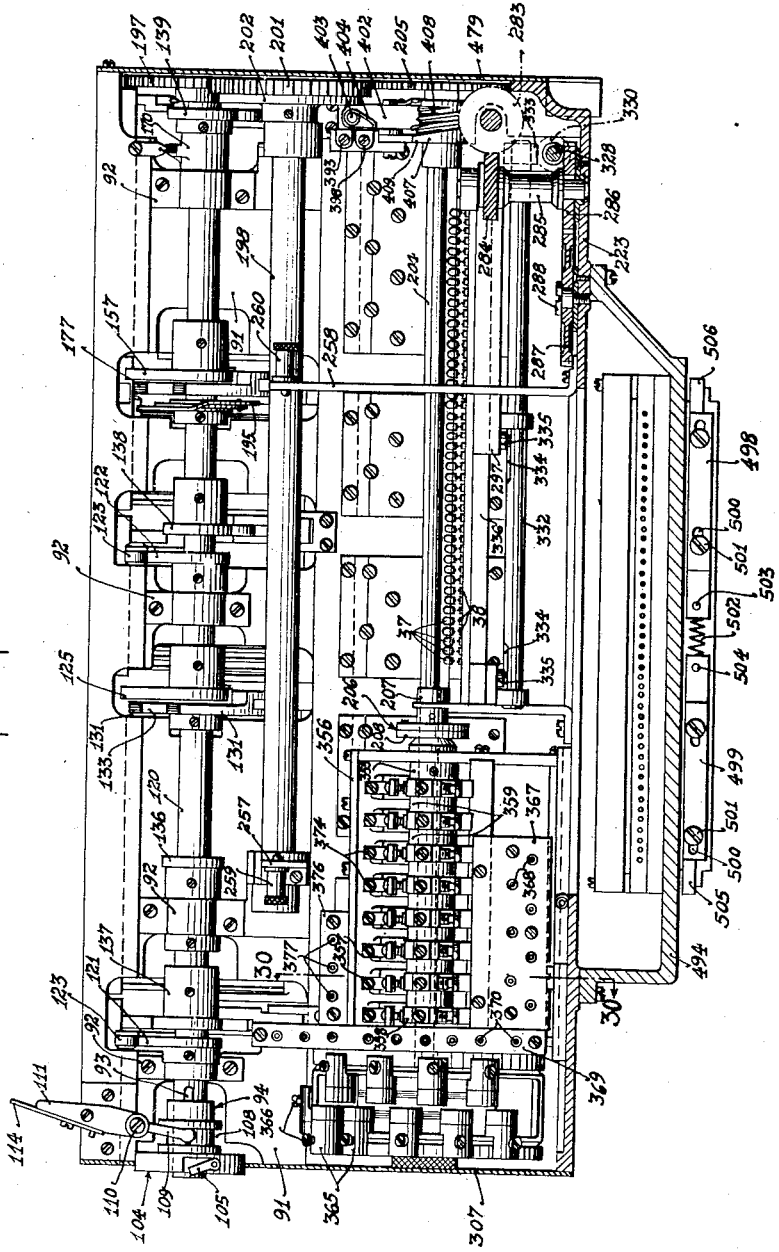
Figure 13 is a vertical section of the translator as viewed along the line 13—13 of Fig. 5.
Figure 19B:
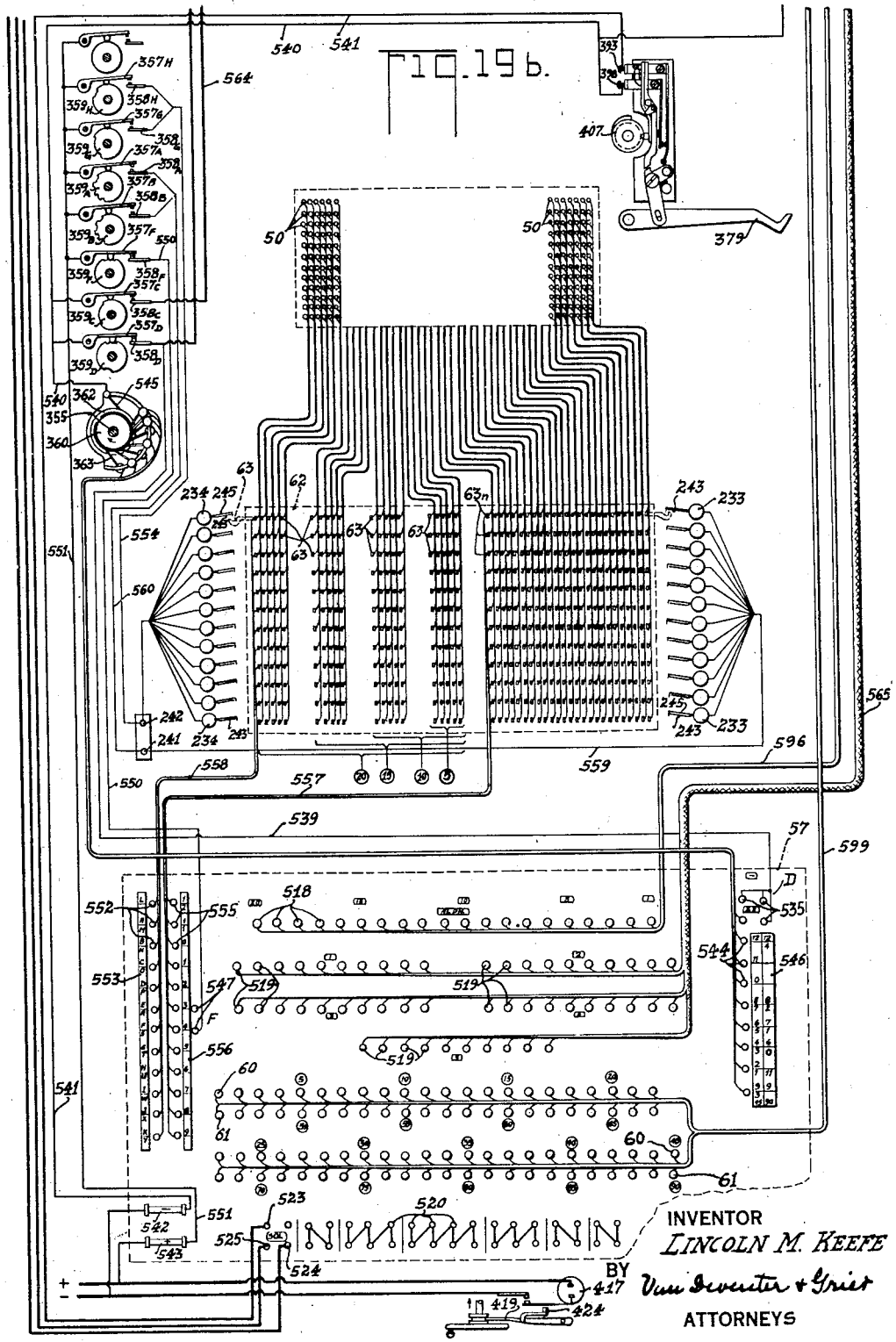

Figures 19a and 19b, taken together, form a diagram of connections of the various elements of the new and improved translator;

Figure 20 is a polar diagram showing the action of the interposers, contact distributors, the control cams and reset in the translator for numerals, relative to the cycle of the tabulating machine, both for forty-five and ninety column operation;

Figure 21 is a polar diagram in some respects similar to Figure 20, except that it relates to the alphabetic controls in the translator and the relation of the same to the cycle of the tabulating machine;

Figure 22 is a fragmentary view of a standard forty-five column record;

Figure 23 is a fragmentary view of a combinational or denominational record in which the index point positions are grouped in two fields and numerical values are impressed therein in accordance with some predetermined code;

Figure 24 is a fragmentary view of a portion of a card showing one form of alphabetical code;

Figure 25 is an exploded view of the sensing means of the tabulating machine and of the control mechanism showing the action between a pawl member of the total-taking mechanism and a switch in the translator adapted to cut off all current therefrom, thereby disabling all circuits within the translator during the total-taking operation;

Figure 26 is a detail view of mechanism for locking reciprocable interposers in the alphabetical section of the translator;

Figure 27 is a view showing details of a switch for disabling all circuits in the translator during total-taking operations;

Figure 28 is a diagrammatic sketch showing the action of alphabetical type sectors when controlled by a single stop;

Figure 29 is a diagrammatic sketch showing the action of an alphabetical type sector when controlled by two stops one of which is in the "12" or "L" position;

Figure 30 is a sectional elevation along the line 30—30 of Figure 13;

Figure 31 is a rear perspective view of a slidable panel; and

Figure 32 is a fragmentary view showing details of the contact brushes and associated restrainers shown in Figure 31.

The new and improved translator forms a unitary structure which is in the embodiment shown positioned in the tabulating machine between the sensing pins and the stops for controlling the movement of the type bars in the machine. This does not literally have to be the case in all instances because it is obvious that the form of the tabulating machine may be changed so that the sensing means or the accumulating and printing means may be placed in an innumerable number of different positions relative to each other, and a translator may be constructed which will place the accumulating and printing means under control of the sensing means without departing from the spirit of this invention.

The present translator includes a plurality of moving arms oscillating in timed relation to a portion of the operating cycle of the tabulating machine. These moving arms are in many respects similar to those described in copending applications Ser. No. 676,820, filed June 21, 1933, now Patent No. 2,122,206, dated June 28, 1938, and Ser. No. 713,868 filed March 3, 1934, now Patent No. 2,134,284, dated October 25, 1938. Each of the moving arms is supported on a slide plate which is held downward by the armature of an electromagnet. This is also the case in the two copending applications referred to above, but in the present translator a second slide plate is positioned between each of the slide plates carrying moving arms and each magnet armature engages both a slide plate carrying a moving arm and a second slide plate which carries an interposer which engages the end or "9" differential stop in the stop pin basket.

During the portion of the cycle in which the moving arms oscillate, the slide plates which carry the interposers engaging the "9" stops are mechanically prevented from moving, so that when a magnet armature releases a slide plate carrying a moving arm, the slide plate carrying the "9" interposer is mechanically prevented from moving, and when the magnet is deenergized and the armature returns to its normal position, it reengages the slide carrying the "9" interposer, after which if the magnet is again actuated, the slide plate carrying the "9" interposer is released and the value of the type bar set by the stop engaged by the movable arm is changed in value in accordance with the code of the combinational holes in the record.

As the operation of the card feeding device, the sensing pins, and the adding and printing elements of the tabulating machine are well-known to those skilled in the art, the operation of these elements will only be described insofar as they cooperate with the elements of the new and improved translator. The translator has been housed in a casing designated generally by the numeral 40. A plurality of movable contact members or plungers 42 are positioned at the bottom of the casing 40 in a group so arranged that when the translator is in operative position in the tabulating machine, one plunger is directly in line with each of the sensing pins 41 of the tabulating machine. These plungers are assembled in a plurality of rows in a block of insulation 43, each row corresponding to a vertical column in the record.

One half of the plungers in each row are electrically connected in common and the other half are also electrically connected in common but insulated from the first half. These half rows of plungers are connected to a multiple switch which when its contacts are closed, connects the groups of plungers in each of the rows in common so that a standard or forty-five column record may be used; and which when opened divides each row into two groups and allows combinational records to be used.

These combinational records may be numerical, alphabetical, or a combination of both. Furthermore, the multiple switch is arranged so that selective portions of the rows of plungers in the block 43 may be connected in common or not, allowing the use of standard record columns or both standard and combinational columns. This switch, the method of interconnecting the same, and the operation thereof will presently be described.

Figure 12:
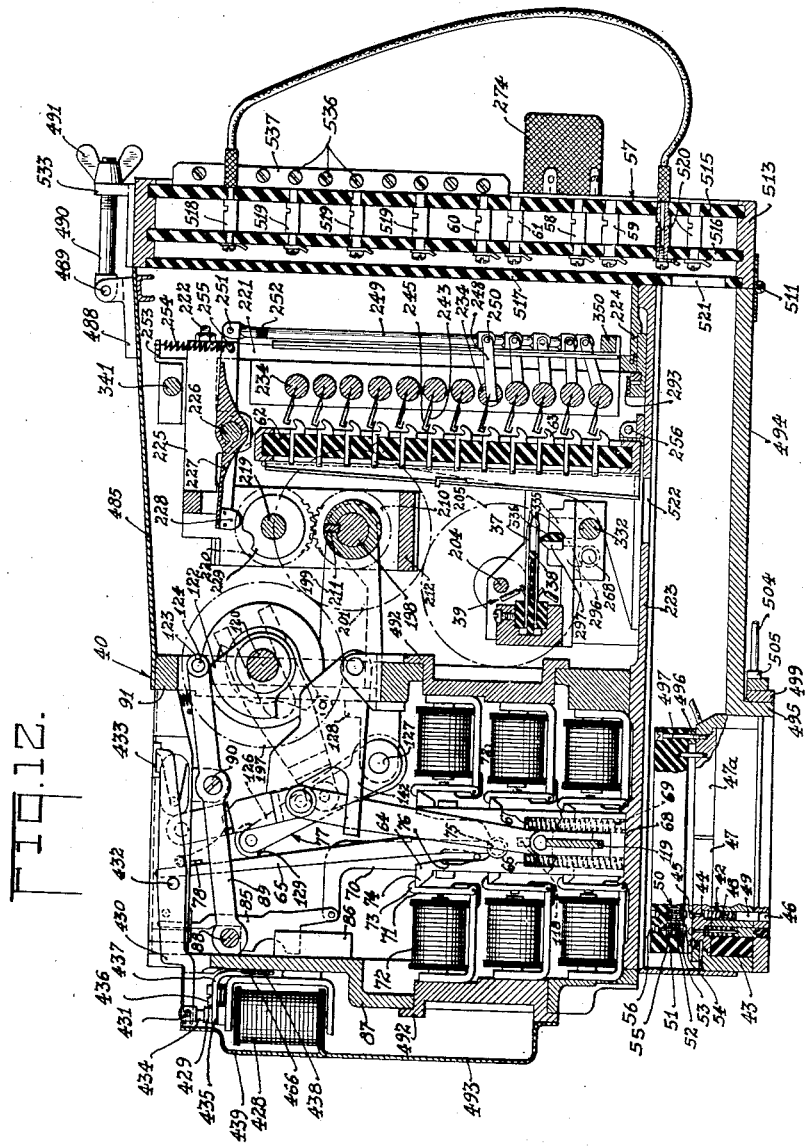
Figure 12 is a cross-sectional view of the translator along the line 12—12 of Fig. 5.

The plungers 42, referring to Fig. 12, consist of a metallic rod 44 having an enlarged head 45 at one end and having the opposite end straight knurled. The block of insulation 43 has a plurality of holes 46 drilled therein, and these holes are open at their lower ends to admit the ends of the sensing pins 41. A metallic bar 47 and another metallic bar 47a are set into the insulated block 43 end-to-end but insulated from each other. The holes 46 extend through the insulation 43 and into the bars 47 and 47a and concentric with the holes 46 are clearance holes for the metallic rods 44 extending through the bars 47 and 47a.

In assembling, the metallic rods 44 are inserted into the clearance holes so that the knurled portions extend into the holes 46. A spring 48 is dropped onto each of the metallic rods and rods of insulation 49 each having a hole therein are pressed upon the straight knurled portion of the rods 44.

The movable contact members or plungers 42 are in the embodiment shown arranged in forty-five rows with twelve members in each row, six of the same being connected in common by the metallic bars 47 and the other six being connected in common by the bars 47a, thus giving five hundred and forty plungers, corresponding to all index point positions in a forty-five column record.

The so-called "ninety column" or combinational record has two groups of two hundred and seventy index point positions which are available when the bars 47 and 47a are disconnected from each other by means of the switch above referred to, which will presently be described.

When the plungers 42 are actuated by sensing pins 41 in the tabulating machine, due to the presence of punched holes in the records being sensed, they are raised and establish contact with cooperating contact members designated generally by the numeral 50.

The cooperating contact members 50 are grouped in a block of insulation 51, disposed one above each plunger 42, and in rows at substantially right angles to the rows in which the plungers 42 are arranged. This makes the rows of contact members 50 disposed in a manner corresponding to the horizontal rows in the records.

The insulating block 51 has a plurality of holes drilled therein and a metallic insert 52 is placed in each of said holes. Each insert is provided with a rod 53 having a head 54. A spring 55 surrounds the rod 53 and tends to push the same downward. A retainer 56 secured to the rod opposite the head limits the downward movement of the rod 53.

In the embodiment shown, the space between the head 45 of the plunger 42 and the head 54 of the cooperating contact member 50 is normally about one-eighth of an inch, and when a plunger is actuated by a sensing pin it contacts a head 54 of a cooperating contact member moving the same up slightly against the resilient pressure of the spring 55.

The plungers 42 arranged in groups 47 and 47a are interconnected with the multiple switch 39 and with jacks in a plugboard as follows: Referring to Figs. 19a and 19b, the groups 47 are each connected to a contact arm 37 of a multiple switch 39 and the groups 47a are each connected to a cooperating contact arm 38 of a multiple switch 39, in such a manner that each pair of cooperating contact arms in the switch 39 when closed connects all of the plungers 42 in each row in multiple, resulting in forty-five rows, each having twelve plungers 42 electrically connected in multiple.

Each member in the groups 47 and 47a is also connected to a jack in the plugboard 57, those in group 47a being connected to the jacks 60, and those in group 47 being connected to the jacks 61, via a cable 599 (see Figs. 19a and 19b).

The jacks forming the terminals of the groups of plungers are indicated on the plugboard by numbers corresponding to the vertical columns of the records in 5's, for example, 5, 10, 15, 20, etc., in two rows. It will be noted that the lower jacks in each of the two rows are indicated by numerals corresponding to the columns in the lower field of combinational records.

When the switch 39 is closed so that the machine may be used for forty-five column records, the markings on the two lower sets of jacks in these rows is ignored, as the action of the switch connects each corresponding jack in multiple, for example, the jack corresponding to the 15th vertical column in the record and the jack corresponding to the 60th column (of a ninety column record) are connected in common so that either the jack labeled "15" or the jack labeled "60" may be utilized for connecting to the plungers corresponding to the 15th vertical column in the card.

When the contacts of the switch 39 are open, the jacks individually correspond to the columns in the two fields on a ninety column record.

To prevent flow-back, the translator is provided with a novel switching device. This device includes a heavy block of insulation 62 (Figures 19a, 12, 11 and 5) forming a support for a plurality of metallic inserts 63. These inserts are arranged in horizontal rows in the block 62, in groups spaced apart in accordance with mechanical structures which contact these inserts during portions of the operating cycle of the tabulating machine, as will presently be described.

Each of the cooperating contact members 50 is electrically connected to an insert 63. In the embodiment shown there are five hundred and forty cooperating contact members; accordingly, there are also five hundred and forty inserts 63 in the block of insulation 62.

Figure 1:
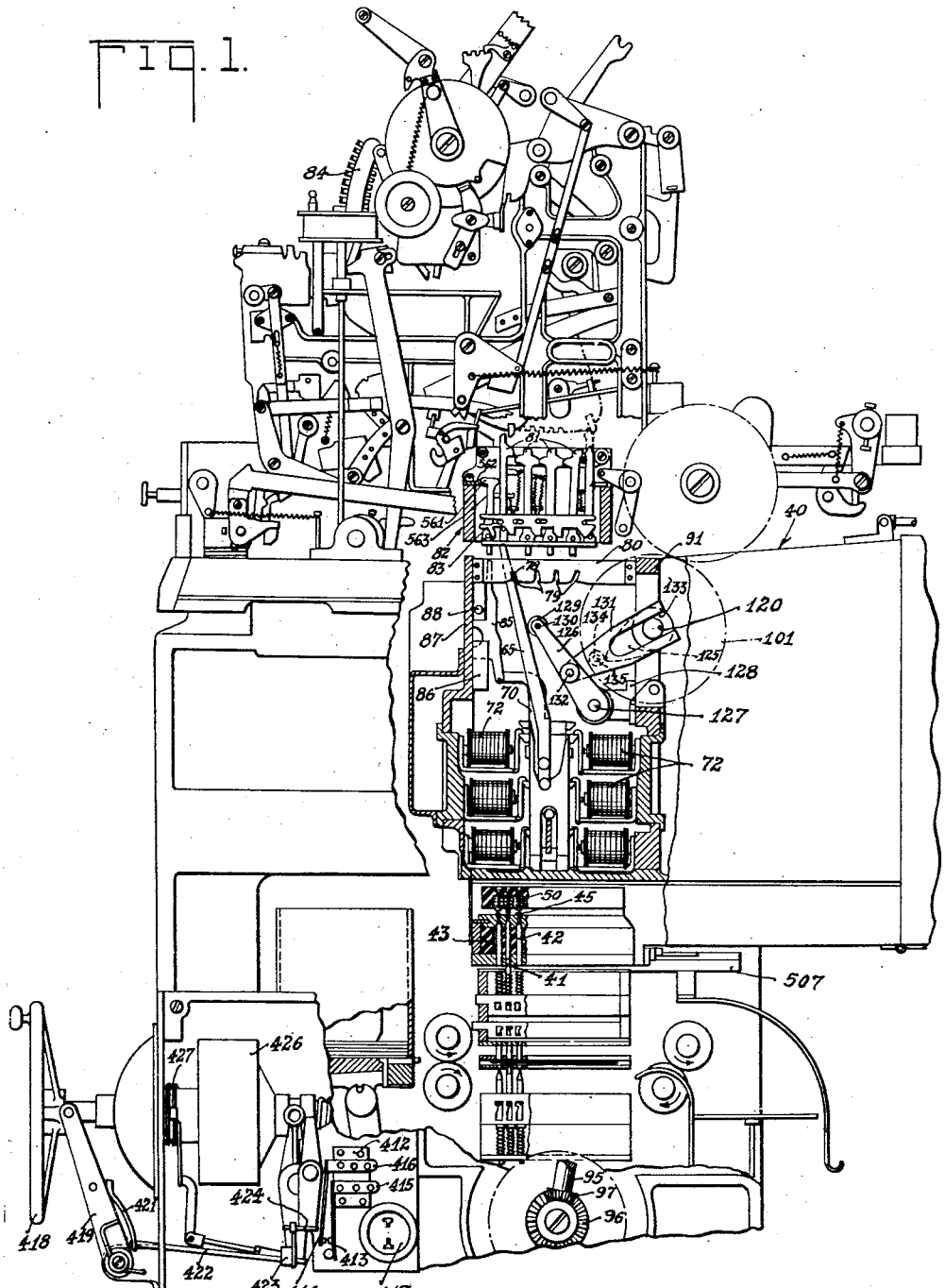
Figure 1 is an elevation partly in section of a tabulating machine of the Powers type showing the improved translator in operative position therein.
Figure 11:
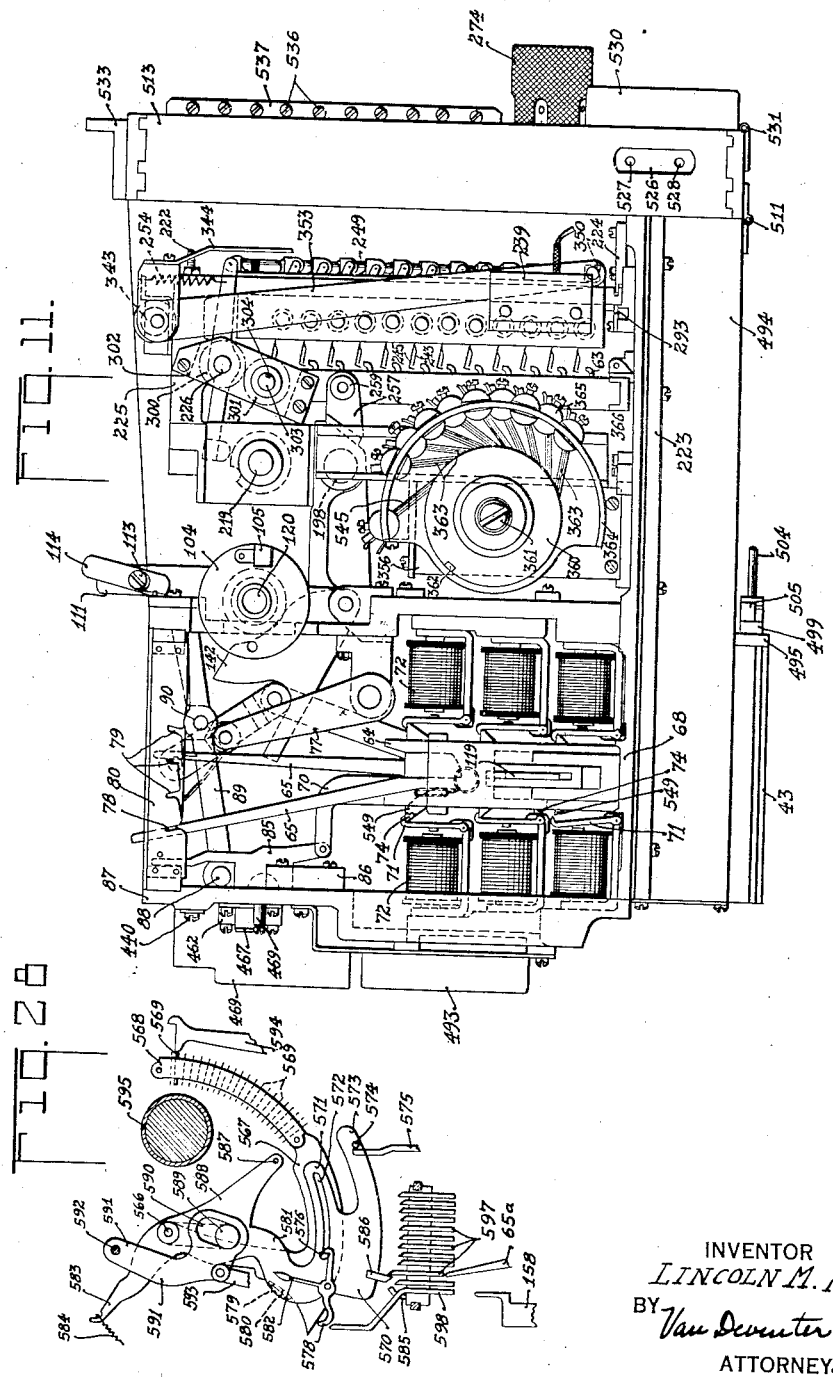
Figure 11 is a left end elevation of the translator as viewed along the line 11—11 of Fig. 5, with the cover removed.

A plurality of slide plates 64 is provided, each of which has pivoted or hinged therein a movable arm 65. (Figures 1, 11 and 12.) The slide plates 64 are also provided with slots 66 and 67 whereby the slide plates may reciprocate upon the U-shaped frame member 68. The frame member 68 carries a plurality of springs 69 (Figure 12), each of which engages a slide plate and tends to force the same upward.

The translator is also provided with a second plurality of slide plates, designated by the numeral 70. The slide plates 70 also reciprocate upon the U-shaped frame member 68 and each is engaged by springs 69 tending to force the slide plate 70 upward. The slide plates 70 do not carry oscillatable moving arms 65 as do the slide plates 64. Instead, they carry a reciprocable interposer which will presently be described.

Normally, the slide plates are held in their lowest positions by armatures 71 of the electromagnets 72. Each armature is provided with a notch 73 which engages a cooperating notch 74 forming an integral part of a slide plate 64, and also a cooperating notch 549, the latter of which forms an integral part of the slide plate 70.

As the slide plates alternate, one slide plate 70 being between each two adjacent slide plates 64, the notches 73 on the armatures are so arranged that each armature engages and holds down both a slide plate 64 and a slide plate 70. To conserve space, the electro-magnets are arranged in tiers and the notches 74 and 549 of the slide plates are so positioned that one of each is engaged by the armature notch 73 of one of the electro-magnets 72. As the electro-magnets are arranged in groups of six, as shown in the drawings, the various slide plates have their notches conveniently arranged for engagement with the armatures of these electro-magnets. These notches may be in any one of six different positions, therefore, it is only necessary to have six differently notched slide plates of each type.

The hinge or pivot supporting the arm 65 on the slide plate 64 is provided with a generous bearing to eliminate side play. Each of the arms 65 is provided with a spring of the "safety pin" type 76, one portion of which engages the arm 65 and the other of which engages the slide plate 64, tending to swing the arm 65 to the right, as viewed in Figure 12.

All of the arms 65 are oscillated by means of a plurality of members 77, the operations of which will presently be described.

Each of the arms 65 is provided with a boss 78, and when the slide plate carrying a given arm is released its boss 78 is engaged by one of a plurality of notches 79 in a rack plate 80. These notches serve to so guide the arm 65 that its end engages a differential stop 81 in the stop pin basket 82. This differential stop pin basket is fully described in the Lasker patent above referred to, therefore, it will not herein be described in detail.

The rack plate 80 is provided with four notches 79, each of which may guide the end of the arm to one of the stop pins 81. The stop 83 which might be termed the "9" stop, changes the value of the position in which the type sector 84 comes to rest if one of the stops 81 has previously been actuated, or if 83 is operated alone, the type segment 84 will come to rest in a position to print a "9".

Each of the slide plates 70 is provided with a reciprocable interposer 85 which may reciprocate in a suitable guide 86 secured to the frame 87.

During the portion of the machine cycle in which the arms 65 are oscillating, the interposers 85 are held down against any movement by a rod 88 carried by a plurality of levers 89 provided with suitable bearings, one of which is shown at 90 supported in the casing 40.

As above mentioned, the rod 88 prevents the interposers 85 from moving during the time the arms 65 are oscillated. It may be also pointed out that each magnet armature engages both a slide plate 64 which carries a moving arm 65 and a slide plate 70, which carries an interposer 85. Now, as during the movement of the arms 65 a magnet releases a slide plate carrying an arm 65, the other slide plate can not move due to the fact that the rod 88 holds the interposer 85 secured thereto, preventing the slide plate 70 from moving. After the magnet is deenergized and the moving arms 65 complete their cycle of movement, the armature returns to its normal position and reengages the notch on the slide plate 70. (Fig. 11.)

If the magnet receives a second impulse, due to the presence of a second hole in the combination, for example, a "9" hole, the armature 71 is again attracted by the magnet, thereby releasing the slide plate 70 and allowing a spring 69 to propel the same upward whereupon the interposer 85 engages the "9" stop pin in the pin basket 82, and the stops 81 swing over to the left, as viewed in Fig. 1, changing the position value at which the type carrier 84 comes to rest.

Each of the slide plates 64 and 70 has a slot 118 (Figure 12) formed therein, and a resetting bar 119 extends through all of these slots for resetting the slide plates which have been actuated during a card cycle of the machine. The mechanism for moving the resetting bar 119 will presently be described.

Figure 5:
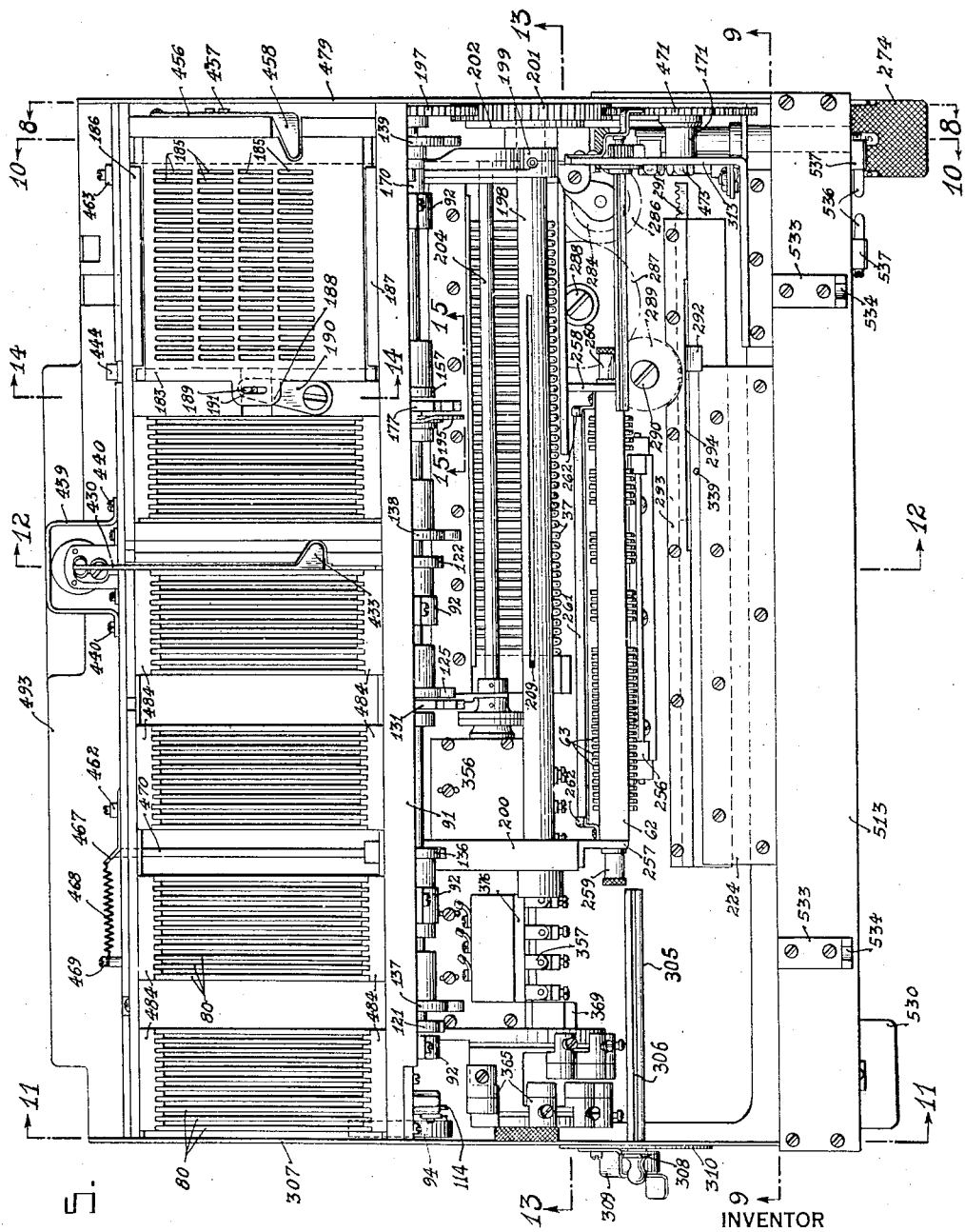
Figure 5 is a plan view of the improved translator with a portion of the cover removed, showing the relative positions of the moving interposers, impulse distributor, circuit interrupters, and various other parts of the device.

The main shaft 120 of the translator is supported on the frame member 91 by a plurality of suitable bearings 92 (Figure 5). One end of the shaft 120 is provided with a key 93 (Figure 17), and a clutch member 94 has a hole therethrough with a key slot formed therein. The hole forms a working fit on the shaft 120 and the key slot engages the key 93 and drives the shaft when the clutch member engages a cooperating member, which will presently be described.

A shaft 95 on the tabulating machine is driven by the bevel gears 96 and 97 in timed relation to the operating cycle of the tabulating machine (Figures 16, 17 and 18). The upper end of the shaft 95 of the tabulating machine has secured thereto a bevel gear 98 which meshes with the bevel gears 99 and 100. The bevel gear 99 is secured to a spur gear 101 which freely rotates on a stub shaft 102 which is supported on a web 103 in the frame of the tabulating machine. The spur gear 101 drives mechanism for effecting the adding and printing functions of the tabulating machine, and this mechanism is well-known and need not here be described in detail.

The bevel gear 100 is also rotatably supported on the shaft 102 and forms the other half of a clutch member cooperating with the clutch member 94.

In order that the main shaft 120 of the translator may be properly indexed with the tabulating machine, the clutch member 94 must engage the member 100 at one specific point. The flat face 104 of the bevel gear 100 has a notch 112 formed therein and the member 94 carries a pawl 105 which is supported thereon by a suitable pivot 106. The pawl 105 is forced to the left, as viewed in Fig. 17, by a spring 107.

The clutch member 94 is provided with a groove 108 and in order to move the clutch member 94 back and forth on the key 93 in the shaft 120, a yoke 109 rides the slot 108 and is pivoted on the frame member 91 by means of a shoulder screw 110.

Extending upward from the pivot screw 110 is a lever 111 integral with the yoke 109 provided for shifting the clutch member 94 into and out of engagement with the member 100.

In order to lock the clutch member 94 with its pawl 105 engaging the notch 112 in the member 100, a locking device is provided. A pivot screw 113 in the lever 111 forms a bearing for a locking lever 114.

The locking lever 114 engages a slot 115 formed in the plate 116. A pin 117 is secured to the locking lever 114 and extends into a cavity formed in the lever 111. A hole in the lever 111 transverse to the pin 117 carries a spring bearing against the pin 117 which tends to retain the locking member 114 in engagement with the slot 115 in the plate 116, thereby locking the clutch member 94 into engagement with the member 100.

When the clutch member 94 is engaged with the member 100, the translator is properly indexed with the tabulating machine and the shaft 120 makes one complete revolution for each card cycle of the tabulating machine.

The shaft 120 has secured thereto a plurality of cams, Figures 12 and 5. The cams 121, 122 are provided for restraining the reciprocable interposers 85 during the time the movable arms 65 are oscillating. The rod 88 for engaging the interposers 85 is supported at each end by levers 89 which are pivoted on bearings 90, as above described. Each one of the levers 89 carries a roller 123 supported on a stud 124 in the lever 89. These rollers are engaged by the cams 121 and 122 and as the cams rotate with the shaft 120 the levers 89 are actuated and the rod 88 is moved up and down relative to the interposers 85. The cams 121 and 122 are so timed that they hold the interposers down through the medium of the rod 88 during that portion of the cycle in which the arms 65 are oscillated. The angular period of this holddown relative to the movement of the tabulating machine and to the movement of other elements in the translator will presently be described in connection with Figures 20 and 21.

The shaft 120 also carries a cam 125, Figure 1, for oscillating the movable arms 65.

A plurality of cranks 126 is supported on a shaft 127 which is provided with suitable bearings one of which is designated by the numeral 128 secured to the frame member 91. Each pair of cranks 126 carries at its extreme ends a roller 129 rotatably supported on a pivot pin 130. The roller 129 engages a group of movable arms 65. A yoke 131 is pivoted on a pivot shaft 132 carried by the crank 126. A slot 133 formed in the yoke 131 straddles the shaft 120. A roller 134 is supported on the roller shaft 135 carried by the yoke 131.

As the shaft 120 rotates, the cam 125 moving therewith (Fig. 1) engages the roller 134 and moves the yoke back and forth in accordance with the contour of the cam. The slot 133 straddling the shaft and the linkage between the yoke and the crank 126 causes the yoke 131 to move in a definite path. The yoke 131 oscillates the crank 126 through an arc having a center in the shaft 127. The movable arms 65 bear against the roller 129 due to the influence of the safety pin springs 76. Therefore, when the crank 126 is oscillating to the right, as viewed in Fig. 1, the arms 65 follow the roller 129 due to the spring tension. When the crank 126 starts its movement to the left, as viewed in Fig. 1, the roller 129 moves the arms 65 all back to the starting position, where they may begin movement in the succeeding card cycle. As above explained, the magnets 72 upon becoming energized release slide plates 64 and allow springs 69 to propel the slide plate or plates upward and the arm boss 78 may engage a slot 79 in the rack plate 80. The cam 125 is so timed that this can only happen during the sweep of the arms 65 toward the right, as viewed in Fig. 1. The sweep of the arms 65 toward the left is effected during the resetting period. The movement of the sweeps relative to the angular movement of the tabulating machine will be described in connection with Figs. 20 and 21.

The shaft 120 also carries cams 137, 138 and 139, see Figure 5, which are provided for actuating the resetting bar 119.

Figure 10:
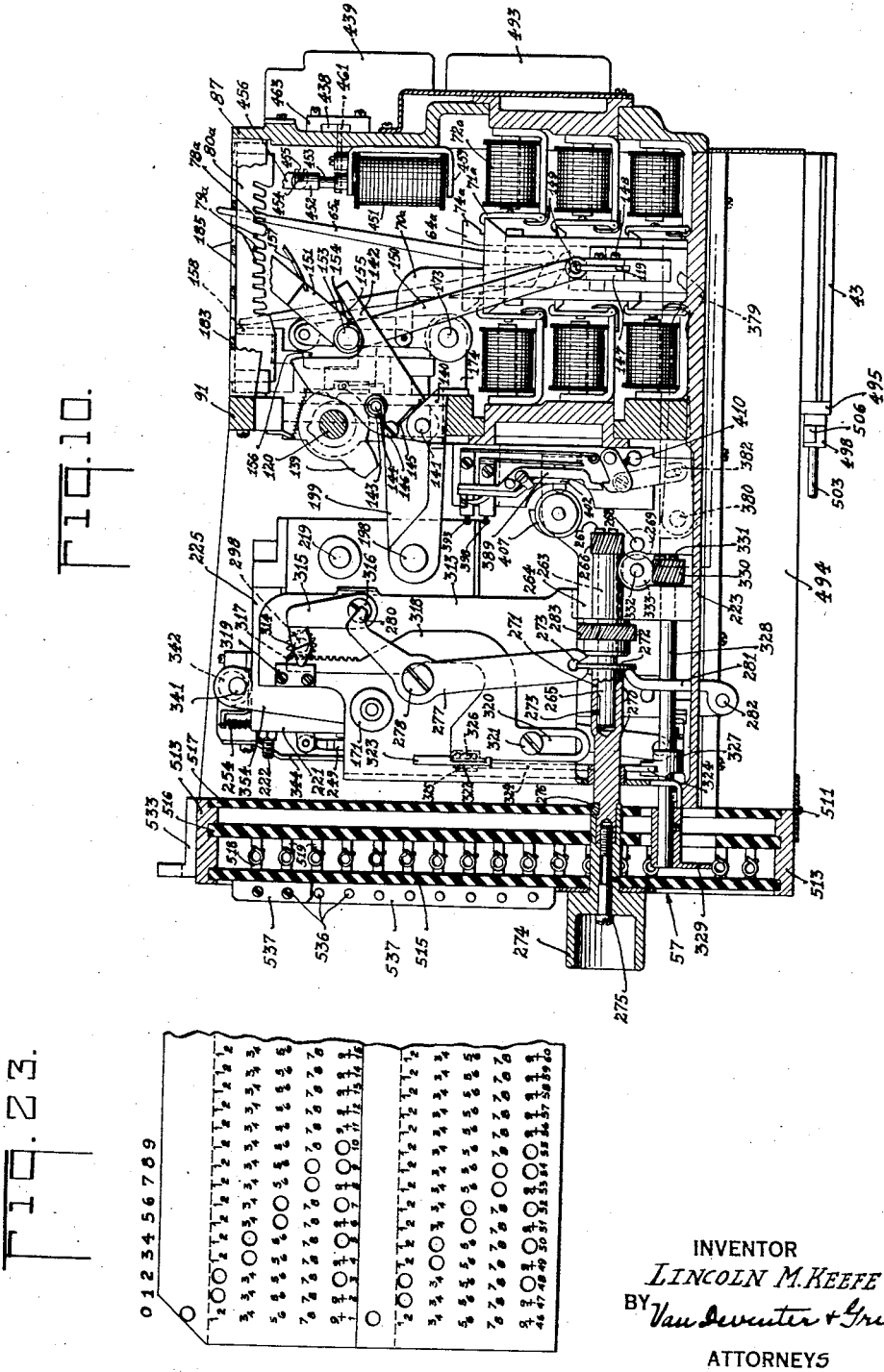
Figure 10 is a sectional elevation of the improved translator along the line 10—10 of Fig. 5.

Referring to Fig. 10, a supporting member 140 is secured to the frame member 91 and carries a pivot shaft 141. A camming yoke 142 is pivoted on the pivot shaft 141. The end of the camming yoke opposite the pivot shaft is cut out in the form of a V, the two angular sides forming the V being adapted to cam against the knee of a toggle joint which will presently be described.

The camming yoke 142 is slotted at right angles to the V and carries within said slot a roller 143 rotatably mounted on a pin 144. The roller 143 is in line with the cam 139 and is adapted to be actuated thereby. In order to keep the roller 143 in contact with the cam 139 a spring 145 secured to the camming yoke 142 by means of a screw 146 has one end thereof pressing against the supporting member 140, and the other end against the pin 144.

The resetting bar 119 has a yoke 147 secured thereto by screws 148. The upper end of the yoke 147 is bored out to accommodate a pivot pin 149 which supports a lever 150. A second lever 151 is secured to the upper end of the frame 91 by means of pivots 152. The lever 150 and the lever 151 are secured together by a shaft 153. The upper end of the lever 150 is positioned within the transverse slot formed in the camming yoke 142 and normally the shaft 153 is positioned at the bottom of the V formed in the yoke 142. The shaft 153 also carries a plurality of rollers 154 which are engaged by the camming surfaces 155 and 156 of the V formed in the member 142. A spring 157 secured to the frame 91 bears against the upper lever 151 tending to keep the levers in such position that the rollers 154 are at the bottom of the V formed in the member 142.

When the cam 139 rotates, its lobe through the medium of the roller 143 swings the camming yoke 142 in a clockwise direction about the pivot shaft 141, as viewed in Fig. 10, whereupon the camming surface 156 acting against the rollers 154 moves the knee of the toggle joint formed on the shaft 153 to the right, thereby forcing down the resetting bar 119. The reset bar positioned in the slots 118 of the slide plates 64, 70 and the alphabetic slide plates which will hereinafter be described, forces all of said slide plates downward against the springs 69, whereupon all of the slide plates which had been previously released are reengaged by the armatures 71 of the magnets 72, placing the translator in condition for the succeeding card cycle.

Referring to Fig. 12, the camming yoke 142 is shown in the actual resetting position.

The shaft 120 also carries a cam 136, Figures 5 and 13, for resetting the solenoids which are provided for effecting certain functions. The solenoids and the operation thereof will presently be described.

Figure 14:
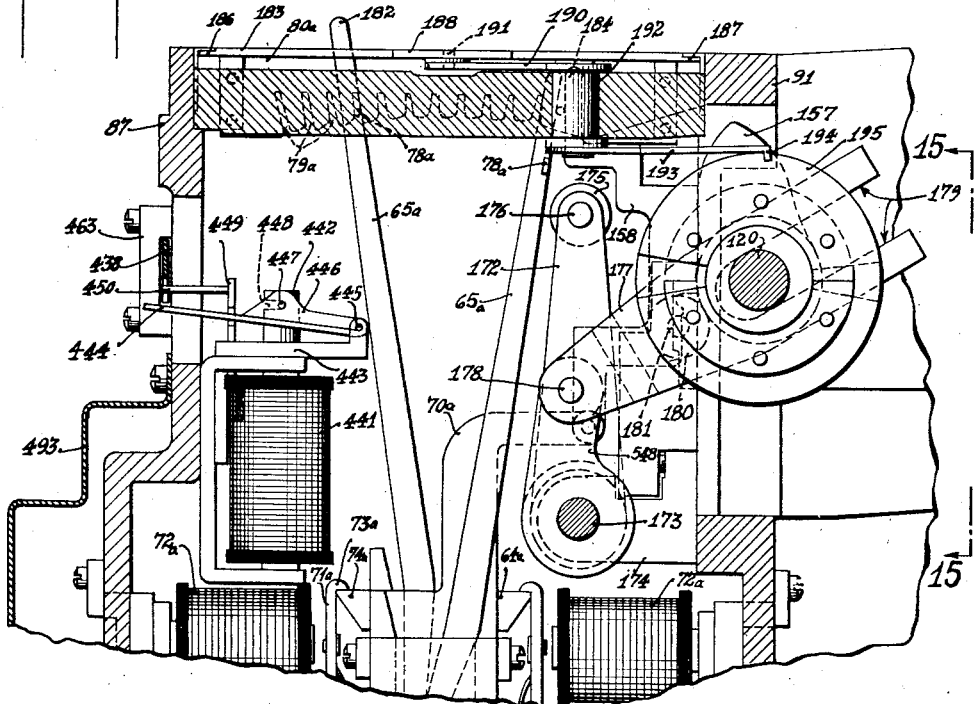
Figure 14 is a sectional elevation of a portion of the improved translator as viewed along the line 14—14 of Fig. 5.
Figure 15:
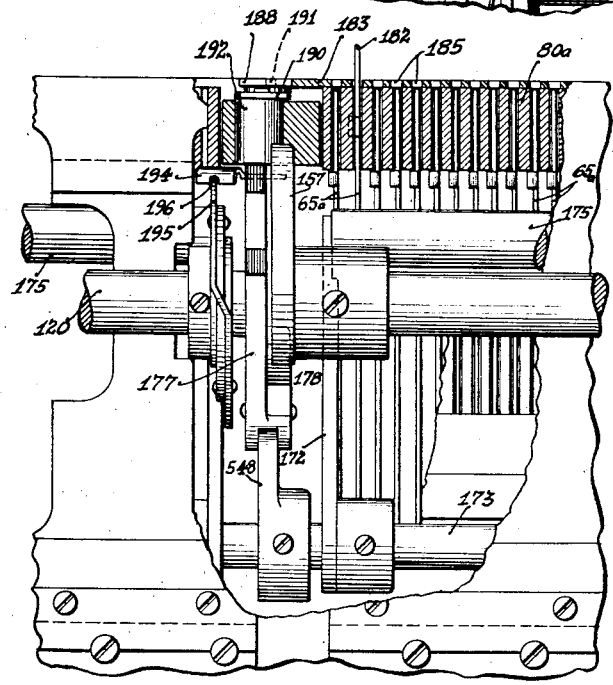
Figure 15 is a fragmentary view taken along the line 15—15 of Figs. 5 and 14.

The shaft 120 also carries a cam 157, Figures 5, 14 and 15, for oscillating the moving arms for engaging stops governing the setting of alphabetical characters.

In the alphabetical section of the machine, the arrangement of the tape sectors and of the stop pin basket is as described in the patent to Foster referred to above. As the stop basket has twelve stops in each row, the translator must be capable of setting any of these stops either singly or in combination.

The alphabetical rack plates 80a are each provided with eleven notches 79a so that the moving arm 65a is capable of engaging eleven of the stops in the alphabetical section of the tabulating machine. The twelfth stop is actuated by a reciprocable interposer 158. The movable arms 65a are pivotally supported on slide plates 64a. The movable arm slide plate structure 64a, 65a is identical in structure to that of the movable arm slide plate structure 64, 65 above described in connection with the numerical section of the machine. The slide plates 64a are provided with cooperating notches 74a which are engaged by armatures 71a and controlled by electro-magnets 72a. Each armature 71a, in addition to holding down a slide plate 64a, also engages and holds down a slide plate 70a in the same manner, as described above in the numerical section of the translator. Each of the slide plates 70a has connected thereto one of the reciprocable interposers 158.

The reciprocable interposers 158 are held down in a novel manner detailed in Figure 26. A slotted plate 159 is secured to the frame member 91, the slots being provided to accommodate the interposers 158. The interposers 158 have notches 160 formed therein to clear the pawl 161, which is pivoted on the pivot shaft 162 in the plate 159. The pawl 161 has an extension 163 which is normally held against a stop 164 by means of a spring 165 engaging the extension 163 and engaging a lug 166 secured to the frame member 91. When the pawl 161 is held in normal position against the stop 164 by means of the spring 165, the pawl engages an ear 167 of each of the reciprocable interposers 158.

A plurality of springs 168 are supported in the member 159, each bearing against one of the reciprocable interposers 158, augment the action of the springs 69a which act against the slide plates 70a and tend when released to propel the slide and its associated interposer 158 upward.

The extension 163 of the pawl 161 carries a bumper 169. The shaft 120 carries a cam 170 which is provided for actuating the pawl 161. The cam engages the bumper 169 and thereby swings the pawl 161 clear of the ears 167 so that a magnet 72a may attract its armature 71a when it receives an impulse due to a second hole in the combination in the record, and release the slide plate 70a with which it is associated. For example, a second hole in the combination might be a hole "L" in the "12" index point position in the record. Referring to Fig. 24, the "12" index point position is in the top row in the record.

The movable arms 65a in the alphabetical section are oscillated in the following manner: A cam 157 is mounted on the shaft 120. A plurality of cranks 172 is supported on the shaft 173 which is provided with suitable bearings one of which is designated by the numeral 174 secured to the frame member 91. A pair of the cranks 172 carry at their extreme ends a roller 175 rotatably supported on a pivot pin 176. A yoke 177 is pivoted on the shaft 178 carried by the crank 548. A slot 179 formed in the yoke 177 straddles the shaft 120. A roller 180 is supported on a roller shaft 181 carried by the yoke 177. The roller shaft 176 is supported by two cranks 172 and the roller 175 rotatably positioned thereon engages a group of movable arms 65a. The crank 548 and the cranks 172 are secured to the shaft 173, and the action of the cam 157 against the roller 175 carried by the yoke 177 causes the shaft 173 to oscillate, due to the fact that the yoke member 177 is pivotally supported by the crank 548.

Referring to Fig. 14, the crank 172 is shown as having just completed its path of travel to the right and during this path of travel one of the arms 65a was released and is shown as engaged by the fourth notch from the left in the rack plate 80a. In the fourth position, the end 182 of the movable arm 65a engages the fourth stop, which in turn sets the type segment in position to print a "H". The position in the engaged arm 65a, as shown in Fig. 14, is the position it assumes after the grid plate 183 has been actuated, as will presently be described.

During the resetting period of the tabulating machine and the translator, the cranks 172 are moved to the left, as viewed in Fig. 14, due to the action of the cam 157 against the roller 180 causing all of the arms 65a to move to a position just to the left of the left end notch 79a in the rack plate 80a.

At the beginning of the succeeding card cycle of the tabulating machine, the cam 157 allows the crank 172 to move to the right, and if a magnet 72a receives an impulse and attracts its armature 71a, a slide plate 64a is released and propelled upward where the boss 78a on the arm 65a engages the notch in the rack plate immediately above, and the arm 65a comes to rest against the lower surface of the grid plate 183. During the travel of the arms 65a to the right, the pawl 161 acting against the reciprocable interposer 158, prevents the slide plates 70a from moving when a magnet 72a is actuated, due to a single impulse, thereby attracting the armature 71a and releasing a slide plate 64a. Each armature 74a, as pointed out above, engages one slide plate 64a and one slide plate 70a. After the arms 65a have completed their travel to the left, as viewed in Fig. 14, the cam 170 (Fig. 26) engages the bumper 169 on the pawl 161 and moves the pawl out of engagement with the interposers 158 so that if any of the magnets 72a receive a second impulse, a slide plate 70a will be released and a reciprocable interposer 158, together with the slide plate 70a, will move upward with the end 184 of the interposer resting against the grid plate 183.

It may be pointed out that in the numerical section of the translator, Figure 1, the moving arms when released directly engage stops in the tabulating machine, and if the magnet receives a second impulse, a "9" interposer 85 moves upward and engages the stop 83, which allows the other stops to move an additional step to the left as viewed in Figure 1.

In the alphabetical section, turning back to Figures 14 and 15, it has been found preferable where two stops are to be engaged for controlling one type bar, to have both members actuating said stops engage the stops simultaneously. For this reason, the moving arms 65a and the interposers 158 although actuated at different times come to rest with their ends against the grid plate 183.

The grid plate 183 consists of a metallic plate having a plurality of perforated slots 185 formed therein. In the embodiment shown there are twenty rows of slots, spaced apart a distance equal to the distance from center line to center line of the moving arms 65a. The slots 185 are the same width as the space between adjacent rack plates 80a.

The grid plate is adapted to reciprocate on the frame, the slides 186 and 187 being provided for that purpose. A projecting ear 188 of the grid plate 183 has a slot 189 formed therein, as can be seen in Figure 5. A crank 190 carrying a pin 191 which engages the slot 189 is secured to a vertical shaft 192 journaled in the frame. The lower end of the shaft 192 has secured thereto an arm 193, Figures 14 and 15, which has a bent portion 194 having a slot 196 formed therein.

A cam 195 of the drunken screw type is secured to the shaft 120 and is engaged by the slot 196 so that, as the shaft 120 rotates the arm 193 will be oscillated by the cam, and through the medium of the shaft 192, the crank 190, and the pin 191 engaging the slot 189, the grid plate is reciprocated in the slides 186 and 187.

Normally the grid plate 183 is positioned relative to the rack plates 80a in such manner that the metal between the slots 185 in the grid plate is immediately above the spaces between the rack plates 80a, therefore when arms 65a and/or interposers 158 are released they come to rest against the metal grid plate and at the proper time in the machine cycle the cam 195, through the linkage described, shifts the grid plate until the slots 185 are above the spaces between the rack plates 80a, thereby allowing all of the members to engage the stops (for controlling the type bars) simultaneously. As stated above, the grid plate 183 is normally positioned with the metallic portions between the slots 185 in line with the spaces between the rack plates 80a. The timing of the shaft of the grid plate will be hereinafter detailed angularly in terms of the angular movement of the main drive of the tabulating machine, in connection with Figures 20 and 21.

The resetting of the slide plates 64a and 70a is effected by means of the resetting bar 119 at the same time and in the same manner as that described for the slide plates 64 and 70. The shaft 120 also carries a gear 197, Figure 8 and also Figure 5. A shaft 198 supported in bearings 199 and 200 secured to the frame 91 carries a gear 201 which meshes with the gear 197. The gears 197 and 201 are preferably of the same pitch diameter so that when the shaft 120 makes one revolution the shaft 198 also makes one revolution.

The gear 201 has secured thereto a disk 202 having a notch 203 formed therein. The function of this disk will presently be described. A shaft 204 supported in suitable bearings carried by the frame 91 has secured thereto a gear 205. This gear is preferably of the same pitch diameter as that of the gears 197 and 201 so that the shaft 204 will rotate in the same direction as the shaft 120 while the shaft 198 rotates in an opposite direction with that of shaft 120.

The shaft 204 carries one half 207 of the coupling 206. The function of the coupling will be presently described.

The shaft 198 is provided with a keyway 209, Figure 5, and a gear 210, Figure 12 and also Figure 31, is provided with a key 211. The key 211 engages the keyway 209 and the gear 210 may be slid to any desired position on the shaft 198 and yet be positively driven by the shaft 198.

Referring again to Figure 31, a yoke 212 is provided with bearings 213 and 214 which are normally positioned on the shaft 198.

A metallic bar 215 secured to the yoke 212 in any suitable manner, such as by screws 216, also has a bearing (not shown) which normally rides the shaft 198. The distance between the bar 215 and the portion of the yoke containing the bearing 214 is a few thousandths longer than the length of the gear 210 and its hub 217.

The yoke 212 is also provided with a bar 218 which is mounted parallel to the bar 215. A shaft 219 is rotatably supported in the yoke and in the bars 215 and 218, and a gear 220 keyed to the shaft 219 and meshing with the gear 210 causes the shaft 219 to rotate when the shaft 198 is rotated.

The yoke 212 is secured to a slidable panel, designated generally by the numeral 221, by any suitable means, such as bolts 222, in the upper right hand portion of Figure 12, and extensions 225 in the lower right hand portion of Figure 12 serving as spacers between the yoke 212 and the panel 221. The panel 221 is slidably mounted on the base 223 on ways indicated by the numeral 224, Figures 5, 11 and 12. The method of sliding the panel 221 relative to the base 223 will presently be described.

The extensions 225 have journaled therein an eccentric shaft 226, Figure 12. This shaft may have several portions thereof eccentric relative to each other.

A plurality of rocker arms 227 are carried by the shaft 226. Each rocker arm is provided with a bumper 228 which is preferably made of horn fibre or the like.

The shaft 219 carries a plurality of cams 229, Figure 12, and also Figure 31, each of which is adapted to engage a bumper 228 carried by a rocker arm 227. These cams may be set for any desired timing and are positively driven in timed relation to the tabulating machine through the gears 197, 201, the shaft 198, the gear 210 and the gear 220, which is fixed to the shaft 219. The gear 210, as stated above, is positioned on the shaft 198 and has its keyway engaging the key 211, when the shaft is positioned in the bearings 213 and 214 in the yoke 212.

The panel 221 has secured thereto extended rearwardly toward the yoke 212, insulating bars 230, 231 and 232, shown in detail in Figure 31.

The bars 230 and 231 of insulating material form bearings for a plurality of metallic rods 233, and the bars 231 and 232 of insulating material form bearings for a plurality of metallic rods 234. Although the bar 231 forms bearing supports for both the rods 233 and 234, these rods are insulated from each other by means of a strip of insulation between adjacent ends thereof (not shown).

All of the plurality of rods 233 are electrically connected in common by means of metallic inserts 235 and 236 which are set into adjacent faces of the bars 230 and 231, respectively.

All of the rods 234 in the plurality are electrically connected in common by means of metallic inserts 237 and 238 set in adjacent faces of the bars 231 and 232, respectively.

An insulating block 239 is supported on the bar 230 by studs 240 and is provided with jacks 241 and 242. The jack 241 is electrically connected to the metallic rods 233 and the jack 242 is electrically connected to the metallic rods 234, so that by means of a plug wire either group of metallic rods may be electrically connected in any desired circuit.

All of the metallic rods 233 and 234 are slotted and each carries an elongated contact brush 243. These contact brushes are slotted with a plurality of slots 244 to form a comb, making each of them capable of contact regardless of slight irregularities in the surfaces with which they make contact.

The slotted portion of the rods 233 and 234 also carry metallic strips 245 which are positioned behind the comb-like brushes 243, and the bent portion 246 extends past the edge of the brush 243 and a second bent portion 247, substantially parallel to the portion 245, engages and serves as a restrainer for the comb-like brush 243, and at the same time protects it from mechanical injury.

Each of the metallic rods 234 is provided with an arm 248 and the metallic rods 233 are provided with two arms 248. A push rod 249 is pivoted to each lever 248 by means of a pivot pin 250. Preferably these push rods 249 extend vertically. The upper end of each of the push rods is connected to a rocker arm 227 by means of a pivot pin 251, as shown in Figure 12.

Each of the push rods 249 is made up of tubular members and a short rod of insulation 252 electrically insulates the two tubular portions of each rod from each other, so that no current can flow from one end of a push rod to the other.

A bracket 253 is secured to the upper end of the panel 221 and serves as a support for a plurality of springs 254. A pin 255 in each of the rocker arms 227 is engaged by a spring 254. The tension of this spring keeps the bumper 228 into engagement with the cam 229, and when the shaft 219 rotates, the cutaway portions of the cams 229 allow the rocker arms to rock in a counter-clockwise direction, due to the influence of the spring 254, as viewed in Figure 12, and through the medium of the push rods 249, the metallic rods 233 and 234 are caused to rock in accordance with the contour of the cams 229.

When the metallic rods 233 and 234 are rocked due to cutaway portions of the cams 229, the comb-like contact brushes 243 engage the inserts 63 in the insulating block 62. The insulating block 62 may be termed a "stationary contact panel", with which the comb-like brushes carried by the slidable panel 221 cooperate.

As pointed out above, the inserts 63 which are hook-shaped stationary contacts, are each electrically connected to a cooperating contact member 50.

The stationary contact panel 62 is secured to the base 223 by means of a hinge 256. This hinge allows the panel 62 to be swung forward, after the slidable panel 221 has been removed, to facilitate the service man's inspection or repair of the device.

The panel 62 is held in a vertical position in the device by means of uprights 257 and 258, Figures 11 and 13, which are secured to the frame. These uprights carry plunger knobs 259 and 260, each of which has a spring loaded pin engaging the panel, and holding the same firmly in a vertical position. To release the panel, the plunger knobs 259 and 260 may be pulled, thereby retracting the pins which engage the panel 62, after which it may be swung on the hinge 256, shown in Figure 12.

To protect the wires leading to the inserts or stationary contact members 63, an insulating cover 261 is provided and held in place by brackets 262, shown near the center of Figure 5.

A shaft 263, Figure 10, journaled in the frame member 264 has an extension 265 of reduced diameter. A spiral gear 266 is secured to the shaft 263 by means of a screw 267.

A shaft 268 is carried by the frame at right angles to the shaft 263. A spiral gear 269 is secured to the shaft 268 so that when the shaft 263 is rotated, the shaft 268, through the spiral gearing is also rotated. A shaft 270 has one end thereof in the form of a sleeve 271. The sleeve 271 forms a sliding fit on the extension 265 of the shaft 263, and a key 273 in the sleeve 271 engages a slot or keyway in the shaft extension 265. The end of the sleeve 271 has secured thereto or formed integral therewith, a circular disk 272. An indicating knob 274 has a hub, a portion of which fits the shaft 270 and engages a key 276 in the shaft 270. The hub of this indicating knob passes through the insulating panels of a plugboard, to be presently described, and it is secured to the shaft 270 by means of a suitable screw 275. The indicating knob is knurled and has a plurality of milled spaces for indicating the setting of the slidable panel 221, one position indicating five columns alphabetic; a second, ten columns alphabetic; a third, fifteen columns alphabetic; and a fourth position, twenty columns alphabetic, thereby making it possible to set the machine up to use any desired number of columns of alphabetic with all of the other columns numerical. The details of these settings will presently be described.

A lever 277 supported on a pivot screw 278, carried by the frame, has one end 279 in the form of a fork which rides the disk 272. The other end 280 of the lever 277 is in the form of a tooth. Normally, this tooth clears the disk 202, and if the operator attempts to pull the indicating knob 274 to the left, as viewed in Fig. 8, the tooth 280 of the lever 277 comes in contact with the surface of the disk 202, and prevents the knob 274 from moving to the left. However, if the notch 203 in the disk 202 is positioned in line with the tooth 280 (at the index point of the device), when the operator pulls on the indicating knob 274, the toothed end 280 of the lever 277 passes into the notch 203 and allows the knob 274 and the shaft 270 to move to the left (Fig. 10).

In moving to the the left, the disk 272 engages the crank arm 281 and partly rotates the shaft 282 to which the arm 281 is secured. This unlocks the slidable panel and allows the operator to rotate the knob 274, together with the shafts 270 and 263.

The spiral gear 283 secured to the shaft 263 meshes with and drives a gear 284 shown in lower right hand corner of Figure 13 which is secured to a short vertical shaft 285. The shaft 285 is journaled in suitable bearings and has secured thereto a spur gear 286. A spur gear 287 supported on the base 223 by means of a shoulder screw 288 meshes with the gear 286 and drives a gear 289 secured to the base 223 by a shoulder screw 290 (Fig. 5).

A rack 291 is mounted in a suitable slide 293 on the base 223 and meshes with and is driven by the gear 289. The slide 293 has a longitudinal slot 294 formed therein. A bracket 292, having one end bent at substantially a right angle, is secured to the rack 291 and as the rack is moved back and forth in the slide by means of the gear 289, the bracket 292 moves along in the slot 294. The extended portion of the bracket 292 engages a socket 295, Figure 31, formed in the slidable panel 221.

As the slidable panel 221 is mounted on ways, it is caused to slide back and forth as indicating knob 274 is rotated. At the same time that the shaft 263 is rotated to move the slidable panel 221, the gear 266 drives the shaft 268 through the gear 269. This shaft 268 is made in the form of a plurality of eccentrics, each of which engages a plunger pin 296. Each plunger pin 296 is notched and engages an insulating bar 297.

In the alphabetical section, each insulating bar 297 engages five contact arms 38, so that as the shaft 268 is rotated, one eccentric portion drives the plunger pin 296 and the insulating bar 297 upward, as viewed in Fig. 12, thereby moving five contact arms 38 into contact with five cooperating arms 37. If the shaft 268 is further rotated, the next eccentric engaging a plunger pin and an insulating bar moves a second set of five contact arms 38 into contact with a second set of five stationary contact arms 37, and the first group of five at the same time remain in contact due to the first eccentric. In this way, the machine may be made effective for any number of alphabetical characters up to twenty, in groups of five.

Referring to Fig. 31, the groups of cams 229 between the bar 215 and the bar 218 control the movement of the metallic rods 233 and their associated contact brushes 243 for forty-five column operation. The cams between the bar 218 and the right hand side 212a of the yoke control the movement of the metallic rods 233 and their associated contact brushes 243 for ninety column operation. The cams between the bar 215 and the left hand side 212b of the yoke control the operation of the metallic rods 234 and their associated brushes 243 for alphabetical operation.

The rocker arms 227 engaged by the cams 229 between the bars 215 and 218 (indicated as group "A" in Fig. 31) are supported on an eccentric portion of the shaft 226 and the rocker arms engaged by the cams between the bar 218 and the end 212a of the yoke (indicated as group "B") are supported on another eccentric portion of the shaft 226. The eccentricities of these two portions of the shaft 226 are preferably 180° apart, so that when the shaft 226 is rotated, the rocker arms in group "A" are lowered and their bumpers 228 are in cooperative relation with the cams between the bars 215 and 218. At the same time, due to the other eccentric, the rocker arms in group "A" are raised to a point where their bumpers 228 are out of the range of the cams between the bar 218 and the side 212a of the yoke. The rocker arms engaging cams between the bar 215 and the left side 212b of the yoke are supported on a concentric portion of the shaft 226, so that the rotation of this shaft does not affect the position of the rocker arms in group "C" relative to their cams.

Figure 9:
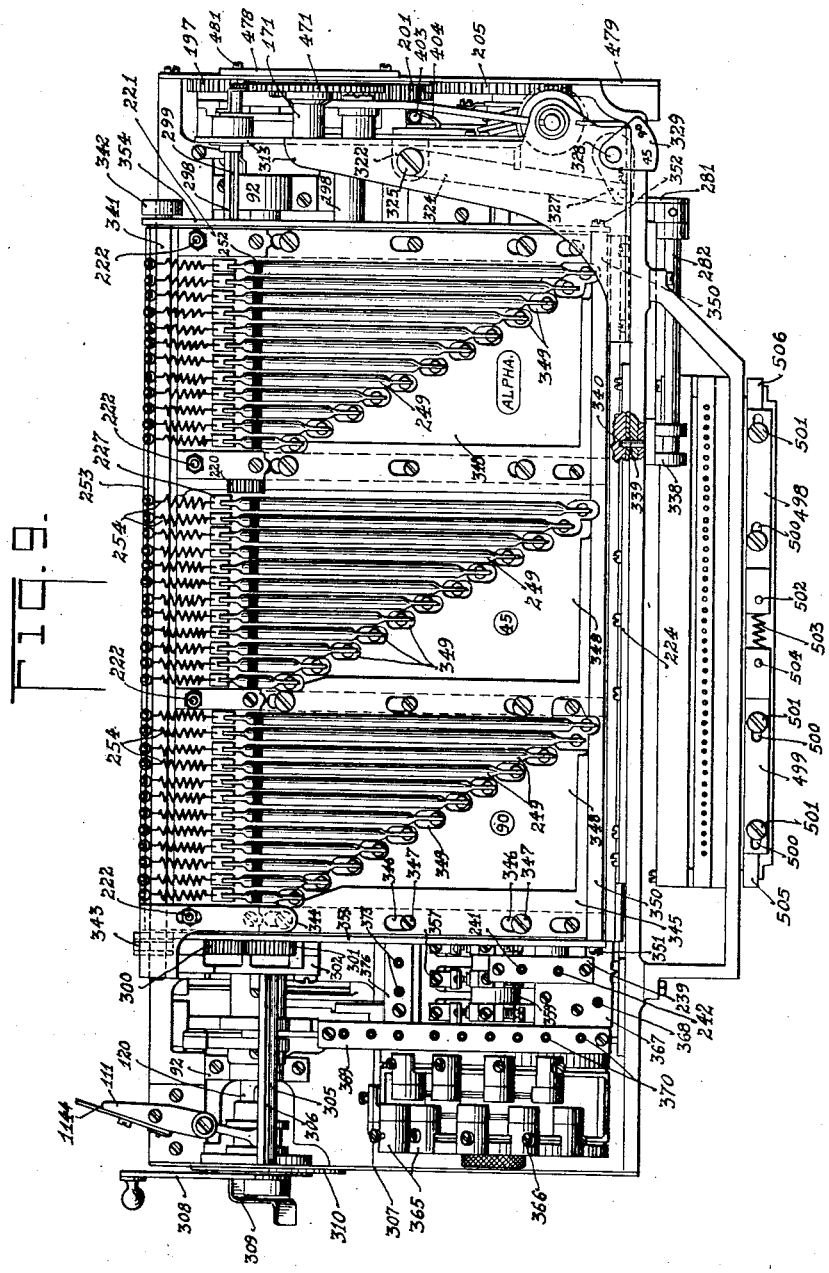
Figure 9 is an elevation taken along the line 9—9 of Fig. 5.

A portion of the straight part of the shaft 226 is hollow and provided with a key, and a shaft 298 having a keyway 299 formed therein, Figure 9, fits into the hollow portion of the shaft 226 with the keyway 299 engaging the key, so that as the slidable panel is moved back and forth, the act of rotating the shaft 226 will cause the shaft 298 to rotate regardless of the position of the slidable panel 221.

The other end of the shaft 226 has secured thereto a gear 300, Figure 11. A gear 301, also seen in Figures 31 and 9, meshes with the gear 300 and is supported and suitably journaled on the panel 221 by means of a gear box 302. This gear has a concentric hole 303 formed therein and is provided with a key 304. A shaft 305 is provided with a keyway 306 and fits the hole 303 in the gear 301 with the keyway 306 engaging the key 304 (Fig. 9). The outer end of the shaft 305 is supported in the end plate 307 and has keyed thereto a lever 308. An arm 309 secured to the end plate 307 serves to protect the end of the shaft 305 and at the same time forms a stop to prevent the lever 308 from being turned a full revolution.

The end plate 307 is provided with a disc 310 having registration holes formed therein, one of which is indicated by the numeral 311.

The lever 308 has secured thereto a registration pin 312 adapted to engage the registration holes 311. The lever 308 is flexible and to disengage the pin 312 from a registration hole, it is only necessary to slightly bend the lever to the left, as viewed in Fig. 9, whereupon the lever may be rotated 180°.

Figure 3:
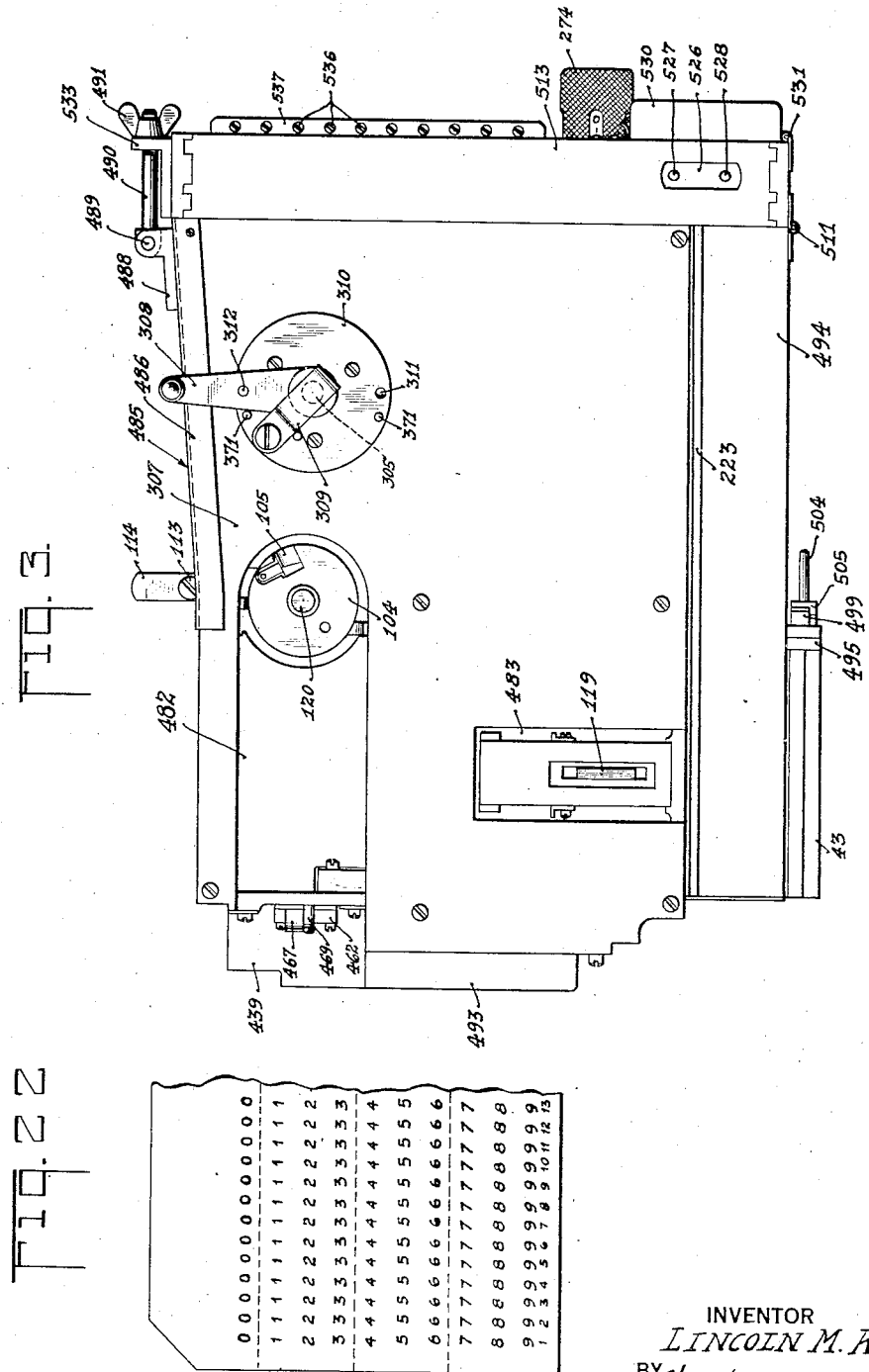
Figure 3 is a left side elevation of the translator.

Referring to Fig. 3, the lever 308 is shown extending upwardly in a vertical position. By pulling the lever outward, as described above, and rotating the same until it points downward, it sets the rocker arms for forty-five column numerical operation. The disc 310 is provided with a plurality of stop pins 371.

To change the translator from ninety column operation to forty-five column operation, or vice versa, it is not only necessary to change the timing of the contact brushes 243, but it is also necessary to connect the bars 47 to their adjacent bars 47a, by moving the contact arms 37 into contact with the contact arms 38. This is accomplished as follows: As pointed out above, one end of the shaft 298 fits into a concentric hole in the shaft 226 and a keyway in this hole engages the keyway 299. The other end of the shaft 298 is journaled in the upright member 313 and has secured thereto a pinion 314. An arm 315 secured to the upright member 313 by means of a screw 316 has a bent portion adjacent to the pinion 314 and retains the pinion and shaft in normal position in the journal in the upright 313, Figures 8 and 10.

A rack 317 meshes with and is driven by the pinion 314. The rack 317 has secured thereto a plate 318 which is moved up and down on the upright 313 when the shaft 298 is rotated. A guide block 319 engages the back and sides of the rack, and a slot 320 in the plate 318 engaging a screw 321 in the upright 313, ensures that the plate 318 will move along a guided course on the upright 313.

The plate 318 has an angular extension 322 which projects through a slot 323 formed in the upright 313. The angular extension 322 is made in the form of an ear disposed at right angles to the plate 318 proper, and a lever 324 is pivotally secured to the ear 322 by means of a shoulder screw 325 and a nut 326. The lower end of the lever 324 is pivotally connected to a bell crank 327. The bell crank 327 is secured to a shaft 328 which is suitably journaled on the base 223. One end of the shaft 328 has secured thereto an indicating device 329.

The other end of the shaft 328 has a spiral gear 330 secured thereto by means of a screw 331.

Figure 2:
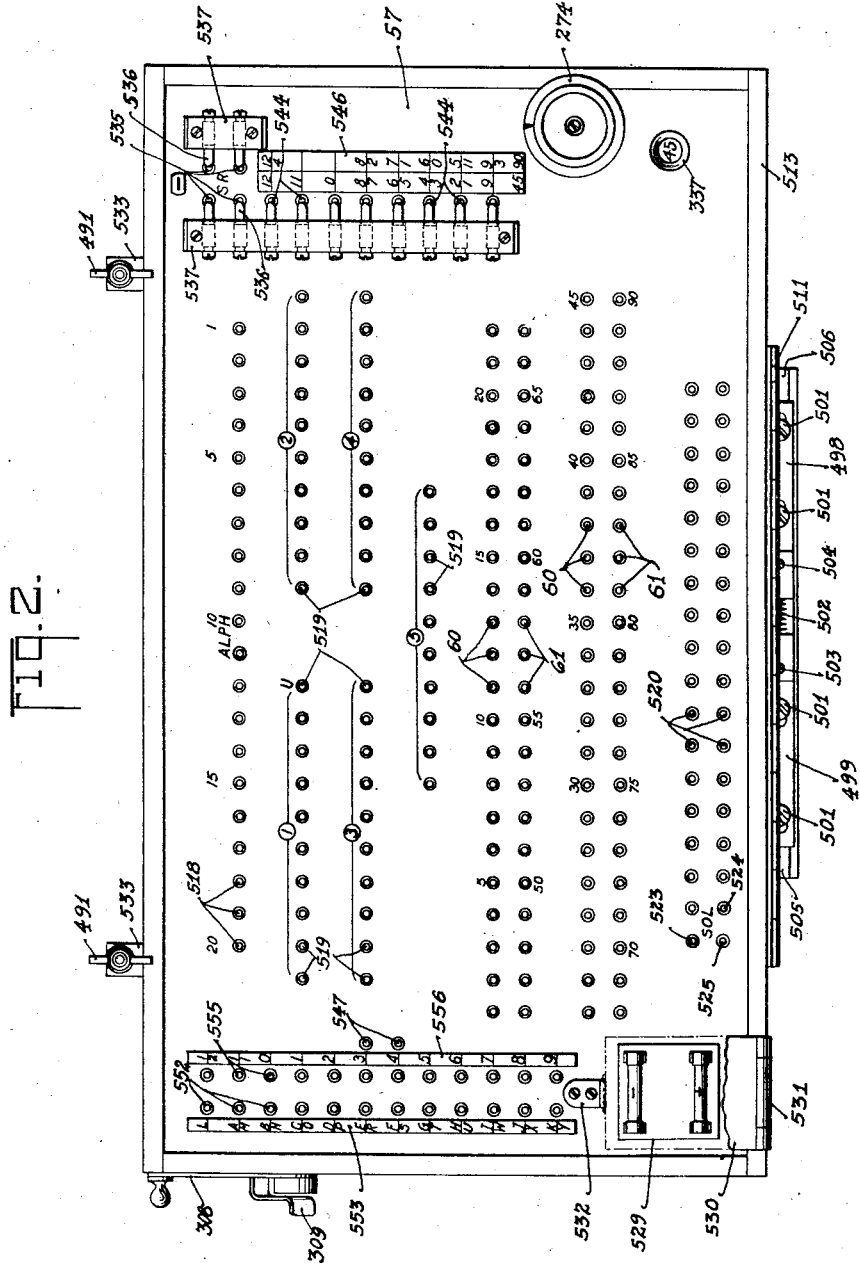
Figure 2 is a front elevation of the improved translator showing the plugboard.

A shaft 332 carried on supports below the multiple switch 39 in suitable bearings has secured thereto a spiral gear 333 which meshes with and is driven by the spiral gear 330. The shaft 332 has cutaway portions 334 which are engaged by plunger pins 335, and an insulating bar 336 is in contact with all of the contact arms 38 so that when the shaft 332 is rotated, the plunger pins 335 gradually engage uncutaway portions of the shaft and through the medium of the bar 336 force all of the contact arms 38 into contact with their cooperating contact arms 37. This occurs when the lever 308 is set for forty-five column operation and at that time the indication "45" on the indicating device 329 shows through a window 337 in the plugboard 57 (Fig. 2).

When the lever 308 is thrown for ninety column operation, the shaft 226 is rotated in a direction opposite to that just described for forty-five column operation, and through the medium of the shaft 298, the pinion 314, the rack 317, the plate 318, the lever 324, the bell crank 327, the shaft 328, and the spiral gears 330 and 333, the shaft 332 is rotated and the plunger pins 335 settle in the cutaway portions 334, allowing the bar 336 and all of the contact arms 38 to move downward and out of engagement with contact arms 37. When in this position, the machine is ready for ninety column operation, the rocking arms in group "B" having been let down into the zone of the cams 229, and the rocker arms in group "A" having been raised out of the zone of the cams, due to the rotating of the shaft 226, and the indicating device shows an indication of "90" through the window 337 in the plugboard 57.

When the knob 274 is pulled out, as above described, to set up for a desired number of alphabetical characters, the disc 272 engages and moves the crank arm 281 in a counter-clockwise direction, as viewed in Fig. 10, thereby partially rotating the shaft 282. The shaft 282 carries an eccentric 338 which is adapted to complete the movement of the pin 339 which is spring loaded to bear against the eccentric. The pin 339 may engage any one of a plurality of holes 340 in the base of the panel 221. In other words, the act of pulling the knob 274 out for a new setting partially rotates the shaft 282 and disengages the pin 339 from a locating hole 340, so that the slidable panel, through the gearing described, may be moved to a new position.

When the knob 274 is pushed in again, the shaft 282 partially rotates in an opposite direction and drives the pin 339 into another indexing hole 340.

A shaft 341 is supported on top of the slidable panel 221, and is provided with an eccentric 342 at one end, as can be seen in Figure 10, and an eccentric 343, shown in Figures 11 and 9, at the other end. A lever 344 is keyed to the shaft 341 and normally lies substantially parallel to the face of the panel 221, Figure 11.

A light frame 345, Figure 9, is slidably supported on the front of the panel 221 by means of a plurality of slots 346 working on shouldered screws 347. The frame 345 is provided with a plurality of insulating plates 348 each having a plurality of clearance slots 349 formed therein to allow the arms 248 to oscillate.

The frame 345 has a cross member 350 at the bottom, one end of which is tapped to accommodate a screw 351 and the other end of which is tapped to accommodate a screw 352.

The eccentric 343 has pivoted thereon one end of a lever 353 and the other end of the lever 353 is pivoted on the screw 351. An eccentric 342 on the other end of the shaft 341 has pivoted thereon one end of a lever 354, and the other end of the lever is pivoted on the screw 352.

When the device is to be serviced and it is desired to remove the slidable panel 221, the serviceman turns the lever 344 to a vertical position, thereby rotating the shaft 341 through an angle of approximately 180°. The eccentrics 342 and 343, through the medium of the levers 354 and 353, respectively, move the cross member 350 and the frame 345 downward to a point where the clearance slots 349 (Figure 9) engage all of the arms 248 and rock and hold them to the position in which the contact brushes 243 are well out of contact with the inserts 63 in the stationary contact member 62, thereby preventing the contact brushes 243 from becoming bent or otherwise mechanically injured.

The shaft 204, Figure 13, carries one half 207 of a flexible coupling 206 as above described, and a shaft 355 journaled in a sub-frame 356 has the other half 208 of the flexible coupling 206 keyed thereto, so that when the shaft 204 rotates, the shaft 355 is driven thereby.

The sub-frame 356, Figures 13 and 30, carries a plurality of pivoted contact arms 357, each of which cooperates with a stationary contact member 358. All of the contact arms 357 are insulated from each other, and all of the stationary contact members 358 are insulated from each other. A plurality of cams 359 are carried by the shaft 355, one for each of the contact arms 357. These cams are provided with lobes to cause the contact arms to engage their cooperating contact points and institute impulses of predetermined timings as will presently be described in connection with Figures 19a and 19b.

The contact arms 357 are mounted on a pivot 372 and each arm has secured thereto a spring 373 which is also secured to the frame 356 by means of a screw 374. The contact arm 357 is also provided with a bumper 375 preferably of horn fibre or the like. The bumper 375 is held into engagement with the cam 359, due to the tension of the spring 373. Each contact arm 357 carries a contact point 376 which is adapted to cooperate with the stationary contact 358.

As the shaft 355 rotates, the cams 359 actuate the contact arms 357 in timed relation to a portion of the operating cycle of the machine. The exact timing of these cams will presently be described in connection with the description of Figures 20 and 21.

The shaft 355 has secured thereto a cylinder of insulation 360 by means of a screw 361, Figure 11. The cylinder 360 has a metallic insert, designated by the numeral 362, adapted to be contacted by brushes 363 which are secured to a semi-circular rim 364, forming an integral part of the sub-frame 356. These brushes 363 are mounted in brush holders 365 which are slotted, and which may be set in any desired angular position and retained in such setting by means of set screws 366. The sub-frame 356 also carries a small panel 367, Figure 9, provided with jacks 368 by means of which electrical connections may be made to the contact members 358. The sub-frame also carries a long panel 369 provided with jacks 370 by means of which electrical connections may be made to any of the brush holders 365. A third panel 376 is secured to the sub-frame 356 and is provided with jacks 377 electrically connected to the contact arms 357.

The connections between the brushes, the contact arms, and the stationary contacts, as well as all of the electrical circuits of the device, will presently be described in connection with the diagram of connections shown in Figs. 19a and 19b.

At the time the tabulating machine is going through a total-taking cycle, it has been found desirable to ensure that no electrical currents can flow in the circuits of the new and improved translator.

Fig. 25 is an exploded view of the sensing means and the total-taking means in the late types of Powers Tabulating Machines. This sensing means and total taking means is illustrated, described and claimed in copending application Serial No. 538,429, filed May 19, 1931, by W. W. Lasker, now Patent No. 2,044,119, issued June 16, 1936. Fig. 25 of the present application combines the elements illustrated in Figs. 19 to 33, inclusive, of said patent. As this mechanism is clearly described in the patent, it is not believed necessary to re-describe the same in the present application. However, the pawl 1397 forming part of the total-taking mechanism of the Powers Machine moves downward appreciably at the beginning of a total-taking operation, and during other cycles of the machine may move up and down a distance of one eighth of an inch or less.

The pawl 1397 has been given a number one-thousand greater than the numeral 397 designating the pawl in the patent.

When the translator is in position in the tabulating machine, a lever 379 in the translator rests upon the pawl 1397. The lever 379 is provided with a suitable pivot 380 so that when the pawl 1397 moves down, the lever 379 moves in a clockwise direction, as viewed in Figs. 8, 10 and 25.

The lever 379 carries a pin 381, and an arm 382 has a slot 383 formed therein adapted to ride the pin 381, allowing for the movement of the pawl 1397 during ordinary cycles of the tabulating machine. A pawl 384 supported on the plate 385 by means of a pivot shaft 386 has an outer end linked to the arm 382 by means of a shouldered screw 387. The pawl 384 is provided with a ratchet 388 adapted to engage the end 390 of the lever 389 and actuate the same.

A post 410 mounted on the plate 385 carries a spring 411 which bears against the pawl 384.

The lever 389 is mounted on a pivot shaft 391 in the plate 385. A bracket 392 insulatedly supported on the plate 385 is provided with terminal screw 393 and forms a support for a contact spring 394 and a contact point 395 secured thereto. An insulating post 396, secured to the plate 385, serves to restrain the movement of the spring 394 in the direction of the lever 389. A bracket 397, also insulatedly supported on the plate 385, is provided with a terminal screw 398 and carries a contact spring 399 provided with a contact point 400.

The lever 389 carries a block of insulation 401 of fibre or other suitable material, which engages the contact spring 399, and normally the springs 394 and 399 are positioned with their contact points 395 and 400, respectively, in contact with each other. An arm 402 is pivotally supported on the lever 389 on a pivot shaft 403. The pivot shaft 403 is fixed on the lever 389 at right angles to the pivot shaft 391 which supports the lever 389.

The lever 402 is spring-loaded by means of a spring 404 so that it always comes to rest against a stop 405 carried by the lever 389. The other end of the lever 402 carries a tongue 406 preferably of hardened and ground steel. The tongue 406 is preferably, but not necessarily, in line with the insulating block 401. A cam 407, carried on the shaft 204, might be termed a "two-revolution cam". It is provided with a two-turn thread 408 which terminates in a high portion 409.

When the tabulating machine starts a total-taking operation, the pawl 1397 moves down and the lever 379 follows the same, causing the arm 382 to swing the pawl until its ratchet 388 disengages the end 390 of the lever 389. This allows the lever to move in a clockwise direction, and the spring 399 following the insulating block 401 moves its contact 400 away from the contact 395. The tongue 406 is carried to the root of the thread 408 and as the cam makes two revolutions, the tongue 406 can follow the thread 408 due to the fact that the lever 402 is pivoted at 403. As the tongue approaches the end of the thread which terminates in the high portion 409 of the cam, the lever 402, together with the lever 389, is moved in a counter-clockwise direction (the lever 379 having previously returned to normal position), whereupon the block 401 moves the spring 399 to a position where its contact point 400 contacts the contact point 395. The ratchet 388 reengages the end 390 of the lever 389 and holds the lever in normal position until the tabulating machine starts another total-taking operation.

The reason for providing the "two-revolution cam" is due to the fact that the pawl 1397 on the tabulating machine does not remain raised during the entire total-taking operation. In the arrangement just described, when the terminal screws 393 and 398 are connected in series with a source of current for the translator, the current will be interrupted for two complete revolutions of the tabulating machine, so that no current can flow through the circuits of the translator during a total-taking period.

This device, together with the cam, constitutes a means for disabling all circuits in the tabulating machine during total-taking operations. The connections between the terminals 393 and 398 and the rest of the circuits in the machine may be seen in Fig. 19b.

To prevent any magnet coils or other instrumentalities in the translator from becoming overheated or burned out while the tabulating machine is stopped, means is provided for furnishing current to the translator only while the drive shaft of the tabulating machine is in motion, whether this be driven by the motor or by means of the hand wheel.

A switch 412 secured to the tabulating machine is provided with contact arms 413 and 414 which in normal position have their contacts open. These contact arms are supported on metallic strips 415 and 416, respectively, and a connector socket 417 is connected to the strips 415 and 416 so that the switch may be readily plugged in series with a source of current.

In driving the tabulating machine by hand, the hand wheel 418 is pushed in (to the right, as viewed in Fig. 18) whereupon it engages the lever 419 pivoted on the machine 420, and the arm 421 engages a push rod 422 which, through the medium of the arm 423 and the rod 424, closes the contacts on the arms 413 and 414.

When the machine is driven by a motor, the belt 425 rotates the pulley 426, and the clutch 427 actuates the arm 428 and the linkage connected thereto and closes the contacts carried by the arms 413 and 414. As soon as the hand wheel 418 is released, or as soon as the pulley 426 stops rotating and the clutch 427 is released, the contacts on the arms 413 and 414 open, thereby allowing no current to flow into the circuits of the translator. The method of connecting this switch in the circuit of the translator is shown in the diagram of connections (Figs. 19a and 19b).

The translator is provided with a solenoid 428 having an armature in the form of a plunger 429. This plunger is linked to a lever 430 by means of a pin 431 and the lever 430 is pivoted on the frame on a pivot shaft 432. The outer end 433 of the lever 430 is adapted to mechanically move levers or controls on the tabulating machine for obtaining certain wanted effects or controls. When the solenoid 428 is energized, the armature is pulled downward and the end 433 of the lever is mechanically raised an appreciable amount. The cutaway portion 434 is engaged by a pawl 435 and retained in its low position until reset. The pawl 435 is pivoted on a pivot screw 436 and an extension 437 is positioned adjacent a resetting bar 438. The method of resetting will presently be described.

The solenoid 428 is provided with a suitable cover or housing 439 secured to the frame by suitable means, such as by screws 440, Figure 5.

The solenoid 428 (Figs. 12 and 5), as above stated, actuates the lever 430, the opposite end 433 of which engages a stop which forms an integral part of and the control for a direct subtraction device in the tabulating machine such as that shown and described in co-pending application Serial Number 535,842, filed May 8, 1931, by Lasker and Ruiz, now Patent No. 2,124,177 dated July 19, 1938. The stop referred to above may be the member 262 shown in Figure 1 of said application so that upon the appearance of a perforation in a given column of the record for controlling direct subtraction, an impulse due to said perforation energizes the solenoid 428 and through the medium of a plunger 429 and the lever 430 connected thereto said control for the direct subtraction is made effective.

A solenoid 441, Figure 14, is supported inside the frame and is provided with a plunger armature 442. The solenoid yoke 443 forms the support for an arm 444 carried on a pivot 445. The arm 444 has a turned up portion 446 carrying a pin 447 which engages a slot 448 in the plunger armature 442. A pawl 449 movably mounted on the yoke 443 is adapted to engage the arm 444 when the plunger armature pulls the same down and holds the arm in its down position until the same is reset. The pawl 449 is provided with a pin 450 adapted to be actuated by the resetting bar 438. The end of the arm 444 extends outside the frame and may be utilized to mechanically move levers or controls on the tabulating machine. The end of the arm 444 may be utilized to move the pin 211 shown in U. S. Patent No. 2,066,406, issued January 5, 1937, by W. W. Lasker (Figure 2), in which event said pin 211 would be elongated to reach the end of the arm 444 or a push-rod would be inserted therebetween. A special subtract hole 209 in Figure 13 of said patent is shown as located in the 11th position of column 40 on the card. The jack corresponding to this position would be connected to the terminal of the solenoid 441, so that each time a perforation appears in the "11" position of column 40 the machine would control the setting of the subtract units, or adding and subtracting units, in the manner described in said patent.

Figure 8:
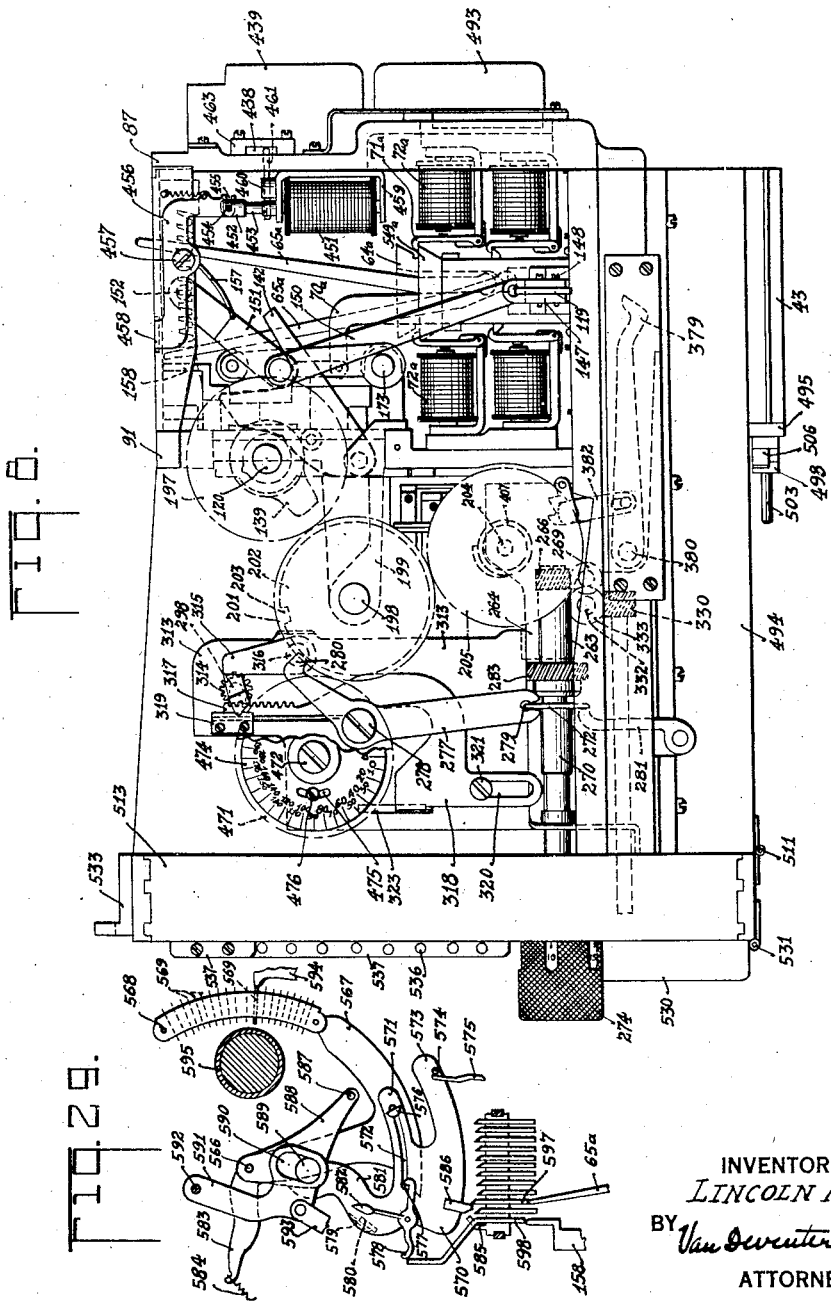
Figure 8 is a right end view of the translator as viewed along the line 8—8 of Fig. 5, with the cover removed.

A solenoid 451, Figures 8 and 10, is mounted within the frame of the translator and is provided with plunger armature 452 having a cutaway portion 453. The plunger 452, through the medium of a pin 454 and a slot 455 in the end of the lever 456 moves the lever 456 on the pivot 457 in the frame. The end 458, as can be seen in Figure 5, is normally flush with the top of the translator and may be utilized to mechanically actuate levers and controls on the tabulating machine, or controls external to the tabulating machine.

For example, in some types of Powers printing heads, such, for example, as the type shown in Patent 2,066,406 to W. W. Lasker, special grand total printing controls are included having a control member 192 in Figure 1 of said patent positioned so as to be adjacent to the end 458 of the lever 456 when the translator is positioned in the machine. This lever 456 may be seen as viewed from the top of the translator in Figure 5 and is actuated through the medium of the plunger 453 of the solenoid 451. An elevation of this is shown in Fig. 8 and a partial elevation in Fig. 10. When a perforation appears in a predetermined position in the record for effecting such special printing controls, an impulse instituted thereby energizes the solenoid 451, and through the medium of the plunger 453 actuates the lever 456 whereupon the end 458 engages the control of said special printing control, rendering the same effective. This printing control and the direct subtraction device, above referred to, are well known Powers devices and have not been described and illustrated in this application in order not to complicate the same.

The solenoid 451 is provided with a yoke 459 carrying a box 460 in which a locking arm 461 is pivoted. When the solenoid is energized and its plunger armature 442 moves down, the locking arm 461 engages the cutaway portion 453 and retains the armature in this position until reset. The end of the locking arm 461 extends through the frame into cooperative relation with the resetting bar 438.

Figure 6:
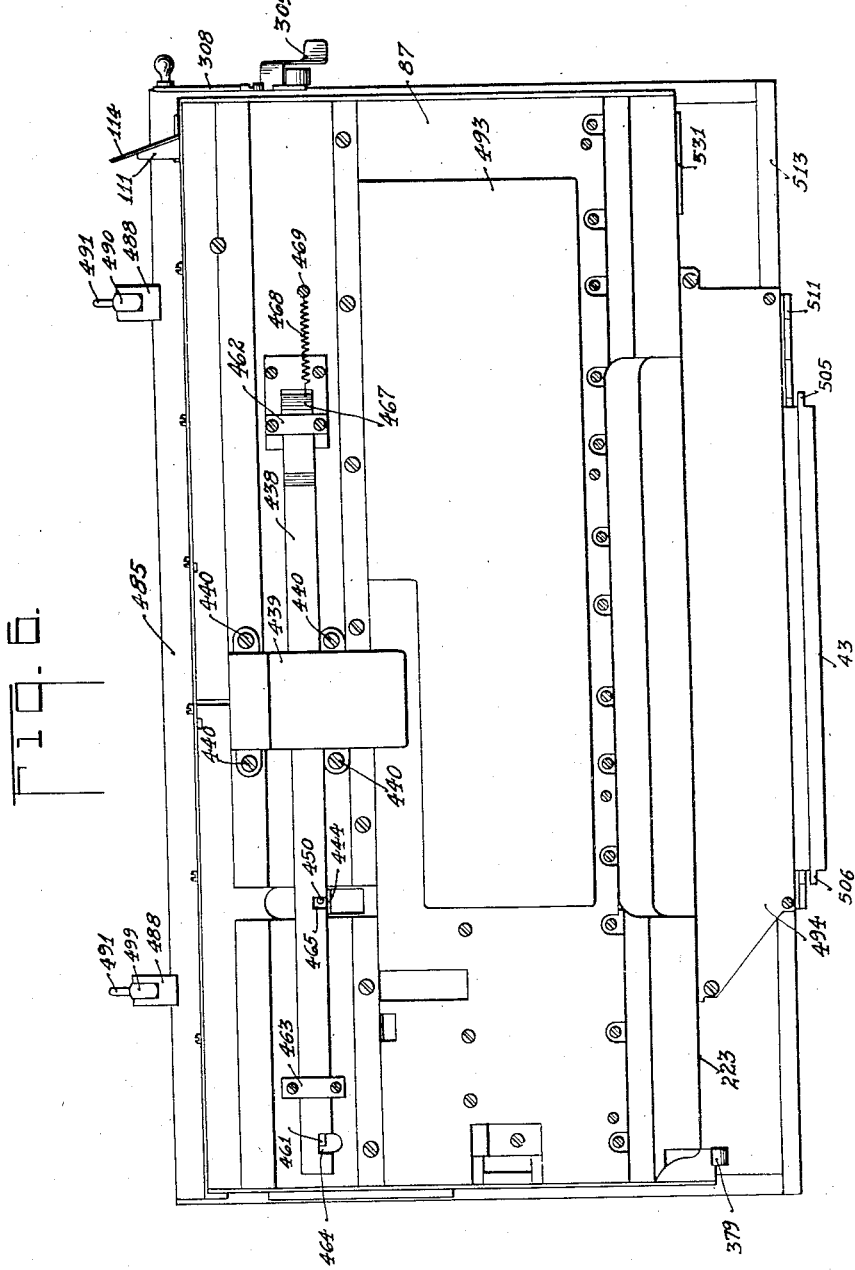
Figure 6 is a rear view of the improved translator.

The resetting bar 438 is supported on the frame by means of a plurality of notched bars 462 and 463 (Fig. 6). The resetting bar is adapted to reciprocate in the notches in the members 462 and 463. This bar is also provided with a notch 464 formed therein and adapted to engage the locking arm 461. This bar also has a notch 465 adapted to engage the pin 450 for resetting the plunger armature of the solenoid 441, and also has a notch 466 formed therein engaging the extension 437 of the pawl 435 for resetting the solenoid 428.

The resetting bar 438 has one end 467 (Fig. 5) bent at an angle to form a camming surface, and a spring 468 having one end secured thereto and another end secured to a pin 469 carried by the frame. This spring retains the resetting bar in normal position and a push rod 470 bearing against the end surface 467 of the resetting bar and actuated by the cam 136 pushes the resetting bar to the right, as viewed in Fig. 5, thereby actuating and releasing the pawl 435 of the solenoid 428, the pin 450 of the solenoid 441, and the locking arm 461 of the solenoid 451, and allowing their plunger armatures to return to normal position.

The upright 313 is provided with a boss 171. A gear 471 is journaled on a shouldered screw 472 which is secured to the boss 171 by means of a nut 473. The gear 471 meshes with the gear 201, and if the gear 201 is driven by the gear 197, and the gears are all of the same pitch diameter, the gear 471 will rotate at the same speed and in the same direction as that of the gear 197 carried by the main drive shaft 120.

The gear 471 has secured thereto a protractor disc 474, graduated in degrees from "0" to "360". The disc is also provided with circumferential slots 475, and screws 476 passing through the slots 475 are tapped into the gear 471. By means of the screws 476 and the slot 475 an accurate setting of the disc 474 may be made relative to and indicating line 477 on the escutcheon 478.

The right end plate 479 is secured to frame members of the translator by means of screws 480 and the escutcheon 478 is secured to the end plate by means of suitable screws 481. A transparent window of glass, or other suitable material, may be provided between the escutcheon 478 and the end plate 479 so that the protractor disc 474 may be viewed when the end plate 479 is secured to the translator. The left end plate 307, in addition to carrying the disc 310, is provided with a slot 482 which clears the bevel gear 100 on the tabulating machine when the translator is being placed in operative position in the tabulating machine. It is also provided with a rectangular slot 483 through which inspection of the slide plates and the main resetting bar 119 may be made.

The rack plates 80 are assembled in groups, each group being provided with toothed spacer blocks 484 which space each of the rack plates 80 apart a distance equal to the thickness of a movable arm 65 plus a suitable clearance. The alphabetical rack plates are also assembled in a group and spaced apart in the same manner.

The rack plates 80, 80a, and the grid plate 183, are positioned immediately below the stop pin basket 82 in the tabulating machine. Therefore, they are not provided with cover plates. The top cover plate 485 of the translator extends from the frame member 91 of the plugboard 57. This plate is provided with turned down ends 486 and 487 which engage the end plates 307 and 479, respectively. The top cover plate 485 is also provided with bosses 488 in which pivot pins 489 form bearings for pivot screws 490. Each pivot screw 490 is provided with a wing nut 491, the purpose of which will presently be described.

The magnet coils 72 are mounted in groups on removable plates 492, making them conveniently removable for inspection or repair. The movable plates are secured to the rear frame 87 and to the center frame member 91 by means of screws and dowel pins, the dowel pins ensuring accurate location relative to the cooperating notches 74 and 74a, on the slide plates 64 for the numerical section of the device, and 64a for the alphabetical section of the device.

The rear frame 87 of the device (Fig. 6) is provided with a cover 493 to cover and protect the wires leading from the magnet coils 72.

The translator is provided with a sub-base 494 spaced apart from and substantially parallel to the base 223. This sub-base has a downwardly extending portion 495 in the form of a rectangle which forms a support for the plunger block 43. The block 51 of cooperating contact members is spaced apart from the plunger block 43 by spacers 496 and is secured to the block 43 by means of screws 497.

The space between the base 223 and the sub-base 494 (Fig. 12) is provided for wires leading from the plunger block 43 and the cooperating contact block 51 to the plugboard. The extended portion 495 of the sub-base 494 has slidably supported thereon locking members 498 and 499 having slots 500 formed therein. Shouldered screws 501, passing through the slots 500, are tapped into the portion 495 of the base and each locking member may slide on the screws 501, due to the slots 500. A spring 502 positioned between the locking members tends to keep the member 499 to the extreme left and the member 498 to the extreme right.

The locking members 498 and 499 are respectively provided with disengaging pins 503 and 504. The ends 505 and 506 are provided for engaging notches (not shown) in the translator guides 507 in the tabulating machine.

Figure 7:
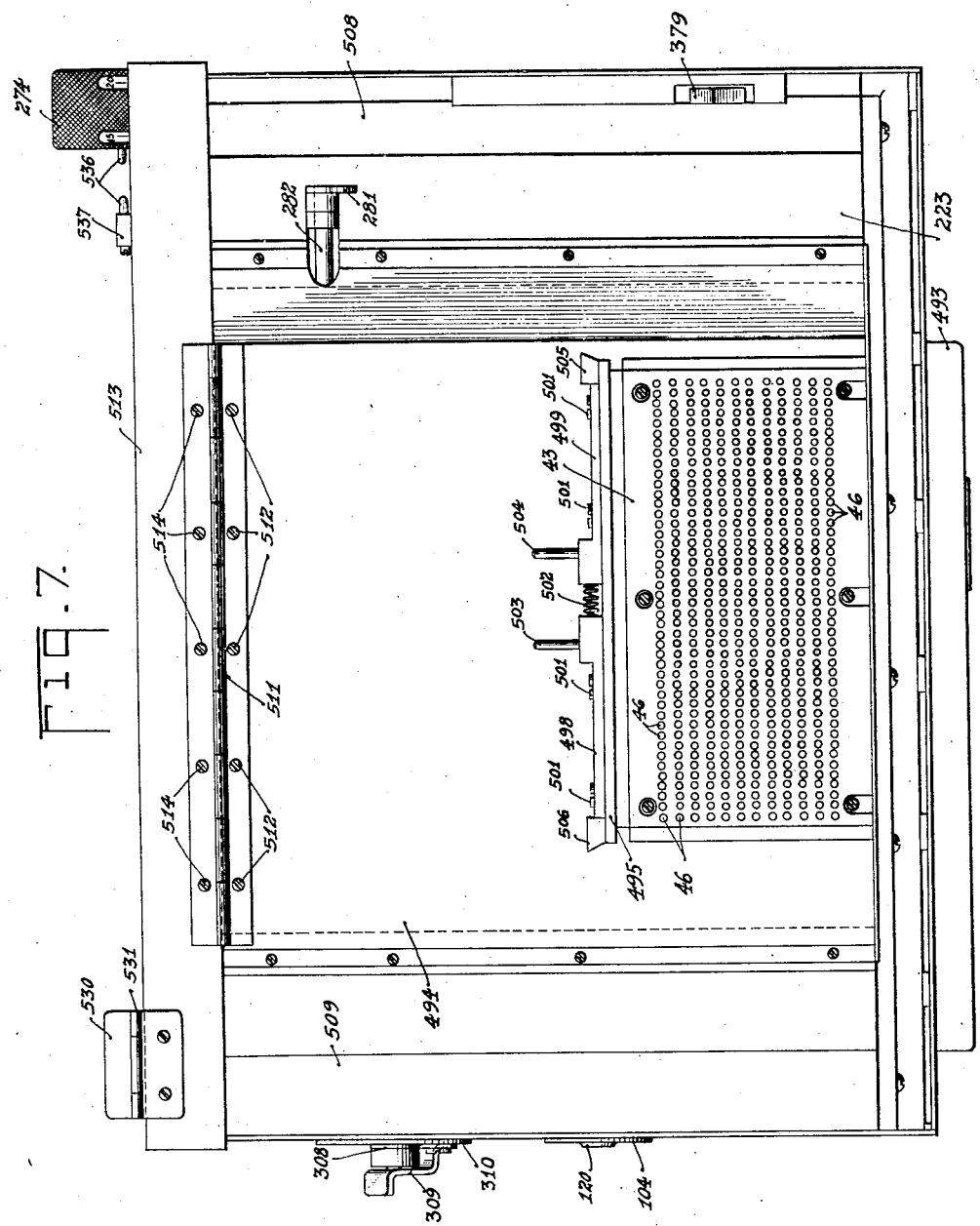
Figure 7 is a bottom view of the improved translator.

The base 223 of the translator is provided with slide bars 508 and 509, Figures 7 and 16, which engage brackets 510 secured to the tabulating machine. The brackets 510 serve not only to guide the translators into the tabulating machine but also to support the weight of the translator.

A hinge 511 is secured to the sub-base 494 by means of screws 512, and a frame 513 is secured to the hinge by means of screws 514.

The frame 513 has a plurality of slots milled therein and forming a support for the panels which make up the plugboard 57, namely, the front panel 515, the center panel 516, and the rear panel 517, see Figure 12.

The plugboard 57 is provided with a plurality of jacks which are jointly supported by the front panel 515 and the center panel 516. The jacks, Figure 2, designated by the numerals 60, 61, 58 and 59 form terminals in the plugboard for the bars 47 and 47a which group the plungers 42 in common for half rows, as previously described.

A plurality of jacks 518 form terminals for the electro-magnets controlling the alphabetical section of the translator, and a group of jacks 519 form terminals for electro-magnets in the numerical section of the translator.

Jacks 520 are connected in common with groups and are provided for plugging from one point to a plurality of other points. These jacks might be termed what is commonly known as "bus jacks". They are not permanently interconnected with any of the controls of the translator.

The rear panel 517 serves mainly to protect the wiring between itself and the center panel 516, and an opening 521 is formed therein through which wires may pass from the translator to the plugboard. This opening is formed low down in the panel 517 so that when the indicating knob 274 is removed, the frame 513, together with the plugboard, may open like a door, making the mechanical parts of the translator available.

The base 223 has an opening 522 formed therein communicating with the space between the base 223 and the sub-base 494, through which wires from the stationary panel 62 may pass to the plugboard.

The solenoids 428, 441 and 451 terminate in jacks 523, 525 and 524, respectively. The frame 513 has a slot 526 formed therein and contact pins 527 and 528 insulatedly supported in said slot connect with a fuse block 529 so that a suitable connector plug (not shown) may be pressed into the slot 526 for connecting the translator through the medium of the pins 527 and 528 to a suitable source of current. The fuse block 529 is provided with a cover 530 which is secured to the frame 513 by means of a hinge 531 and which is held in closed position by means of a snap spring 532 (Fig. 2).

The frame 513 has secured to its upper surface a plurality of bosses 533 having slots 534 formed therein. The pivoted screws 490 fit into the slots 534 in the bosses 533 and when the wing nuts 491 are tightened, the frame 513 is tightly held in normal position. When it is desired to inspect the mechanism or the rear of the plugboard, the wing nuts 491 are loosened and the screws 490 may be turned back out of the way on their swivels 489.

In addition to the jacks above described in the plugboard 57, it is also provided with a plurality of jacks 535 which may be used to form the return circuit for external electrical controls, for example, relays or solenoids to be operated due to certain index point positions in the records. The jacks 535, unlike the jacks previously described, are of a negative sign, assuming that the other jacks described are of a positive sign. Therefore, to warn the operator that these jacks are of a different sign, each one of them is covered by a insulating plunger 536 which is supported in the strip 537 and arranged with a spring to normally cover a jack 535. These plungers may be pushed aside by hand, and the plug wire inserted in the jack.

If it were desired to operate an external solenoid (not shown) at a timing of "6" in the tenth vertical column of the record, one terminal of the solenoid would be plugged into the tenth jack (of the jacks 60) and its return wire would be plugged into one of the jacks 535, so that during each card cycle at a timing of "6" the solenoid would operate.

The impulse passes from the positive side of the line via a fuse 543 and the wire 551, to the contact arms 357A and 357B, thence to the contact arms 358A and 358B via the wire 560 and the wire 559 to the contact brushes 243 and to the inserts 63n, thence to the contact members 50, the contact members 47 and via the cable 599 to the jacks 60.

Since the timing of "6" in the tenth column is selected, the contacts 47, 50 in the tenth row and in the "6" index position will contact each other so that current can flow through the circuit just named to the solenoid. Current passing through the solenoid will flow from jack 10, of the group 60, via a plug wire to the external solenoid, and the return wire of the solenoid is plugged into the jack 535 (referring to Figs. 19a and 19b) along the wire 539 to the interrupter contact 358D and via the contact arm 257D and via the wire 540 to the terminal 398, via the total switch and from the terminal 393 via the wire 541 to the fuse 542 in the negative side of the line. The cam 359D which operates the breaker arm 357D allows the contacts to close at 122° and opens the same at 143°, then closes the same again at 328° and opens the contacts again at 342°. (This is shown diagrammatically in Fig. 20.) The index point of the tabulating machine (the point at which the machine comes to rest when stopped) is 328°.

The group of jacks 544 are also of negative sign and are also provided with insulating plungers 536 in the strip 537 which have to be pushed back by hand before a plug can be inserted in the jacks 544. These jacks are connected to the brushes 363 in the translator which receive impulses of known timing from the segment 362 carried by the rotor 360.

Current is supplied to the segment 362 by the brush 545 over the wire 540 and as the shaft 355 carrying the rotor 360 is driven in timed relation to the tabulating machine, the impulses supplied to the brushes 363 are of definite and known timing. These timings are indicated on the translator 546 adjacent to the jacks 544 (which are connected to the brushes 363) both for forty-five and ninety column operation.

The jacks 547 are provided in the plugboard 57. Where external relays, solenoids, or other instrumentalities are actuated by jacks 535, their resetting coils may be connected to the jacks 547 to receive impulses so that they will be reset before the beginning of the next card cycle.

The jacks 547 are connected in parallel and a wire 550 connects them to the stationary contact member 358F. The pivoted contact arm 357F makes contact with the stationary contact member and is connected to the wire 551 which leads to the fuse 543 and to the positive side of the source of supply. (Fig. 19b.)

The cam 359F allows the contact arm 357F to make contact with the member 358F at 122° and moves the arm 357F out of contact with 358F at 143°. It will be noted that this timing is exactly the same as that of the cam 359D except that on the latter there is an additional closed period between 328° and 342°.

The plugboard 57 is also provided with a group of jacks 552 arranged in a vertical column on the left (Fig. 2). These jacks are provided for supplying impulses of known alphabetical timing. These timings are indicated on the plate 553.

Referring to Fig. 19b, it will be noted that a cable 558 connects the jacks 552 to the first vertical row of inserts 63 in the stationary panel 62 which are successively contacted by the comb-like brushes 243 in group "C" (Fig. 31) which are actuated by cams 229 in group "C" through the medium of the rocker arms 227 and the push rods 249. By plugging into the jacks 552 it is possible to get an impulse of any alphabetical timing regardless of whether a hole of the same timing is punched in the record card or not. The inserts 63 in the stationary panel 62, together with the contact brushes 243 carried by the rods 234 and oscillated through the medium of the arms 248, the push rods 249, the rocker arms 227 and the cams 229 may be termed the "alphabetic contact distributor". The timing of the cams 229 of the alphabetical section of the translator is shown diagrammatically in Fig. 21, the numbers "9", "8,", "7", "6", "5", etc., referring to the horizontal row of index positions.

In the card form shown in Fig. 24, it will be noted that the "K" and the "Y" are in the horizontal "9" row in the record, and in the code used if this index point position is punched and there is no hole punched in the same column in the "12" row, the machine will register the letter "K", but if there is also a hole punched in the same column in the "12" row, the machine will register a "Y".

The alphabetical code used will hereinafter be more fully described in detail. It is mentioned here to show an example of the use of the chart (Fig. 21).

The alphabetical cams control the establishment of contact between the brushes 243 in the various rows and the adjacent inserts with which they make contact in the following order, beginning with the bottom, or "9" horizontal row in the record:

| Row | Contacts close at— | Contacts open at— |
|---|---|---|
| | Degrees | Degrees |
| 9 | 358 | 55 |
| 8 | 7 | 55 |
| 7 | 11 | 55 |
| 6 | 15 | 55 |
| 5 | 20 | 55 |
| 4 | 24 | 55 |
| 3 | 28 | 55 |
| 2 | 32 | 55 |
| 1 | 37 | 55 |
| 0 | 42 | 55 |
| 11 | 47 | 55 |
| 12 | 59 | 72 |

From this it will be noted that the contact brushes in the "12" row act just after all of the others have completed their movement. The reason for this is that in the alphabetical code used, the second hole of a combinational representation always falls in the "L" or "12" row, and where a hole appears in this last or "12" row, the magnet coils 72a receive a second impulse which releases a slide plate 70a and allows the interposer 184 to rise and come to rest against the bottom of the grid plate 183.

The drunken screw cam 195 is timed to shift the grid plate 183 immediately after the contacts in the "12" row open.

Referring to Fig. 19b, the cams 359G and 359H control the current flowing to the brushes 243 which are carried on the rods 234. These rods, as pointed out above, are connected to the jack 242. A wire 554 connects the jack 242 to the stationary contacts 358G and 358H, and the pivoted contact arms 357G and 357H, adapted to make contact with the stationary members, are connected to the wire 551 which connects to the positive side of the source of current through the fuse 543. The cam 359G allows the arm 357G to make contact with the member 358G at 358° and interrupts this contact at 52°, and the cam 359H allows the arm 357H to make contact with the member 358H at 62° and interrupts this contact at 71°. It is entirely possible to utilize one cam 359G to perform both functions by cutting away a portion equal to and positioned like the cutaway portion of the cam 359H, but the cutaway portions would be so close together on the surface of the cam that the pivoted arm would tend to bounce, so that interrupters are used in parallel for obtaining smoother action.

The plugboard 57 is also provided with a column of jacks 555. For convenience, this row of jacks is positioned at one side of the plugboard near the jacks 552, and is provided to make available to the operator impulses of known numerical timing, the values of which are indicated on the plate 556. The jacks 555 are each individually connected via a cable 557 to a vertical column of inserts 63n in a vertical column in the stationary panel 62.

The comb-like contact brushes 243 carried by the metallic rods 233 are permanently connected by wire 559 to the jack 241, and a wire 560 connects the jack to the stationary contact members 358A and 358B. The pivoted contact arms 357A and 357B which cooperate respectively with the stationary contact members are connected to the wire 551 which is in turn connected to the positive side of the source of current via the fuse 543. The cam 359A actuates the contact arm 357A and cam 359B actuates the contact arm 357B.

The cam 359A allows the contact arm 357A to establish contact with 358A and to interrupt the contact at the following angular positions relative to the tabulating machine, as shown in Fig. 20:

| Horizontal index positions | Contact established at— | Contact interrupted at— |
|---|---|---|
| 12 | 331 | 342 |
| 0 | 354 | 6 |
| 6—5 | 26 | 41 |
| 2—1 | 66 | 78 |

The cam 359B allows its pivoted contact arm 357B to establish contact with the stationary contact 358B and interrupts the same as follows:

| Horizontal index positions | Contact established at— | Contact interrupted at— |
|---|---|---|
| 11 | 346 | 352 |
| 8—7 | 8 | 19 |
| 4—3 | 46 | 60 |
| 9—8—6—4—2 | 86 | 114 |

It is entirely possible to use one pivoted contact arm and one stationary contact member, but the cutaway portions of the cam, if both the "A" and "B" timings were incorporated therein, would be so close together that the pivoted arm would tend to bounce. Therefore, to obtain smoother action two cams, arms, and stationary contacts are used, operating alternately.

The cams 229 which move the contact brushes 243 through the medium of the rocker arms 227, the push rods 249, the arms 248 and the metallic rods 234, contact the rows of inserts 63n in the stationary panel 62 for standard or forty-five column records in the following timing and sequence relative to the movement of the tabulating machine:

| Horizontal row of index positions | Establishes contact at— | Contact interrupted at— |
|---|---|---|
| 12 | 332 | 344 |
| 11 | 345 | 353 |
| 0 | 354 | 7 |
| 8—7 | 9 | 21 |
| 6—5 | 26 | 43 |
| 4—3 | 46 | 62 |
| 2—1 | 66 | 80 |
| 9—8—6—4—2 | 91 | 116 |

The cams 229 for forty-five column operation may be seen in Group "A" (Figs. 9 and 31).

When the lever 308 is thrown for ninety column operation, the shaft 305 rotates the gear 300 and the shaft 226 which is secured thereto. As the shaft 226 is eccentric where it supports the rocker arms 227 in "Group A" and "Group B", the portions carrying these groups each being eccentric relative to the other, the rocker arms in "Group A" are raised out of the zone of the cams and the rocker arms in "Group B" are let down into the zone of the cams. The shaft 226 also rotates the shaft 298 and the pinion 314 drives the rack 317, thereby moving the plate 318 which through the medium of the lever 324 and the crank 327 rotates the shaft 328 to a point where "90" appears on the indicating device 329, as viewed through the window 327 in the plugboard 57.

The timing and sequence of the contact brushes 243 in establishing contact with the rows of inserts 63n in the stationary panel 62, and the interruption of said contacts relative to the tabulating machine is as follows for ninety column operation:

| Horizontal index positions | Contact opened at— | Contact interrupted at— |
| --- | --- | --- |
| 12—4 | 332 | 344 |
| 8—2 | 8 | 21 |
| 7—1 | 26 | 43 |
| 6—0 | 46 | 62 |
| 5—11 | 66 | 80 |
| 9—3 | 91 | 116 |

The movable arms 65 are oscillated by the cam 125 during a definite portion of the operating cycle of the tabulating machine. Each movable arm 65 is provided with a boss 78, which when the slide plate 64 is released, engages one of the notches 79 in the rack plate 80, and thereby guides the end of the arms 65 to one of the stops 81 in the basket 82 of the tabulating machine. As viewed in Fig. 1, the stop 81 on the left will, when set, stop the type bar in position to print a "7", but if the "9" stop 83 has been actuated by an interrupter 85, the stops 81 all swing to the left and change the value of the setting to the next higher number. Due to the fact that when the member 83 is actuated, the ear 561 which normally rests against the plate 562 is allowed to swing over until the straight surface 563 is stopped by the plate 562, the stops 81 which are spring-loaded against the member 83 all move over to the left a distance which gives the type bar 84 the next higher numerical position. Therefore, if a stop 81 giving a value of "7" were actuated and the member 83 were afterward actuated by the interposer 85, the stop 81 would move over to the left, as viewed in Fig. 1, and cause the type bar to stop at a value of "8". If the member 83 only is actuated, the type bar 84 is allowed to move its full swing and stop in the "9" position.

Referring to Figs. 19a and 19b, the magnet coils 72 have their return wires connected together and connected by means of a wire 564 to the stationary contact member 358C. A pivoted contact arm 357C cooperates with the contact 358C and is actuated by a cam 359C. The pivoted arm 357C is connected to the wire 540 which may be traced via the total switch and the wire 541 via the fuse 542 to the negative side of the source of current.

The cam 359C causes the contact arm 357C to establish contact with the stationary member 358C at 8° and interrupts this contact at 114°. In other words, the return wires of all of the magnet coils 72 are connected to the negative side of the line at 8° and disconnected therefrom at 114° (Fig. 20).

The sweep of the movable arms 65 is to the right, as viewed in Fig. 1, and the boss 78 which is part of the movable arm 65 is beneath the first notch 79 (from the left) in the plate 80, at 21°. This corresponds to the "7" index position, but if a "9" interposer 85 operates later, this value will change to "8". The boss 78 is beneath the second notch 79 at 46° corresponding to the "5" or the "6" index position; it is beneath the 3rd notch 79 at 66° corresponding to the "3" or the "4" index point positions; and it is beneath the 4th notch at 88° corresponding to the "1" or the "2" index point positions.

The magnet coils 72 are individually connected via the cable 565, to the jacks 519 in the plugboard 57.

The jacks 519 are arranged in the plugboard in groups corresponding to the banks of counters in the tabulating machine. In the embodiment shown there are five banks of counters, accordingly the jacks 519 are arranged in groups numbered from 1 to 5.

The movable arms 65a in the alphabetical section of the translator also move in timed relation to the operating cycle of the tabulating machine and the timing and sequence at which the boss 78a of the arms 65a is directly beneath the first notch 79a in the rack plate 80a (from the left) as viewed in Figure 14, is substantially 3° ahead of the time that the contact brushes 243 establish contact with the inserts 63 in the bottom or "9" row in the stationary panel 62. As pointed out above, the brush 243 establishes contact at 358° and therefore the moving arm 65a has its boss 78a immediately below the first notch 79a in the rack plate 80a at 355°. The boss 78a is beneath the second notch 79a, corresponding to the "8" row at 4°, it is beneath the third notch corresponding to the "7" row at 8°, and the values for the other rows through the "11" row may be determined by subtracting 3° from the degree at which the alphabetical contacts are established as given in the table above.

As pointed out in the table above, all of the contacts established (9 through to 11) are broken at 55°. Therefore the current is cut off from all of the magnets 72a in the alphabetical section at 55°. These release all of the magnet armatures 71a and they return to normal and engage the notches 549a on the slide plates 70a so that when a hole appears in the "12" row which according to the code used is the "L" index point position, a magnet 72a upon receiving a second impulse will release a slide plate 70a and allow an interposer 158 to rise with its end 184 resting against the grid plate 183.

Between the time the current is cut off from the magnet coils 70a, which in this case is at 55°, and the time the boss 78a has passed the eleventh notch 79a in the rack plate, the cam 170 engages the bumper 169 and disengages the pawl 161 from the ears 167 which form part of the reciprocable interposers 158 so that these interposers are no longer restrained and can be released if any of the magnet coils 72a are again energized.

At the time the bosses 78a of the moving arms 65a are beneath the twelfth or last notch in the rack plate 80a, the ends 182 of the arms 65a are under a solid or unslotted portion of the grid plate 183, therefore if any of these arms are released they cannot rise through the slots when the grid plate is shifted. It may be also pointed out that when the arms 65a are in this last position the slide plates 70a are no longer restrained, so if a magnet 72a is energized both slide plates 64a and 70a will simultaneously be released by the armature 71a and although the arm 65a has no slot in the grid plate through which it can protrude, the reciprocable interposer 158 does rise through a slot when the grid plate 183 is shifted.

The magnets 72a which are energized due to a hole in the "12" or "L" index point position of the record, begin receiving energy at 59° and this energy is cut off at 72°. The boss 78a is beneath the twelfth notch in the rack plate 3° ahead of 59° which would be at 56°. The pawl 161 engaging the reciprocable interposers 158 release them a few degrees after the index point positions 9—11 have been de-energized so it has been found preferable to release these pawls at 62°.

The drunken screw cam 195 is timed to shift the grid plate 183 at 68° thereby allowing all of the arms 65a and the interposers 158 which had been released to rise and engage the stop pins controlling the alphabetical type sectors in the tabulating machine simultaneously. To set a type bar to print the letter "W", referring to Figure 24, a hole is punched in the "7" row and a second hole is punched in the same column in the "12" or "L" row. The card punched in this manner in a given vertical column causes the release of an arm 65a in the "7" index point position and the release of an interposer 158, the latter of which is always in the "12" position, and both of these rest against the lower surface of the grid plate 183. When the grid plate is shifted they both rise and engage stop pins simultaneously. This is contrasted with the ninety column numerical action in which the moving arm is released due to a hole in the record, and if a second hole appears in the record in the same column in the "9" position, the "9" interposer rises after the arm 65a has risen, rather than simultaneously with the same.

The alphabetical sectors in the tabulating machine start moving forward at the same time the arms 65a and the interposers 158 are released by shifting the grid plate.

The alphabetical sectors in a tabulating machine return to normal position at rest at 320°. This determines the point at which the slide plates 64, 70, 64a and 70a may begin to be reset. Accordingly, the cams 137, 138 and 139 begin (through the linkage previously described) to move the resetting bar 119 downward at 320° and at 329° all of the slide plates are re-engaged by the magnet armatures and the translator is reset.

After the slide plates are engaged by the magnet armatures or at 329°, the rollers 175 carried by the arms 172 begin moving the arms 65 and the arms 65a back to starting position (which is to the left as viewed in Figures 1 and 14). The arms 65 in the numerical section are back to normal position at 0° whereas the return stroke of the alphabetical arms 65a is completed at 358°, or 2° earlier.

The cam 125 controls the movement of the arms 65 and the cam 171 controls the movement of the arms 65a in the alphabetical section, as previously described.

In describing the operation of a tabulating machine, equipped with the new and improved translator, alphabetical operation will be taken up first.

Figure 4:
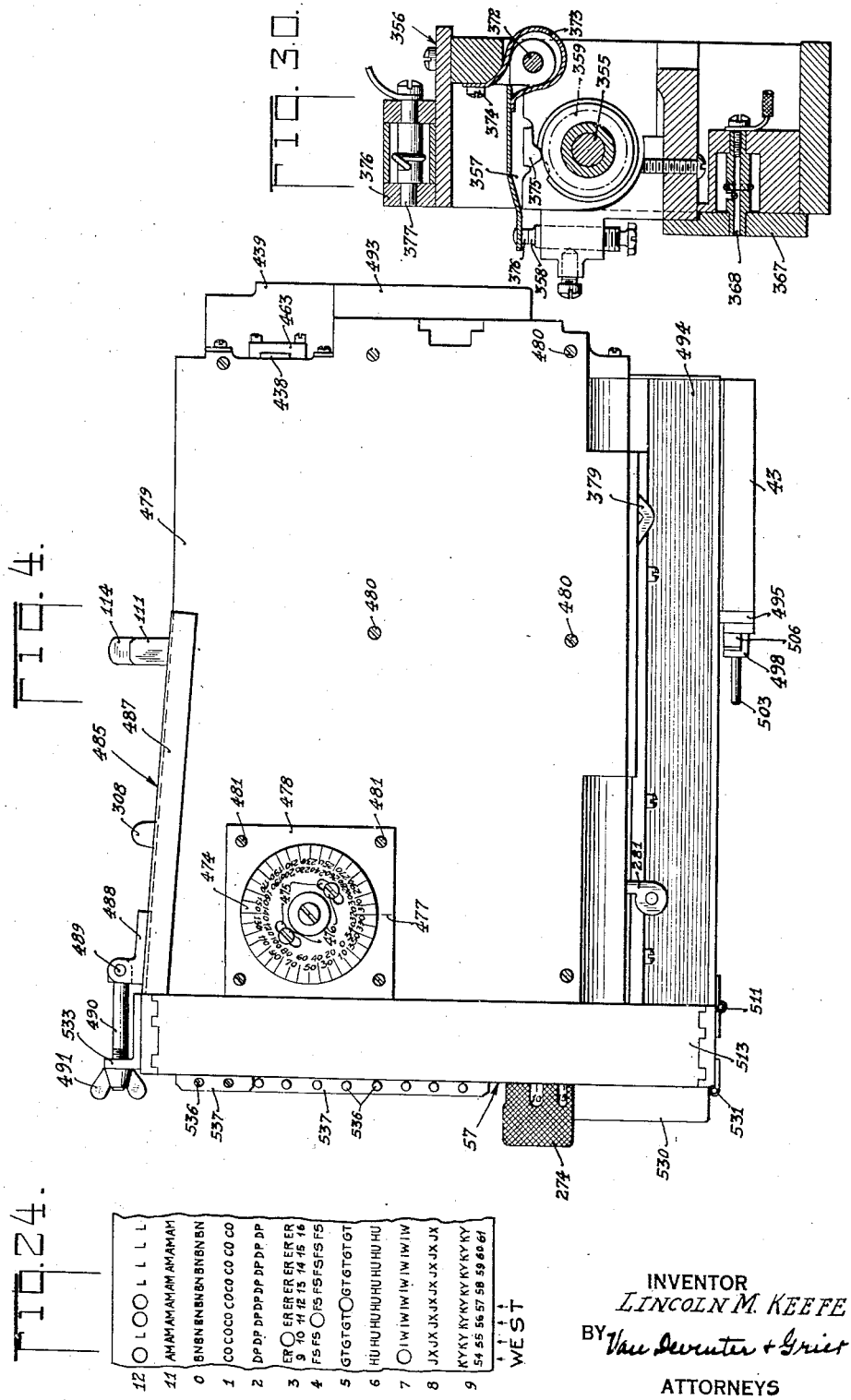
Figure 4 is a right side elevation of the translator showing the relative positions of the contactors adapted to be actuated by the sensing means of the tabulating machine, a circuit disabling switch adapted to be actuated by the tabulating machine only when taking totals, and other features which will presently be described.

From the Foster Patent #1,274,528, which teaches a method of printing alphabetical characters from perforated records, Figs. 3 and 4 in part are included in the present application as Figs. 28 and 29, and a brief description of the operation of the type sectors, the segments, latches, etc., is now reviewed to make the operation thereof clear.

Referring to Fig. 28, which shows the type sector setting for printing the letter "B", and Fig. 29, which shows the setting for printing the letter "N", single units are shown each corresponding to a vertical column in the record. As there are twenty alphabetical columns in the embodiment described herein, these units are duplicated twenty times. Each unit comprises two sectors mounted on the shaft 566. One sector 567 is provided with an extension 568 carrying type. (In Fig. 28, only one type for printing the letter "B" is shown, the remainder being indicated by dotted lines 569). A second sector, designated by the numeral 570, is provided with an extension 571 having a slot 572 formed therein.

The sector 570 also has a second extension 573 provided with a pin or projection 574 which when the parts are in the non-printing position is adapted to engage a stop 575 for limiting the rearward movement of the sector 570. A pin 576 projects through the slot 572 and is provided with a head 577 shaped to form a detent adapted to be engaged by a latch 578. A spring 579 cooperating with the latch 578 maintains the same in latching position for suitable stops are provided to limit the movement of the latch. A projection 580 on the sector 570 engaging the rear edge of the arm 581 of the sector 567 serves to keep the two sectors 567 and 570 in their normal relative positions. A spring 582 mounted on the sector 570 and bearing against the edge of the aforesaid arm 581 causes a slight initial movement of the sector 567, so that when free to move forward it is caused to assume such position that the latch 578 cannot again engage the head 577.

The sector 567 is provided with an arm 583 and a spring 584 is secured to this arm and to a rigid portion of the machine for causing the sector 570 to swing forward when released by the movement of the stop 585 out of the path of a second stop 586 on the sector 570.

A restoring bar 587 is carried by plates 588 pivotally mounted on the shaft 566 and is caused to oscillate by means of a roller 589 carried by the plates 588. This roller engages a slot 590 formed in a plate 591 mounted on a shaft 592. The plate 588 is operated by means of a rod or bar 593 connected at one end to the plate 591 and the other end of which is connected to a moving member supported on a shaft in the machine and oscillated in a well-known manner.

The impression of the type is effected by a hammer mechanism indicated generally by the numeral 594 which is associated with a platen 595, and an ink ribbon (not shown). The construction and arrangement of these parts last referred to are well-known in the art and detailed description thereof is unnecessary.

There are twelve possible positions for a perforation in each alphabetical column on the card and the character represented on each perforation is dependent not only upon its position in the column but on the presence or absence of a perforation in the "12" or "L" position. Fig. 24 which shows a portion of an alphabetical record has the indications in the various horizontal rows with the exception of the top or "12" row, for example "AM" in the "11" row, "BN" in the "0" row, "CO" in the "1" row, "DP" in the "2"

row. The top row is indicated by the letter "L". A single hole punched in a "0" row indicated by "BN" will cause the machine to print the letter "B", but if a hole appears in the "0" row "BN" and the "12" or "L" row, the machine will print the letter "N".

In the portion of the card shown in Fig. 24, holes are shown as punched for causing the machine to print the word "West". However, in describing the operation of the alphabetical section of the machine, the description will be given first in connection with the printing of a "B" and second in connection with the printing of an "N". Assuming a single hole is to be punched in a given column in the "0" or "BN" row, and that the card is sensed by the sensing pins 41, a pin passes through said hole and moves a plunger 42 into contact with a cooperating contact member 50 (Fig. 1).

Assuming that the hole representing a "B" appears in the 10th column of the record, a plug wire is connected to a jack 60 under the column label 10 in the plugboard 57, and to an alphabetical jack 518 under the group label 1, representing the first column in the alphabetical section of the machine. This alphabetical jack is permanently connected via the cable 596 to a magnet 72a which is adapted to release the moving arm 65a when energized and allow the same to come to rest against the grid plate 183. As the machine rotates, the brushes 243 make contact with the inserts 63 in the stationary panel 62 (Fig. 19b) corresponding to the "0" row of the record, at 42° (Fig. 21).

The alphabetical cam 359G allows the contact arm 357G to contact the contact member 358G at 358°, this contact is broken at 55°. The alphabetical cam 359H causes the contact arm 357H to contact the contact member 358H at 62° and interrupts this contact at 71°. Therefore, when the contact brushes 243 in the "0" row contact the inserts 63, current flows through the first magnet coil 72a which may be traced as follows.

From the positive side of the line via the fuse 543 and the wire 551 to the contact arm 357G and to the contact member 358G; thence via the wire 554 to the shafts 234 and the contact fingers or brushes 243 and the inserts 63. From the inserts 63 to one of the contact members 50 and its cooperating contact member 42 (which have been closed by a sensing pin passing through a perforation in the "0" index position representing "B", Figure 24), thence via the cable 599 to the tenth jack 60. From the tenth jack current flows via the plug wire mentioned, to the jack 518 selected in the group 1. From the jack 518 current flows via the cable 596 to one of the magnets 72a and via the return wire to the terminal 398 of the total taking switch, and from the other terminal 393 of this switch via the wire 541 and the fuse 542 to the negative side of the line.

At the same time the machine started rotating, the movable arms 65a have started their movement toward the center frame member 91 and are beneath the second notch 79a in the rack plate 80a which will guide the arm 65a in proper position against the grid plate 183 to engage a stop 597 which will set the sector to print a "B" (when the grid plate 183 releases the arm 65a) three degrees before the brush 243 establishes contact with the insert 63. This occurs for the "0" row 3° ahead of 42° which is 39°. Since the first magnet coil 72a is energized at 42° as above stated, and since the arm 65a is at this time beneath the stop 597, the armature 71a is attracted and the slide plate 64a is released, allowing the arm 65a to rise against the under side of the grid plate 83 immediately below the stop 597, which would correspond to the second stop 597 from the left as viewed in Fig. 29. However, Fig. 29 is diagrammatic and illustrates the principle of the alphabetic type sectors controlled by combinational holes, as depicted in the Foster patent hereinbefore referred to. Of course, neither the Foster patent nor Fig. 29 which was taken therefrom shows a grid plate 83 such as applicant employs, but it may further be understood that applicant's use of the grid plate in no wise effects the principle taught by Foster; instead, the grid plate is provided to insure the release of both an arm and an interposer simultaneously (where two perforations in a combinational hole appear in a column), and to insure simultaneous engagement of a stop 597 with the member 586 and the shifting member 598 with a latch 578 for extending the type carrier 568.

Referring to Fig. 24, the "12" row in the records contains perforations for causing the interposer 158 to actuate the member 598, Fig. 29. A perforation in a given column of the record in the "0" position, which is the second position away from the "12" row, would cause the actuation of a stop 597 in the second position away from the member 598, shown in Fig. 29.

The boss 78a carried on the lever 65a engages and is guided by a slot 79a in the rack plate 80a during its movement upwardly.

At the time the arm 65a is moving, the pawl 161 engages the slide plates 70a so that when the magnet 72a attracts its armature and releases the slide plate 64a, the slide plate 70a cannot move and when current through the magnet 70a is interrupted at 55°, the armature 71a is released and reengages the slide plate 70a, after which the pawl 161, through the medium of the cam 170, disengages the reciprocable interposer 158 so that later if the slide plate 70a receives a second impulse the slide plate 70a will be released, allowing the interposer 158 to rise against the grid plate 183.

Since only one hole is assumed to appear in the column to print a letter "B", and since a hole must appear in the "12" or "L" position for the magnet 72a to receive a second impulse, the slide plate 70a is not released and therefore the interposer 158 does not move. Immediately afterward, or at 68°, the drunken screw cam 195 shifts the grid plate 183 and allows the end 182 of the arm 65a to engage and set the stop 597 so that when the bar 587 is swung into its outer position the sectors, which are latched together by the latch 578, will move as one and when arrested by the stop 597 (Fig. 28) the "B" type will be in position ready to be impressed upon paper on the platen 595 upon the operation of the hammer mechanism 594. The sector starts forward at 68° or in time with the release of the arm by the grid plate 183.

The alphabetic sectors are back to normal at 320°, the slide plates are reset between 320° and 330°, and the moving arms 65a return to normal between 330° and 358°.

To print the letter "N", a hole is punched in the record in the "0" or "BN" row and a second hole is punched in the "12" or "L" row. The connections between the same, the action is exactly the same as above described for the letter "B" up to the point where the pawl 161 is disengaged from the interposers 158, thereby removing all restraint from the slide plates 70a which, by the way, have been reengaged by the armature 71a of the magnet 72a. Sensing pins having passed through both holes in the record, and established contact between a plunger 42 in the "0" position and a plunger 42 in the "12" position, and cooperating contacts 50 in the same respective positions, the contact brush 243 in the "12" position establishes contact with an insert 63 in the same position in the stationary panel 62 at 59° and the cam 359H closes its contacts at 62°, thereby delivering a second impulse to the magnet 72a whereupon the armature 71a is again attracted, the slide plate 70a is released, and the interposer 158 rises with its end 184 resting against the lower surface of the grid plate 183. The arm 65a is also resting against the bottom of the grid plate due to the fact that it was released by the first impulse through the magnet 72a.

Now, the grid plate 183 is shifted and both the arm 65a and the interposer 158 are allowed to simultaneously engage stops in the alphabetical stop basket. The interposer 158 engages the stop 598 which actuates the latch 578 and releases the pin 576 having a head 577, whereupon the sector 567 advances until the pin 576 reaches the end of the slot 572. At the same time, the arm 65a engages the stop 597 and the second sector moving forward is brought to rest by the second stop 586 when the same is engaged by the stop 597. The release of the pin 576 by the latch 578 threw the sector 567 forward so that its extension 568 projects upward and due to the arresting of the movement of the member 570 by the stop 597 the "N" type is in line with the platen 595 so that when the hammer mechanism 574 operates, the letter "N" will be printed.

It will be noted that the brushes 243 carried by the rods 233 are much greater in length than the length of the rows of inserts 63n in the numerical section of the stationary panel 62. It will also be noted that the alphabetical inserts 63 are arranged in four groups of rows each spaced apart from the other. This spacing is substantially equal to the width of the insulating bar 231. Due to this arrangement, it is possible to select as many alphabetical columns, in groups of five, as desired. The selections are made by means of the knob 274 which as previously explained causes the panel 221 to move laterally relative to the stationary panel 62.

When the panel 221 is positioned as far as it will go to the left, as viewed in Fig. 9, the alphabetical brushes 243 carried by the rods 234 will contact, when the machine is operated, the alphabetical inserts 63 in the four groups, thereby setting the machine up to print in twenty alphabetical columns.

When the knob 274 is rotated to move the panel 221 to the right until the visual indicator on the knob 274 shows that it is set for fifteen columns of alphabetical, the brushes carried by the rods 234 will contact the inserts 63 in three of the groups, but the fourth group will be contacted by brushes carried by the rods 233 which are driven at a different timing, namely, the timing of the numerical portion of the machine. This decreases the number of alphabetical columns used by five, and increases the number of numerical columns to be used in the sum of five.

When the knob 274 is set for ten columns alphabetical, the panel 221 is moved to such a position that the brushes carried by the rods 234 may contact two groups of inserts and the number of alphabetical columns is decreased by ten. Likewise, when the knob 274 is turned and set for five columns alphabetical, the panel 221 is moved to its extreme right position where the brushes carried by the rods 234 only make contact with one group of alphabetical inserts 63, and the numerical brushes carried by the rods 233 make contact with the numerical inserts 63n and the other three groups of alphabetical inserts 63, making the machine capable of handling five columns alphabetical and an increase in the numerical columns of fifteen.

In other words, moving the panel 221 to the right, as viewed in Fig. 9, increases the number of numerical columns available and decreases the number of alphabetical columns. Moving the carriage to the left, the numerical columns are decreased and the number of alphabetical columns is increased, until at the extreme left position of the panel 221, the setup is for twenty alphabetical columns.

When it is desired to control the tabulating machine by means of combinational records, of which a typical form is illustrated in Fig. 23, well-known in the art as "ninety column records", the lever 308 is pulled out slightly to disengage the registration pin 312 from the upper registration hole 311, and rotated 180° until it points straight down, as viewed in Fig. 3, and the registration pin 312 engages the lower registration hole 311, making the translator adapted for ninety column operation.

When the lever 308 is moved as just described, it rotates the shaft 305 and through the medium of the gears 301 and 300 the eccentric shaft 226 which supports the rocker arms 227 is rotated 180°, thereby throwing the rocker arms in group "B" into operative relation with the cams 229 in group "B", thereby insuring that the brushes 243 carried by the rods 233 will move in proper timing for ninety column operation.

The shaft 226 also rotates the shaft 298 which is telescoped into the end of the shaft 226. As the shaft 298 rotates, the pinion 314 carried thereby drives the rack 317 and moves the plate 318 upward (away from its position shown in Fig. 10).

The motion of the plate 318 is transmitted to the shaft 328 through the medium of the lever 324, and the bell crank 327. The motion of the shaft 328 is transmitted via the spiral gear 330 and the spiral gear 333 to the shaft 332. The eccentric portion of the shaft 332 is moved downward, due to the rotation of this shaft, and the plunger pins 335 move downward following the eccentricity, thereby allowing the insulating bar 336 to move downward. This allows the contact arms 38 to move downward and out of contact with the contact arms 37 so that the groups 47 and 47a of plunger pins are not connected in common.

The indicating device 329 which is also carried by the shaft 328 comes to rest when said shaft has completed its movement, with the figure "90" showing through the window 337 in the plugboard 57.

Referring to the ninety column record card (Fig. 23) it will be noted that the indicia are punched therein in a code. The code used, for purposes of illustration, is shown as punched in the card (Fig. 23).

A single hole in a column in the "1-2" horizontal row represents and will cause the machine to print a "1". A hole punched in the "1-2" row and another hole punched in the "9" row in the same column represents and will cause the machine to print a "2". This is due to the fact that when the "9" stop is actuated, the other stops move over and assume positions increasing the value of the setting of the type segments to the next higher even number. Therefore, the hole in the "1—2" column will set a stop which will ordinarily bring the type segment to rest in position to print a "1", but since a hole also appears in the "9" row, the "9" stop will also be operated, allowing the stop which has been set, to a value of "1", to move over or increase the value of the setting to the next highest even number, which will be a "2".

When a hole is punched in the "9" position only, the "9" stop is actuated but does not engage the type carrier. Therefore, the latter is allowed to swing its full path of travel and it normally comes to rest with the "9" type in the printing position.

Having described generally the manner in which the record sets the machine to print a "1", and how it sets the machine to print a "2", the action of the mechanism and instrumentalities in obtaining these results will be explained more in detail.

Assumed that a single hole is punched in the "1—2" row in the tenth vertical column in the record, and assumed that it is desired to print data in ths column in the extreme right hand column of the first bank of counters, a plug wire would be used to connect the jack 60 immediately below the "10" which represents the tenth column, to the jack 519 underneath the letter "U" in the plugboard 57 (Fig. 2).

When the record containing this data is at the sensing means, a sensing pin 41 passes through the hole punched in the "1—2" row in column "10" and raises a plunger 42 into contact with a cooperating contact 50. The moving arms 65 start moving due to the movement of the arms 126 carrying the rollers 129.

Coincident with the movement of the arms 65, the cams 229 control the movement of the rocker arms 227 and the movement of the brushes 243 carried by the rods 233 and moved in time with the rocker arms 227 through the linkage and the push rods 249. These brushes establish contact with the inserts 63n in the stationary panel 62, as above described, in an order and sequence determined by the setting of the cams 229.

Consider the rods 233, beginning with the top rod as the "12" position, the second rod as the "11" position, the third rod as the "0" position, the fourth rod as the "1" position, etc., as the horizontal rows are placed in a standard forty-five column record. This has nothing to do with and should not be confused with the ninety column index positions, as punched in the ninety column record. They are merely used for purposes of describing the action of the brushes 243 and the contact between a brush 243 and the inserts 63n with which it makes contact, in terms of the angular portion of a machine cycle.

As before stated, at the same time that the arms 65 are being moved, the brushes are being moved by the cams 229 so that they make contact with the inserts 63n with which they cooperate.

When the boss 78 on the lever 65 is immediately below the first notch 79 in the rack plate 80, the contact brushes 243 in the "8" row and in the "2" row are in contact with their respective inserts 63n. This notch corresponds to the "7—8" horizontal rows in the ninety column record, but since the sensing pin is passing through a hole in the "1—2" position in the record, the magnet associated with the arm 65 is not energized. As the lever 65 moves farther its boss comes under the second notch 79 in the rack plate 80 which corresponds to the "5—6" horizontal rows in the ninety column record, but as the magnet 72 controlling the arm 65 is not energized, the arm passes on and its boss 78 is immediately below the third notch 79, and the contact brushes in the "6" and "0" row make contact with their cooperating inserts. This corresponds to the "3—4" horizontal rows in the ninety column records.

The magnet is not energized so the arm 65 moves forward until its boss 78 is beneath the fourth notch in the rack plate 80 which corresponds to the "1—2" horizontal rows in the ninety column record. The "5" and the "11" brushes make contact with their cooperating rows of inserts 63n and energize the circuit which had been set up by the plug wire and completed by the movement of the sensing pin through the "1—2" hole in the record, and the current flowing through the magnet 72a releases the slide plate 64 and allows the arm 65 to rise and its boss 78 engaging the last slot 79 guides the arm 65 to the stop in the tabulating machine immediately above, which will cause the machine to print a "1" if this value is not later changed.

The possibility of a change is as follows: If a hole is also punched in the "9" horizontal row, the value of the setup may change.

As described above, while the arm 65 is moving, the interposer 85 is restrained against movement by the rod 88. After the arm 65 has completed its movement and the magnet 72 is deenergized so that its armature 71 is allowed to return to normal and engage the slide plate 70, the "9" position is energized by the brushes 243 in the "3" and "9" rows which correspond to the "9" positions in the ninety column record.

Since no hole was punched in the "9" position, the magnet 72 does not receive a second impulse. Therefore, the value of the setting described is unchanged. When the type sector is released, the stop 81 which has been set for a value of "1" brings the type segment to rest with a "1" type in printing position.

If the ninety column card had been punched in the "1—2" row and also in the "9" row in the same column, the action and the setup of the stop 81 by the arm 65 would be the same as described above, but when the rod 88 restraining the interposers 85 has moved, after the armature has reengaged the slide plate 70, the magnet 72 receives a second impulse due to the fact that a plunger 42 has also been caused by a pin 41 to contact a cooperating contact member 50. The magnet, upon becoming energized, again attracts its armature 72 releasing the slide plate 70 and allowing the interposer 85 to rise and engage the "9" stop designated by the numeral 83. As this stop rises, its bump 561 rides over the strip 562 and allows both the stops 83 and the stop 81 to swing to the left, as viewed in Fig. 1, until the straight edge 563 of the stop 83 bears against the edge of the strip 562, thereby changing the value of the setting to the next higher even number.

In using standard forty-five column records, such as shown in Fig. 22, the lever 308 is turned back to the vertical position shown in Fig. 3. This movement rotates the eccentric shaft 226 to such a position that the rocker arms 227 in group "B" are moved out of the zone of the cams 229 and the rocker arms in group "A" are moved into the zone of the cams 229. The shaft 298 which is rotated therewith, through the medium of the pinion 314, lowers the plate 318. The movement of the plate 318 through the medium of the arm 324 and the bell crank 327 rotates the shaft 328 to a point where the indicator 329 shows the indication "45" through the window 337 in the plugboard 57. The motion of the shaft 328 is imparted to the shaft 332 by means of the spiral gears 330 and 333, and the shaft 332, due to its eccentricity, propels the plunger pins 335 upward and the insulating bar 336 is thereby caused to engage the contact arms 38 and move them upward into contact with the contact arms 37, thereby connecting the groups 47 and 47a of plunger pins 42 in common.

When the translator is set up in this manner, the jacks 60 in the plugboard 57 and jacks 61 immediately below the jacks 60 are connected in common. For example, a plugwire may be connected to the jack 10 or the jack 55 immediately below in plugging in for the tenth vertical column in the forty-five column record.

If it is desired to use the thirtieth column in the record, the plug wire may be inserted into the jack 62 immediately below the column label "30", or the jack 62 directly above the column label "75" on the plugboard.

There is no change in the stop basket 82. This basket, which was designed for ninety column records only, is utilized in connection with the new and improved translator, both for ninety column or denominational records and forty-five column records.

In describing the use of a standard forty-five column record in connection with the new translator, the method of causing the machine to print a "7" will first be described, followed by a description of the method of printing an "8". In other words, the printing of a "7" will be typical of an odd number and the printing of an "8" will be typical of an even number.

Assuming that a "7" is punched in the tenth column of a forty-five column record and it is desired to print in the first column at the extreme right in the first bank of sectors, a plug wire would be used to connect the jack 60 immediately below the column label "10" in the plugboard to the jack 519 immediately below the letter "U" in the plugboard which is the extreme right jack in the group "1". This connects the tenth row 47 of plunger pins 42 directly to the release magnet 72 controlling the movement of the slide plates 64 and 70 which carry respectively the moving arms 65 and the reciprocable interposer 85 which control the setting of the printing bar in the first column of the first bank of counters. When the record is at the sensing means, a sensing pin 41 in the tabulating machine passing through the "7" hole in the record engages and moves a plunger 42 into contact with the cooperating contact member 50.

At 332°, the uppermost brush 243 carried by the panel 22 which corresponds to the "12" row in the record, makes contact with its row of inserts 63n, and at 344° this contact is broken. At 345°, the second or "11" contact brush 243 makes contact with its insert 63n until broken at 353°. The third brush from the top or the one corresponding to the "0" row in the record makes contact with its insert 63n at 354° and this contact is broken at 7°.

Through the medium of the cranks 126 carrying the roller 129, the arms 65 (at 0°) start moving toward the right, as viewed in Fig. 1, and when the boss 78 on the arm 65 is immediately below the first notch 79 in the rack plate 80 (from the left) the brush 243 corresponding to the "8" horizontal row in the record, and the brush 243 corresponding to the "7" horizontal row in the record have made contact with their respective rows of insert 63n.

Since the sensing pin 41 has completed a circuit in the "7" position, the contact of the brush 243 in the "7" row energizes the circuit completed by the sensing pin and the magnet 72 attracts its armature, thereby releasing the slide plate 64 and allowing the arm 65 to rise with its boss 78 engaging the first notch 79 in the rack plate 80. The end of the arm 65 engages the first stop 81 from the left, as viewed in Fig. 1, and rises the same up so that if this setting is not changed the type sector when released will stop with its type in position to print a "7".

The circuit may be traced as follows:
From the positive side of the source via the fuse 543 and the wire 551 to the contact arms 357A and 357B and via contact points 358A and 358B and the wires 560, 559 to the shafts 233. From the shafts 233 via brushes 243 and inserts 63n to the contact members 50, thence via a plunger contact 42 which has been raised due to a perforation in the "7" index position and via the cable 599 to the tenth column jack 60. From this jack current can flow via the plug wire to the jack 519 and via the cable 565 to the magnet 72; thence via the return wire 564 to the contact member 358C and via the contact arm 357C cooperating therewith and via the wire 540, the total switch, the wire 541 and the fuse 542 to the negative side of the line.

At the time the slide plate 64 was released the slide plate 70 engaged by the same magnet armature was restrained against any movement when the armature was attracted by the holddown rod 88.

As the machine moves toward the completion of its stroke, the contact brushes 243 in the "6" and in the "5" positions make contact with their inserts and after this contact is broken those in the "4" and the "3" positions make contact, and after being broken those in the "2" and the "1" positions make contact.

The angles at which these brushes make and break contact are shown in the polar diagram, Fig. 20.

By the time the contact made by the "2" and the "1" rows is broken the magnet armature has reengaged the slide plate 70 and the restraining member 88 is raised so that if a magnet 72 receives a second impulse the slide plate 70 will be released.

At 91° the contact brushes 243 in the "9", the "8", the "6", the "4" and the "2" positions establish contact with their respective inserts 63n, so that if any pins in the tabulating machine have caused plungers 42 to make contact with the cooperating contact members 50 in any of these index point positions in the record, the magnet 72 will receive a second impulse and thereby release the slide plate 70 and the reciprocable interposer 85. Since the index point position in the record is a "7" and since the brush 243 in the "7" position was not actuated along with the "9", "8", "6", "4" and "2", the magnet 72 does not receive the second impulse, and therefore the value of the setting is unchanged.

The type bar is then released and comes to rest with a "7" type in line with the platen so that when the hammers are released the machine will print a "7".

Assuming that the hole punched in the record had an index position value of "8" instead of "7" and that this hole is punched in the tenth column of the record, a plug wire would be used to connect the jack 10 on the plug-board 57 to the jack 519 beneath the letter "U" just as described above for the "7" position. The action of the device is exactly the same as described for the "7", except at the point where the brushes 243 in the "8" position and the brushes 243 in the "7" position contact their inserts 63n. In the case of the "8" which we are now dealing with, the contact brush 243 in the "8" row would energize the circuit and cause the magnet 72 to attract its armature, releasing the slide plate 64 and allowing the arm 65 to engage the left hand stop 81, as viewed in Fig. 1.

After the magnet armature is released and reengages the slide plate 70 which was held down by the rod 88, the rod 88 recedes between 88° and 91°. Immediately afterward, the contact brushes 243 in the "9", "8", "6", "4" and "2" positions contact their respective inserts 63n. Since the "8" position is included in this group, the magnet 72 receives a second impulse, attracts its armature, and releases the slide plate 70. The slide plate moves up and the reciprocable interposer 85 moving therewith engages the stop 83 in the stop pin basket 82 and raises the same so that when the bump 561 passes over the strip 562 the stop 83, together with the stops 81, all move over to the left, as viewed in Fig. 1, increasing the value of the setting to the next highest even number, which in this last instance is "8", thereby changing the value of the seting from "7" to "8".

The action for ninety column operation and the action for forty-five column operation may be contrasted as follows:

(1) In ninety column operation the arm 65 is released due to the presence of a hole in the record in a position other than the "9" position, and if the value of this position is even there will also be a hole in the "9" position and the reciprocable interposer is released by an impulse passing through a circuit which was completed due to the presence of the hole in the same column in the "9" position.

(2) In forty-five column operation, due to the fact that only one hole is punched in a column only one circuit is completed by the movement of the sensing pin through said hole. If the position value of this hole is odd, the release magnet 72 does not receive a second impulse. If the position value of the hole is even, the release magnet receives a second impulse and the reciprocable interposer is released, changing the value of the setting to the next highest even number. If the value of the hole is "9" the moving arm 65 is not released and when the contact brushes "2", "4", "6", "8" and "9" contact their inserts the reciprocable interposer is released and the type sector is allowed to move its full stroke and stop in a position to print a "9"

The tabulating machine is provided with adding or accumulating means which is associated with the type bars, but as these are old and well-known in the art they will not be herein described.

The tabulating machine equipped with the new and improved translator can perform all of the functions which it was capable of performing with the old type push rod translator and in addition it is capable of performing many functions heretofore unattainable in a machine of this character.

As described above, the translator is provided with a switch which is opened by a pawl on the tabulating machine during a total-taking operation. This switch cuts off all current in the translator, making it impossible to attain erroneous results due to stray currents in the translator at this time. The first record of the succeeding group is locked in the sensing means during the total-taking operation, and the sensing pins pass up through holes in this record during a portion of the space and total cycles of the machine. Cutting off the current in the translator prevents impulses from being set up in the circuits of the translator while taking totals.

Many changes may be made in the new and improved translator herein described without departing from the spirit of the invention as defined in the following claims.

To make some of the claims short and concise, associated or cooperating parts are combined under single terminologies as defined as follows:

"Differential stops" refers to the stops described in the aforesaid Lasker patent and shown in Fig. 1 of the drawings in the present application.

The expression "electrical release" refers to an electro-magnet 72, together with its armature 71. Each armature is provided with notch 73 and conjointly controls the release of both a slide plate 64 and a slide plate 70, the latter being restrained during the portion of the cycle in which the first may be released.

The expression "a plurality of contact members" refers to the plungers 42 and the cooperating contact members 50, each plunger being adapted to establish contact with a cooperating contact member 50 when a sensing pin 41 passes through a hole in the record and raises a plunger 42. These members may also be considered circuit completing means, due to the fact that certain desired circuits are plugged up by means of plug wires in the plugboard, but current can not flow in these circuits unless they are completed, due to the presence of a hole in the record. A sensing pin 41 passes through the hole in the record and raises the plunger 42 into contact with the member 50, after which an impulse may pass through the circuit thus completed. These plungers with their cooperating contacts may, in terms of the sensing means, be called "related contact devices".

The impulse distributor consists of the inserts 63 in the stationary panel 62, together with the contact brushes 243 which make contact therewith in certain orders determined by the timing of the cams 229. The cams 229, through the medium of the rocker arms 227, the push rods 249 and the levers 248 oscillate or rock the shafts 244 carrying the brushes 243 and thereby cause the latter to make contact with the inserts 63.

The pivoted contact arms 357 and their cooperating stationary contact members 358, connected to a source of current, supply energy or impulses and these impulses are distributed to the various circuits by the impulse distributor described in the paragraph above. The cams 359 which actuate the contact arms 357 are of various timing. The timings of the various cams 359 are shown in detail in the polar diagrams (Figs. 20 and 21). 359A, 359B, 359G and 359H control the impulses supplied to the impulse distributor.

The cam 359C controls the return circuits of magnets 72, the cam 359D controls the return circuits of the solenoids 428, 441 and 451, and the cam 359F controls other impulses in the machine which may be utilized to actuate the reset coils of relays used externally and controlled by the translator, as described in the specification, and the insulated cylinder 360 with its inserts 362 contacting the brushes 363 furnishes impulses of known timing to the jacks 544 in the plugboard 57. It will be noted that the slidable panel 221 is provided with two groups of brushes 243, one group having its brushes timed for alphabetical operation and the other portion for numerical operation. This panel may be shifted laterally relative to the stationary panel 62.

The expression "translator of the character described" may be taken to mean; the oscillating arm 65, the reciprocable interposers, the electrical releases for controlling these members, the contact devices 42—50, the impulse cams and contact members, the impulse distributing mechanism, and the plugboard containing jacks and by means of which any desired circuit may be set up to be completed by said contact devices by sensing pins in the tabulating machine. The distributor distributes impulses to these circuits, energizing release magnets and allowing the arms and interposers to effect setups in the differential stop pin basket in the tabulating machine. The term also includes the resetting means and other features described in this specification.

The term "changing the value of a setup" may be taken to mean that after a moving arm 65 is released and engages a stop, the appearance of a second hole in the same column of the record causes the release of a reciprocable interposer which engages a stop 83 and allows the first stop to shift laterally, thereby changing the value of the setup or the position at which the type sector 84 comes to rest.

The term "denominational columns" refers to columns in the record in which single or plural holes may appear in accordance with some prearranged code. Denominational records may be taken to mean records in which denominational holes representing a prearranged code are punched.

The term "differential positionable devices" is well-known in the art, and refers to any devices or instrumentalities in which values represented by perforations in the record may be entered. For example, accumulators, printing bars, etc.

When forty-five column records are used in the new and improved translator and a sensing pin passes through a hole in the record and actuates a plunger causing the same to make contact with its cooperating contact, a circuit is completed thereby. This circuit is energized and a moving arm released by this energy sets a stop in the stop pin basket. If the hole in the record appears in any one of a number of certain positions, the circuit is reenergized and a reciprocable interposer is released, thereby causing a change in the value of the setup of said stop. In both instances the impulse flows through the circuit which was completed by the movement of the sensing pin.

What is claimed is:

1. A mechanical-electrical translator for record controlled machines of the pin sensing type having settable differential stops arranged in rows for controlling the movement of type carrying members, each row having associated therewith an element for changing the set up value of a positioned stop therein, comprising; a plurality of contact members actuated by sensing pins passing through holes in the records, a plurality of arms, one for each row of stops, means to oscillate said arms each in a path adjacent to a row of stops in timed relation to a portion of the operating cycle of said machine, each arm being adapted when released to engage and set one of the stops in the row with which it is associated, a reciprocable interposer associated with each row of stops and adapted when released to operate an element in each row of stops to change the setup value of a stop in the row with which it is associated, a plurality of release magnets each controlling the engaging of a stop by an arm and the engagement of an element in the same row by an interposer, means restraining said interposers against movement when a release magnet is energized for releasing an arm during the oscillation of the latter and removing restraint from said interposers and reassociating the latter with the magnets after said arms have completed their oscillation so that if the release magnet is again energized its interposer is released, detachable means for setting up circuits including said release magnets and said contact members whereby said contact members when actuated by said pins may complete said circuits, and means connected to a source of current and operating in steps timed with the oscillation of said arms for energizing said completed circuits, said last means acting after said arms have completed their oscillation for again energizing those of the completed circuits controlled by record columns in which a plurality of perforations appear.

2. In a record controlled machine of the pin sensing type, including accumulating and printing elements, a row of differential stops for governing the setting of said elements, and means for allowing said stops to shift laterally, the combination with a translator comprising; a plurality of contact members actuated through holes in a record column by said pins, an oscillating arm adapted when released to set one of said stops, a reciprocable interposer provided to actuate said means for allowing said stops to shift laterally, a release magnet associated with said arm and said interposer and having terminals connected to said contact members, a stationary panel having inserts arranged therein in rows, a second panel carrying contact brushes for contacting said rows of inserts, means for successively moving some of said contact brushes, means for simultaneously moving a plurality of said brushes, a source of current, means for including said contact members, said release magnet, said inserts, said contact brushes, and said source in a circuit which is completed by the actuation of one of said contact members due to a hole in the record column, followed by the engagement of an insert by a contact brush while said arm is moving for releasing the arm and permitting the same to set a stop, said means for simultaneously moving said brushes causing said release magnet to be again energized to release said interposer and allow said stops to shift laterally when said hole in the record column appears in certain predetermined positions.

3. A translator of the character described including a frame, a shaft journaled in said frame, a plurality of movable arms, a plurality of reciprocable interposers, a plurality of slide plates, one for each of said arms, and one for each of said interposers, each of said slide plates being connected to the related arm or interposer, a plurality of magnetic latches each controlling the movement of one of said first plates and one of said second plates, cams carried by said shaft for oscillating said arms, a resetting bar associated with all of said slide plates for resetting those released by said latches, mechanism connected to said bar, resetting cams carried by said shafts and adapted to actuate said mechanism, and means for driving said shaft in definite timed relation to a shaft in a tabulating machine when said translator is associated with said machine with said arms and interposers in operative relation to stops therein.

4. A translator of the character described including a frame, a shaft journaled in said frame, a plurality of movable arms, a plurality of reciprocable interposers, a plurality of slide plates, one for each of said arms, and one for each of said interposers, each of said slide plates being connected to the related arm or interposer and all said slide plates having slots formed therein, a plurality of magnetic latches each controlling the movement of one of said first plates and one of said second plates, cams carried by said shaft for oscillating said arms, a resetting bar positioned in the slots in said slide plates for resetting those released by said magnetic latches, toggle joints supporting said bar in said frame, resetting cams carried by said shaft and adapted to act against said toggle joints to move said bar for resetting said slide plate, and means for driving said shaft in definite timed relation to a shaft in a tabulating machine when said translator is associated with said machine with said arms and interposers in operative relation to stops therein.

5. A translator of the character described including a frame, a shaft journaled in said frame, a plurality of movable arms, a plurality of reciprocable interposers, a plurality of slide plates, one for each of said arms, and one for each of said interposers, all said slide plates having slots formed therein, a plurality of magnetic latches each controlling the movement of one of said first plates and one of said second plates, cams carried by said shaft for oscillating said arms, a resetting bar positioned in the slots in said slide plates for resetting those released by said magnetic latches, toggle joints supporting said bar in said frame, rollers carried by said toggle bars, camming yokes supported in said frame and having camming surfaces engaging said rollers, resetting cams carried by said shaft and adapted to act against said yokes to move said toggle joints and the bar associated therewith for resetting said slide plate, and means for driving said shaft in definite timed relation to a shaft in a tabulating machine when said translator is associated with said machine with said arms and interposers in operative relation to stops therein.

6. A translator of the character described including an impulse distributor comprising; a fixed panel having a plurality of rows of inserts, a movable panel having a plurality of rocking brushes each adapted to make contact with a row of inserts, means for rocking said brushes relative to said inserts, and means for shifting said last panel laterally relative to said first panel.

7. A translator of the character described including an impulse distributor comprising; a fixed panel having a plurality of rows of inserts, a movable panel having a plurality of brushes each adapted to make contact with a row of inserts, pivoted shafts supporting said brushes, levers secured to said shafts, rocker arms carried by said last panel, connecting rods connecting said rocker arms to said levers, and cams engaging said rocker arms and adapted to move said brushes into and out of contact with said inserts.

8. A translator according to claim 7 provided with a multi-switch and means for opening and closing the contacts thereof, and means for moving said last panel laterally relative to said first panel, said means being corelated whereby the movement of the panel in one direction causes the contacts of the multi-switch to successively close and the movement of the panel in the opposite direction causes the contacts of the switch to successively open.

9. A translator of the character described including an impulse distributor comprising; a fixed panel having a plurality of rows of inserts, a movable panel having a plurality of brushes each adapted to make contact with a row of inserts, pivoted shafts supporting said brushes, levers secured to said shafts, rocker arms carried by said last panel, connecting rods connecting said rocker arms to said levers, two rocker arms being associated with each of said pivoted shafts, an eccentric support for some of said rocker arms, a support eccentric to said eccentric support for others of said rocker arms, a group of cams for said first rocker arms, and a group of cams for said second rocker arms, the timing of the cams in one group being different from the timing of the cams in the other group, and means engaging said supports for bringing one group of rocker arms into the zone of its cams and at the same time moving the other group of rocker arms out of the range of its cams thereby changing the order of distribution of impulses from said distributor.

10. A device according to claim 7 in which the movable panel is provided with a plate having slots formed therein through which said levers extend, a system of cams and levers associated with said plate so arranged that a lever must be thrown before said movable panel can be removed from said translator, thereby shifting said plate to a point where it engages all of said levers and raises said brushes to prevent them from becoming mechanically injured while said translator is being serviced.

11. In a translator, an impulse distributor having stationary contacts, a brush adapted to engage said contacts, a rocking shaft supporting said brush, two rocker arms operatively connected to said shaft, a cam of one timing adapted to actuate one rocker arm, a cam of a different timing adapted to actuate the other rocker arm, and means for disabling one rocker arm while the other is operating.

12. In a translator, an impulse distributor member comprising, a pivoted shaft insulatedly supported on a frame, a brush formed of a metallic strip having a plurality of slots milled therein, a restrainer extending behind the brush and having a bent portion extending around the outer edge of the brush and engaging the face of the same adjacent to said outer edge, under tension.

13. In combination a tabulating machine having a main drive clutch for a power drive, a hand wheel for rotating the machine by hand, an electrical translator including mechanism, a plurality of circuits and connections to a source of current, and a switch associated with said clutch and said hand wheel and connected between said source and said circuits, adapted to be closed by either said clutch or said hand wheel.

14. A translator according to claim 7 in which at least some of said pivoted shafts are each provided with two levers, two rocker arms, two connecting rods and two cams, and in which means is provided for making one of said rocker arms ineffective while the other is operating.

15. A translator according to claim 7 in which at least some of said pivoted shafts are each provided with two levers, two rocker arms, two connecting rods and two cams, and in which means is provided for bringing one of said rocker arms into engagement with its associated cam and at the same time removing the other associated rocker arm from the zone of its associated cam.

16. A translator according to claim 9 in which a plug board is provided and in which cables are provided connecting at least one of said inserts in each of said rows to a jack in a series of jacks in said plug board thereby making available a series of impulses of known timing, the value of which may be changed by shifting one or the other group of rocker arms into the range of the associated cams.

17. A translator according to claim 9 in which a plug board is provided and in which cables are provided connecting at least one of said inserts in each of said rows to a series of jacks in said plug board thereby making available a series of impulses of known timing, the value of which may be changed through the movement of one group of rocker arms into the zone of its cams and the movement of the other group of rocker arms out of the range of its cams.

18. In a record controlled machine of the pin sensing type employing sensing pins which read holes in the record, including accumulating and printing elements and differential stops in rows for governing the operation of said elements, each row including an auxiliary stop which permits the differential stops to move laterally, the combination of a translator comprising; a plurality of pairs of contact members arranged in rows and actuated through holes in the records by said pins, an impulse distributor, a source of current connected to said distributor, a swingable arm moving in timed relation to a portion of the operating cycle of the machine and arranged to set one of said stops when released, a reciprocable interposer for actuating said auxiliary stop when released, a slide plate supporting said arm, a second slide plate linked to said interposer, an electro-magnet included in a circuit with said impulse distributor and a row of said contact members and having an armature engaging both of said slide plates, and mechanism engaging said second slide plate during the portion of the machine cycle in which said arm is swung permitting said first slide plate only to be released by said magnet when the same is energized by an impulse instituted by one hole in a column of the record at the sensing means, said mechanism being timed to become disengaged from the second slide plate so that the latter may be released upon the second energization of said magnet by said impulse distributor due to the closing of a second pair of contact members by a pin passing through a second hole in the same column in the record at the sensing means.

19. In a record controlled machine including accumulating and printing elements, pin type sensing means employing sensing pins for reading perforations in the record, differential stops in rows and a positionable member for moving said stops laterally to govern setups in said elements, the combination with a translator comprising a plurality of contact members actuated through the holes in the record by said pins, an oscillating arm and means for moving the same in timed relation to a portion of the record cycle of said machine, a slide plate pivotally supporting said arm, spring means acting against said slide plate to urge said arm toward said stops, a latch engaging said slide plate against the urge of said spring, a reciprocable interposer in cooperative relation with said positionable member, spring means urging said interposer toward said member, said interposer also being engaged by said latch against the urge of its spring, means for holding said interposer against any movement only while said arm is in motion, a magnet in cooperative relation with said latch, a circuit including said magnet, said contact members, and an impulse distributor, adapted to be completed by the movement of said pins, whereby an impulse due to a single hole in a given record column may, through the medium of said magnet, effect the release of said slide plate and the arm carried thereby while said means for holding the said interposers is effective, thereby permitting said arm to set one of said stops, said circuit also being adapted to be energized a second time upon the appearance of a second hole in said column and after said last means is made ineffective to effect the release of said interposer and to permit the same to engage said positionable member to change the value of the setup in said element.

20. In a translator of the character described, a plurality of members for effecting setups in differential stops in a tabulating machine, a plurality of members adapted to engage devices in said machine to change the effective values of said setups, electrical instrumentalities each including a magnetic latch engaging a member of each kind conjointly, means for restraining said members of one kind against movement while said members of the other kind are effective, and for removing said restraint thereafter, whereby a single magnetic latch may, upon the receipt of one impulse, release a member of said other kind, and upon receipt of a second impulse during the same record cycle the same magnetic latch may release a member of the second kind, and an electrical distributor and mechanically-controlled contacts in circuit with said magnetic latches for determining when the release of said members shall occur.

21. In a record controlled tabulating machine in combination, sensing pins and related contact devices under control of the records, a plurality of entry receiving devices and a series of differential stops associated with each of said entry receiving devices, a positionable member included in each of said series for changing the position of a set stop in its series, a stop setting device for each of said series and an interposer for each of said positionable members, a plurality of magnetic latches each engaging one of said stop devices and one of said interposers, a restaining member for preventing the release of said interposers during the portion of the record cycle of the machine in which said stop setting device is effective and for placing said interposers under the influence of said latch during a succeeding portion of the machine cycle, and an electrical distributor in circuit with said contact devices and said magnetic latches for determining when said magnetic latches shall operate.

22. In a tabulating machine, printing mechanism and differential stops for effecting setups therein, an analyzer including pins adapted to read all perforations in a combinational record simultaneously; and an electrical translator including contact devices co-related with said pins, stop setting devices co-related with said stops, stop shifting devices, means for rendering the latter ineffective while said stop setting devices are moving and for rendering said stop shifting devices effective after said stop setting devices have come to rest, a plurality of magnets each having an armature associated with and adapted to conjointly control a stop setting device and a stop shifting device, a plurality of circuits each including at least some of said contact devices and one of said magnets for effecting the control of said stop setting and stop shifting devices, an impulse distributor connected to said circuits and adapted to supply energy to said circuits via those contact devices which have been closed due to perforations appearing in index positions of the record whereby one impulse due to a single perforation in a given column in the record may energize one of said magnets to control the setting of a stop, and a second impulse due to a second perforation in the same column of the record may again energize said magnet to cause the shifting device controlled by said last magnet to shift a set stop thereby changing the value of said set up.

23. In combination with a machine controlled by combinational perforated records including a sensing means, a type sector, stops for effecting setups therein, and a member for changing the position of a set stop, a translator including a plurality of pairs of contacts adapted to be closed by said sensing means acting through said perforations, a group of contactors normally open and adapted to be closed at definite index points in the machine cycle, a stop setting device, a stop shifting device for actuating said member and thereby changing the value of a setup made by said stop setting device, an electromagnet, a latch controlled thereby and engaging both a stop setting device and a stop shifting device, a plurality of electrical circuits each including one of said pairs of contacts, one of said contactor devices, said electromagnet, and connections to a source of current, cam means in said translator for controlling said contactor devices whereby current may flow in only one of said circuits at one time, means in said translator for holding said stop shifting device against release from said latch while said stop setting device is effective, and means for disabling said last means thereby placing said stop shifting device under the influence of said latch after said stop setting device has ceased moving.

24. In combination with a machine controlled by combinational perforated records including sensing means, a type sector, stops for effecting setups therein, and a member for changing the position of a set stop, a translator including a plurality of pairs of contacts adapted to be closed by said sensing means acting through said perforations, a group of contactor devices, an impulse distributor including contact members each of which is successively connected to a source of current at definite timing, a stop setting device, a stop shifting device for actuating said member and thereby changing the value of a setup made by said stop setting device, an electromagnet, a latch controlled thereby and engaging both a stop setting device and a stop shifting device, a plurality of electrical circuits each including one of said pairs of contacts, one of said contactor devices, said electromagnet, and contact members in said impulse distributor, cam means in said translator for controlling said contactor devices whereby current may flow in only one of said circuits at one time, means in said translator for holding said stop shifting device against release from said latch while said stop setting device is effective, and means for disabling said last means thereby placing said stop shifting device under the influence of said latch after said stop setting device has ceased moving.

25. The combination with tabulating mechanism including a type carrier and stops for effecting setups therein, a positionable member for changing the values of said setups, and analyzing means; of means for effecting setups in said carriers under control of a record card at said analyzer having index points therein arranged in combinational codes, said means including an oscillating arm for setting said stops and an interposer for actuating said positionable member, conjointly controlled by a magnetic latch, means holding said interposer against movement while said arm is in motion, means for disabling said holding means after said arm has ceased moving, a circuit including the magnet of said latch, an impulse distributor, and means under control of said analyzing means for completing said circuit and energizing said magnet to effect the release of said arm due to the appearance of one perforation in a column of the record in control while said means holding the interposer is effective, and for again energizing said magnet due to the appearance of another perforation of the same combination, thereby releasing said interposer and permitting the same to engage said positionable device thereby changing the value of the setup.

26. The combination with tabulating mechanism including a type carrier and stops for effecting setups therein, a positionable member for changing the values of said setups, and analyzing means; of means for effecting setups in said carriers under control of a record card at said analyzing means having index points in vertical columns therein arranged in combinational codes, said means including, an oscillating arm for setting said stops and an interposer for actuating said positionable member, each associated with and sequentially controlled by a magnetic latch, means holding said interposer against movement while said arm is in motion, means for disabling said holding means after said arm has ceased moving, a plurality of pairs of contacts controlled by said analyzing means, an impulse distributor driven in timed relation to said mechanism, a circuit connected to the contacts associated with a given record column at said analyzer, the magnet of said latch and said distributor, whereby an impulse due to one perforation in the column record in control at said analyzing means energizes said magnet to effect the release of said arm while said means holding the interposer is effective, and a second impulse due to the appearance of another perforation of the same combination may again energize said magnet, thereby releasing said interposer and permitting the same to engage said positionable device and effect a change of the value of the setup.

27. In a tabulator, at least one order of an accumulating mechanism having a plurality of stops in cooperative relation therewith and arranged in rows for effecting set-ups therein, said stops being movable both longitudinally and laterally, a positionable device for controlling the lateral movement of said stops, a sensing means adapted to analyze records, and electrically controlled instrumentalities for controlling the movement of said stops, including an oscillating stop setting member adapted when released to move one of said stops longitudinally to effect a setup in said accumulating mechanism, a reciprocable interposer adapted to engage said positionable device and thereby effect lateral movement of said stops, a magnetic latch engaging both said stop setting member and said positionable device, contact points controlled by said sensing means; a circuit including said contact points, the magnet of said magnet release, and an impulse distributor; and restraining means acting against said interposer to prevent the release thereof while said arm is oscillating and until the interposer is reengaged by said magnetic latch, whereby an impulse due to one perforation in a column of the record may energize said magnet and effect the release of said arm and the movement of one of said stops longitudinally, and a second impulse due to a second perforation in said column may again energize said magnet thereby effecting the release of said interposer and permitting the same to engage said positionable device to effect lateral movement of said stops.

28. In a record controlled machine of the pin sensing type including accumulating and printing elements and a row of differential stops for governing the operation of said elements, said row having associated therewith a member for permitting said stops to shift laterally, the combination of a translator comprising; a plurality of contact members actuated through holes in a record column by said pins, an oscillating arm adapted when released to set one of said stops, an interposer to actuate said member for causing said stops to shift laterally, means for restraining said interposer while said arm is oscillating, a release magnet associated with said arm and said interposer, a stationary panel having inserts arranged therein in rows, a second panel carrying contact brushes, means to cause said brushes to successively contact said rows of inserts, a source of current, means for including said contact members, said release magnet, said inserts, said contact brushes, and said source in a circuit which is completed by the actuation of one of said contact members by said pins, followed by the engagement of said inserts by the contact brushes for energizing said magnet while said arm is oscillating thereby releasing the arm and positioning the same to engage and set a stop, said circuit being again energized after the arms have completed their movement upon the appearance of a second hole in the record column representing an even number, thereby shifting the stops laterally.

29. In a record controlled machine of the pin sensing type including printing sectors with differential stops in rows for effecting setups of said sectors, the end stop in each row being adapted when actuated to change the setup value of a positioned stop in its row, the combination of a translator comprising contact members actuated through holes in the records by said sensing pins, oscillating arms each in endwise relation to one of said rows of stops and moving in timed relation to a portion of the operating cycle of the machine and adapted to set one of said stops when released, a plurality of reciprocable interposers each positioned in endwise relation to an end stop in each row, and arranged to reciprocate longitudinally with respect to the associated stop, a slide plate associated with each arm, a second slide plate associated with each interposer, an impulse distributor driven in direct timed relation with the record cycles of said machine, a plurality of electromagnets each included in a circuit with a set of said contact members and said impulse distributor, each of said electromagnets having an armature engaging one slide plate of each kind, means including an engaging member for restraining said second slide plates while said arms are being moved, whereby an impulse due to a hole in a record column may energize a related magnet and cause its armature to release its arm only, and means influencing said engaging member and releasing said second slide plates from restraint and reassociating them with said armatures whereby a second impulse through said related magnet due to a second hole appearing in the same column of the record will again energize said magnet and cause said armature to release said second slide plate and the interposer associated therewith to actuate the end stop and change the value of the setup in said stops.

30. In combination with a machine adapted to be controlled by records having combinational perforations and having sensing means, type carriers, and a row of stops for effecting setups therein less in number than the number of type elements in each of said carriers and a member for permitting said stops to shift and change the value position of a set stop, a translator of the character described for causing records having single standard perforations to control the operation of said machine having a mechanically moved device for controlling setups of said stops, and an interposer associated with said device for operating said member and thereby changing the value position of a set stop, a magnetic latch conjointly engaging said device and said interposer, means for restraining said interposer against release while said latch is releasing said device, contacts controlled by said sensing means, a circuit including said contacts and the magnet of said magnetic latch, a cam controlled interrupter included in said circuit and operable to cause a single perforation to control the initiation of a plurality of impulses similar in time and duration to those which would be produced by combinational perforations of the same value, thereby obtaining from a single perforation the same result as that obtained by controlling the machine normally with combinational perforations.

31. In a record controlled machine of the pin sensing type employing sensing pins which read holes in the record, including accumulating and printing elements and differential stops for governing the operation of said elements, and a member for changing the value position of a set stop, the combination of a translator comprising a plurality of contact members actuated through holes in the records by said pins, an oscillating arm moving in timed relation to a portion of the operating cycle of the machine and adapted when released to set one of said stops, a slide plate forming a support for said arm, a reciprocable interposer arranged when released to actuate said first mentioned member and to thereby cause a change in the value of the setting of said stop, a magnet having a latch associated therewith engaging both said plate and said interposer, means for preventing the release of the interposer while said arm is oscillating, instrumentalities included in circuits completed under control of certain of said contact members actuated through a hole in a record column for energizing said magnet while the arm is oscillating to effect the release of said slide plate thereby allowing said arm to engage a stop and for deenergizing the same after said arm comes to rest, and means for placing said circuits under control of others of said contact members actuated through a second hole in the same record column for again energizing the magnet coil and effecting the release of said interposer.

32. In a record controlled machine having accumulating means, a row of differential stops therefor, an auxiliary stop which permits the differential stops to move laterally to change the value setting of a set differential stop, and an analyzer for analyzing records, contactor devices controlled by said analyzer, a moving arm driven in timed relation to a portion of the operating cycle of said machine and arranged to engage and set one of said differential stops, a release magnet having a latch associated with said arm to release the same at some point in its movement determined by an impulse due to one perforation of a combination at the analyzer, an impulse distributor driven in definite relation to the record cycles of said machine, electrical connections between said contactor devices, said release magnet and said impulse distributor forming circuits adapted to be completed by the analyzer whereby impulses from said distributor may flow therethrough, a reciprocable interposer also associated with said latch and adapted to actuate said auxiliary stop, means for imposing restraint upon said interposer during the movement of said arm and for removing said restraint from the interposer and leaving the latter under control of said latch after said arm has completed its stroke, whereby an impulse instituted by a second perforation of said combination at said analyzer may again control the energization of said release magnet to effect the release of said interposer.

33. The combination with tabulating mechanism including sensing means, a type carrier, a plurality of stops arranged in a row adjacent said type carrier and adapted to be moved longitudinally for effecting setups in said type carrier, and a positionable device associated with said row of stops for permitting said stops to shift laterally; of electrical means for controlling said mechanism from a record card having data arranged therein in a combinational code, said means including electrical contacts controlled by said sensing means, an oscillating arm driven in time with the record cycles of said mechanism and having its end moving in a path adjacent to said stops, an interposer reciprocably mounted in endwise relation to said positionable device, a magnetic release for controlling said oscillating arm and said interposer, a circuit including the magnet of said magnetic release, said electrical contacts and an impulse distributor, whereby an impulse instituted by a perforation in one position in a column of the record may energize said magnet to effect release of said oscillating arm and the setting of a stop, and restraining means acting against said interposer to prevent the release thereof while said arm is being oscillated and released and until the interposer is reengaged by said magnetic release, whereby an impulse due to a second perforation in said column may again energize said magnet to effect the release of said interposer thereby, through the medium of said positionable member, permitting said stops to shift laterally and changing the value of said setup.

LINCOLN M. KEEFE.